(12) United States Patent
Fan et al.

(10) Patent No.: US 12,449,960 B2
(45) Date of Patent: Oct. 21, 2025

(54) INTERFACE DISPLAY METHOD AND DEVICE

(71) Applicant: HUAWEI TECHNOLOGIES CO., LTD., Guangdong (CN)

(72) Inventors: Zhenhua Fan, Nanjing (CN); Yuan Cao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 36 days.

(21) Appl. No.: 17/635,246

(22) PCT Filed: Aug. 7, 2020

(86) PCT No.: PCT/CN2020/107997
§ 371 (c)(1),
(2) Date: Feb. 14, 2022

(87) PCT Pub. No.: WO2021/027747
PCT Pub. Date: Feb. 18, 2021

(65) Prior Publication Data
US 2022/0291816 A1    Sep. 15, 2022

(30) Foreign Application Priority Data

Aug. 15, 2019   (CN) .......................... 201910755338.0

(51) Int. Cl.
*G06F 3/04886* (2022.01)
*G06F 3/04845* (2022.01)
(Continued)

(52) U.S. Cl.
CPC ........ *G06F 3/04845* (2013.01); *G06F 3/0486* (2013.01); *G06F 40/166* (2020.01);
(Continued)

(58) Field of Classification Search
CPC ......... G06F 2203/04803; G06F 3/0486; G06F 3/04845; G06F 3/04886; G06F 3/167; G06F 40/166; H04L 51/046
See application file for complete search history.

(56) References Cited

U.S. PATENT DOCUMENTS 8,416,767 B2 * 4/2013 Wang .................. H04L 65/1083
370/352
9,135,914 B1 * 9/2015 Bringert .................. G10L 15/22
(Continued)

FOREIGN PATENT DOCUMENTS

| CN | 103605524 A | 2/2014 |
| CN | 104216619 A | 12/2014 |

(Continued)

OTHER PUBLICATIONS

ITU-T H.264(Jun. 2019), Series H: Audiovisual and Multimedia Systems, Infrastructure of audiovisual services—Coding of moving video, Advanced video coding for generic audiovisual services, total 836 pages.

*Primary Examiner* — Scott T Baderman
*Assistant Examiner* — Mario M Velez-Lopez
(74) *Attorney, Agent, or Firm* — WOMBLE BOND DICKINSON (US) LLP

(57) ABSTRACT

An interface display method and a device are described. An original interface may be moved to reserve space for displaying an interface of a first application such as a voice assistant, so that the interface of the first application does not block the original interface. This helps a user interact with the original interface and the interface of the first application. For example, an electronic device displays a first interface. The electronic device detects an operation in which the user indicates to start a first application. The electronic device displays the first interface in a first area of a screen, and displays a second interface in a second area of (Continued)

the screen. The second interface is an interface of the first application, and the first area does not overlap the second area.

18 Claims, 94 Drawing Sheets

(51) Int. Cl.
*G06F 3/0486* (2013.01)
*G06F 40/166* (2020.01)
*H04L 51/046* (2022.01)

(52) U.S. Cl.
CPC ........ *H04L 51/046* (2013.01); *G06F 3/04886* (2013.01); *G06F 2203/04803* (2013.01)

(56) References Cited

U.S. PATENT DOCUMENTS

| | | | | |
|---|---|---|---|---|
| 11,127,397 | B2* | 9/2021 | Piernot | G06F 3/167 |
| 11,561,687 | B2* | 1/2023 | Xiong | G06F 3/0482 |
| 11,567,623 | B2* | 1/2023 | Jiang | G06F 3/0488 |
| 2010/0122195 | A1* | 5/2010 | Hwang | H04N 7/147 |
| | | | | 345/173 |
| 2010/0169098 | A1* | 7/2010 | Patch | G10L 15/193 |
| | | | | 704/275 |
| 2012/0066628 | A1* | 3/2012 | Ens | G06F 16/9577 |
| | | | | 715/769 |
| 2013/0072262 | A1* | 3/2013 | Mhun | H04M 1/72469 |
| | | | | 455/566 |
| 2013/0176102 | A1* | 7/2013 | BianRosa | H04N 21/42224 |
| | | | | 340/4.31 |
| 2013/0215041 | A1* | 8/2013 | Kim | G06F 1/3278 |
| | | | | 345/173 |
| 2014/0184544 | A1* | 7/2014 | Lim | H04L 51/066 |
| | | | | 345/173 |
| 2014/0229888 | A1* | 8/2014 | Ko | G06F 3/04842 |
| | | | | 715/783 |
| 2014/0303942 | A1* | 10/2014 | Wighton | B29C 33/3842 |
| | | | | 703/1 |
| 2014/0351748 | A1 | 11/2014 | Xia et al. | |
| 2015/0015511 | A1* | 1/2015 | Kwak | G06F 3/04842 |
| | | | | 345/173 |
| 2016/0037001 | A1* | 2/2016 | Mummaw | H04N 9/8205 |
| | | | | 348/231.2 |
| 2016/0179341 | A1* | 6/2016 | Cho | G06F 3/04886 |
| | | | | 715/769 |
| 2017/0031555 | A1* | 2/2017 | Ma | G06F 3/0488 |
| 2017/0357437 | A1* | 12/2017 | Peterson | G06F 40/134 |
| 2018/0039382 | A1 | 2/2018 | Jeong et al. | |
| 2018/0039408 | A1* | 2/2018 | Cheong | G06F 3/0481 |
| 2018/0239521 | A1* | 8/2018 | Bastide | G06F 3/0481 |
| 2019/0302981 | A1* | 10/2019 | Storr | G06F 9/451 |
| 2019/0324620 | A1* | 10/2019 | Gu | G09G 3/035 |
| 2019/0339769 | A1* | 11/2019 | Cox | G06F 3/016 |
| 2020/0081753 | A1* | 3/2020 | Deluca | G06F 3/165 |
| 2020/0326839 | A1* | 10/2020 | Walkin | G06F 3/04817 |
| 2022/0107821 | A1* | 4/2022 | Zhu | G06F 3/016 |
| 2022/0415321 | A1* | 12/2022 | Jung | G10L 15/22 |

FOREIGN PATENT DOCUMENTS

| | | | |
|---|---|---|---|
| CN | 104777983 | * | 7/2015 |
| CN | 104777983 | A | 7/2015 |
| CN | 107765983 | A | 3/2018 |
| CN | 107908351 | A | 4/2018 |
| CN | 108519850 | A | 9/2018 |
| CN | 108984083 | A | 12/2018 |
| CN | 109062465 | A | 12/2018 |
| CN | 109271081 | A | 1/2019 |
| CN | 109491562 | A | 3/2019 |
| CN | 109766053 | A | 5/2019 |
| CN | 109782976 | A | 5/2019 |
| CN | 110647274 | A | 1/2020 |
| EP | 2712441 | B1 | 9/2020 |
| EP | 3800537 | A1 | 4/2021 |
| KR | 20180106174 | A | 10/2018 |

* cited by examiner

CONT. FROM FIG. 13E(a)

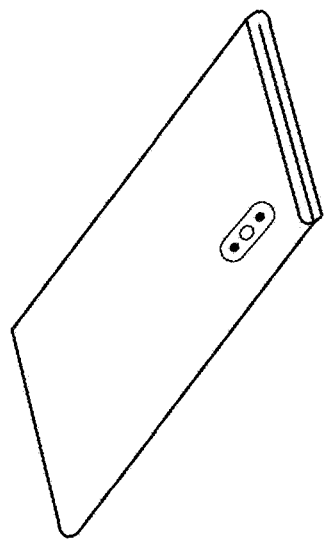
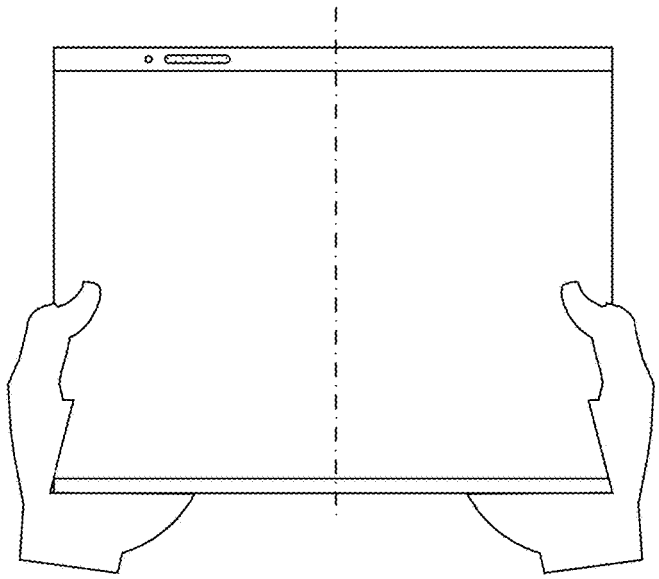
FIG. 25A                FIG. 25B
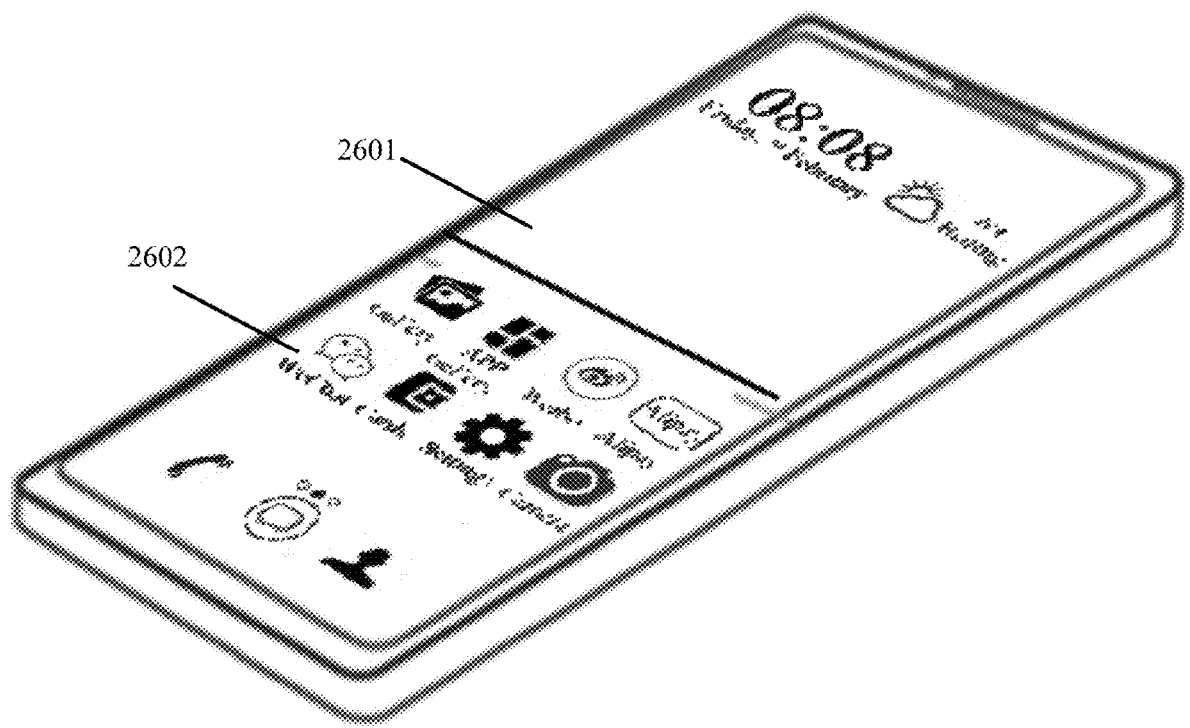
FIG. 26A

INTERFACE DISPLAY METHOD AND DEVICE

CROSS-REFERENCE TO RELATED APPLICATIONS

This application is a national stage of International Application No. PCT/CN2020/107997, filed on Aug. 7, 2020, which claims priority to Chinese Patent Application No. 201910755338.0, filed on Aug. 15, 2019. Both of the aforementioned applications are hereby incorporated by reference in their entireties.

TECHNICAL FIELD

Embodiments of this application relate to the field of electronic technologies, and in particular, to an interface display method and a device.

BACKGROUND

With the development of electronic technologies, functions of applications in electronic devices such as mobile phones are increasing. An application such as a voice assistant or a global search may facilitate use and operations of a user. Currently, when the user uses the application such as the voice assistant or the global search, an application interface of the voice assistant or the global search usually floats on an original interface of an electronic device, and blocks the original interface.

For example, refer to FIG. 1A. The original interface is a home screen, and when the user uses the voice assistant, the electronic device displays an interface of the voice assistant on the home screen in a floating manner. For another example, refer to FIG. 1B. When the user uses the voice assistant, the electronic device displays a floating dock 01 of the voice assistant on the original interface. Refer to FIG. 1C. After the electronic device detects a voice indication of the user, the electronic device pops up an interaction card 02 of the voice assistant. Consequently, the interaction card blocks the original interface of the electronic device, affects interaction between the user and the original interface, and brings poor visual experience and use experience for the user.

SUMMARY

Embodiments of this application provide an interface display method and a device. An original interface may be moved to reserve space for displaying an interface of a first application such as a voice assistant, so that the interface of the first application does not block the original interface. This helps a user interact with the original interface and the interface of the first application.

To achieve the foregoing objectives, the following technical solutions are used in the embodiments of this application.

According to one aspect, an interface display method is provided in the technical solutions of this application, and is applied to an electronic device. The electronic device includes a screen, and the screen is used for interface display. The method includes: The electronic device displays a first interface; the electronic device detects an operation in which a user indicates to start a first application; and the electronic device displays the first interface in a first area of the screen, and displays a second interface in a second area of the screen, where the second interface is an interface of the first application, and the first area does not overlap the second area.

In this way, the electronic device may simultaneously display the first interface and the second interface, and the second interface does not float on the first interface. Therefore, the second interface and the first interface do not block each other, and the second interface does not affect interaction between the user and the first interface. An integrated display effect of the first interface and the second interface is better, and better immersive experience can be provided for the user.

In a possible embodiment, that the electronic device displays the first interface in a first area of the screen, and displays a second interface in a second area of the screen includes: The electronic device moves the first interface to reserve the second area on the screen, where the moved first interface occupies the first area; and the electronic device displays the second interface in the second area.

In this solution, the electronic device may move the first interface to reserve the space for displaying the second interface.

In another possible embodiment, if the electronic device is in portrait mode, a movement direction of the first interface is downward, and the second area is located above the first area; or a movement direction of the first interface is upward, and the second area is located below the first area. Alternatively, if the electronic device is in landscape mode, a movement direction of the first interface is leftward, and the second area is located on the right of the first area; or a movement direction of the first interface is rightward, and the second area is located on the left of the first area.

In this way, for different display modes, the electronic device may display the first interface and the second interface separately in different arrangement manners.

In another possible embodiment, the method further includes: If the electronic device detects a swipe operation performed by the user on the first interface, the electronic device displays content of the first interface in a scrolling manner.

In this solution, if the first interface is not fully displayed, other content of the first interface may be displayed for the user in a scrolling display manner.

In another possible embodiment, that the electronic device displays the first interface in a first area of the screen, and displays a second interface in a second area of the screen includes: The electronic device scales down the first interface to reserve the second area on the screen, where the scaled-down first interface occupies the first area. The electronic device displays the second interface in the second area.

In this solution, the electronic device may scale down the first interface to reserve the space for displaying the second interface.

In another possible embodiment, if the electronic device is in portrait mode, the first interface is scaled down to a lower part of the screen, and the second area is located above the first area; or the first interface is scaled down to an upper part of the screen, and the second area is located below the first area. Alternatively, if the electronic device is in landscape mode, the first interface is scaled down to a left part of the screen, and the second area is located on the right of the first area; or the first interface is scaled down to a right part of the screen, and the second area is located below the first area.

In this way, for different display modes, the electronic device may display the first interface and the second interface separately in different arrangement manners.

In another possible embodiment, the method further includes: If the electronic device detects a first interaction operation performed by the user on the first interface, the electronic device performs a response operation by using the first interface. Alternatively, if the electronic device detects a second interaction operation performed by the user on the second interface, the electronic device performs a response operation by using the second interface.

In this way, the user may not only interact with the first interface, but also interact with the second interface.

In another possible embodiment, the screen further includes a first mark, the first mark includes a third area or a first control, and the first mark is located between the first area and the second area, or the first mark is located in the first area and close to the second area, or the first mark is located in the second area and close to the first area. The method further includes: If the electronic device detects an operation of swiping from the first mark to the first area by the user, the electronic device scales down the first area, and correspondingly scales up the second area. If the electronic device detects an operation of swiping from the first mark to the second area by the user, the electronic device scales down the second area, and correspondingly scales up the first area.

In this solution, the user may adjust a size of the first interface and a size of the second interface.

In another possible embodiment, the second interface includes a first data object. The method further includes: The electronic device detects an operation of dragging the first data object from the second interface to the first interface by the user. The electronic device uses the first data object on the first interface.

In this solution, the user may drag a data object on the second interface to the first interface for use by the first interface.

In another possible embodiment, in a dragging process of the first data object, a shadow control of the first data object is displayed on the screen, and the shadow control moves with a hand.

In this way, the shadow control may help the user know that the data object is dragged currently, to provide a better visual effect for the user.

In another possible embodiment, that the electronic device uses the first data object on the first interface includes: The electronic device inserts the first data object into the first interface. Alternatively, the electronic device searches, by using an application corresponding to the first interface, for information associated with the first data object. Alternatively, the electronic device sends the first data object to another device by using an application corresponding to the first interface.

In other words, the first interface may use, in a plurality of manners, the data object dragged from the second interface.

In another possible embodiment, the first interface is an interface of an email application. That the electronic device inserts the first data object into the first interface includes: The electronic device inserts the first data object into a body part or an attachment part of an email on the first interface.

In this solution, the email application in the first interface may use the data object dragged from the second interface.

In another possible embodiment, the first interface is an interface of an instant messaging application. That the electronic device inserts the first data object into the first interface includes: The electronic device inserts the first data object into a message editing box of the first interface.

In this solution, the instant messaging application in the first interface may use the data object dragged from the second interface.

In another possible embodiment, the first interface is an interface of a memo application. That the electronic device searches, by using an application corresponding to the first interface, for information associated with the first data object includes: The electronic device searches, by using the memo application corresponding to the first interface, for a note associated with the first data object. The electronic device displays a search result on the first interface.

In this solution, the memo application in the first interface may use the data object dragged from the second interface.

In another possible embodiment, the first interface is an interface of an instant messaging application. That the electronic device sends the first data object to another device by using an application corresponding to the first interface includes: The electronic device sends the first data object to the another device by using the instant messaging application corresponding to the first interface.

In this solution, the instant messaging application in the first interface may send, to the another device, the data object dragged from the second interface.

In another possible embodiment, the second interface further includes an interactive control, and the method further includes: The electronic device detects an operation of tapping the interactive control by the user; and the electronic device performs a response operation on the first data object by using the first interface.

In this solution, an operation performed by the user on the interactive control in the second interface may be responded by using the first interface.

In another possible embodiment, the interaction control is a sending control. That the electronic device performs a response operation on the first data object by using the first interface includes: The electronic device sends the first data object to the another device by using the application corresponding to the first interface.

In this solution, in response to an operation performed by the user on the interactive control in the second interface, a data object on the second interface can be sent to another device by using the first interface.

In another possible embodiment, the first interface includes a second data object. The method further includes: The electronic device detects an operation of dragging the second data object from the first interface to the second interface by the user; and the electronic device uses the second data object on the second interface.

In this solution, the data object dragged from the first interface may be used on the second interface.

In another possible embodiment, that the electronic device uses the second data object on the second interface includes: The electronic device searches, by using an application corresponding to the second interface, for information associated with the second data object; and the electronic device displays a search result on the second interface.

In this solution, search or find can be performed on the second interface based on the data object dragged from the first interface.

In another possible embodiment, the second interface further includes a switching control. The method further includes: The electronic device detects an operation of tapping the switching control by the user; and the electronic device switches the second interface corresponding to the first application in the second area to a second interface corresponding to another first application.

In this solution, the electronic device may switch to display, in the second area, second interfaces corresponding to different first applications.

In another possible embodiment, the screen further includes a second mark, the second mark includes a fourth area or a second control, and the second mark is located between the first area and the second area, or the second mark is located in the first area and close to the second area, or the second mark is located in the second area and close to the first area. The method further includes: If the electronic device detects an operation of swiping from the second mark to the first area by the user, the electronic device displays the second interface in full screen, and stops displaying the first interface. Alternatively, if the electronic device detects an operation of swiping from the second mark to the second area by the user, the electronic device displays the first interface in full screen, and stops displaying the second interface.

In this solution, the electronic device may display the first interface or the second interface in full screen according to an indication of the user.

In another possible embodiment, the screen further includes a third control and a fourth control. The method further includes: If the electronic device detects an operation of tapping the third control by the user, the electronic device displays the first interface in full screen, and stops displaying the second interface. Alternatively, if the electronic device detects an operation of tapping the fourth control by the user, the electronic device displays the second interface in full screen, and stops displaying the first interface.

In this solution, the user may indicate, by using the third control, to display the first interface in full screen, and indicates, by using the fourth control, to display the second interface in full screen.

In another possible embodiment, the first interface is an interface of a second application.

In other words, the first interface is an interface of an application, and the application may be a third-party application, or may be a native application of an operating system of the electronic device.

In another possible embodiment, the first application is a voice assistant application or a search application.

In this solution, the first application may be an application having a search or find function, for example, a voice assistant or a global search application.

In another possible embodiment, the electronic device includes a window manager, and the first interface is displayed in a first window. That the electronic device moves the first interface to reserve the second area on the screen, where the moved first interface occupies the first area; and the electronic device displays the second interface in the second area includes: The window manager takes a screenshot of the first window and the first interface in the first window, to obtain a first image; the window manager overlays the first image on the first window to display the first image; the window manager gradually moves a location of the first image; the window manager creates a second window; the window manager gradually displays the second window and the second interface in the second window as the first image moves; the window manager stops moving the first image; the window manager removes the first picture; and the window manager displays the first window and the first interface in the first window at the location corresponding to the first image, where the first window is located in the first area, and the second window is located in the second area.

In this way, when the displaying the first interface in full screen is switched to simultaneously displaying the first interface and the second interface, an animation processing procedure may be simplified in a manner of moving a screenshot image, so that animation display is smoother, power consumption of a mobile phone may be reduced, and overall performance of the mobile phone may be improved.

In another possible embodiment, the electronic device includes a window manager, the first interface is displayed in a first window, and the second interface is displayed in a second window. That the electronic device displays the first interface in full screen, and stops displaying the second interface includes: The window manager takes a screenshot of the first window and the first interface in the first window, to obtain a first image; the window manager takes a screenshot of the second window and the second interface in the second window, to obtain a second image; the window manager overlays the first image on the first window to display the first image; the window manager overlays the second image on the second window to display the second image; the window manager gradually moves positions of the first image and the second image until the second image is removed from the screen; the window manager removes the first picture; and the window manager displays the first window and the first interface in the first window in full screen.

In this way, when the simultaneously displaying the first interface and the second interface is switched to displaying the first interface in full screen, an animation processing procedure may be simplified in a manner of moving screenshot images, so that animation display is smoother, power consumption of the mobile phone may be reduced, and overall performance of the mobile phone may be improved.

In another possible embodiment, the electronic device includes an input/output system, the first interface is located in a first window, and the second interface is located in a second window. After the first interface moves downward and the electronic device displays the first interface in a first area of the screen, and displays a second interface in a second area of the screen, the method further includes: The input/output system detects a touch operation performed by the user on a first location on the first interface, where first coordinates of the first location are (x, y); and the input/output system remaps the first coordinates of the first location to second coordinates, where the second coordinates are (x, y−H), H is a height of the second window in a vertical direction, and the second coordinate is used by the first interface to determine a location of the touch operation.

In this way, the application corresponding to the second interface may determine a location of a touch event based on remapped window coordinates. Both the second interface and the first interface may respond to a touch operation of the user.

According to another aspect, an embodiment of this application provides a graphical user interface (GUI). The graphical user interface is stored in an electronic device, the electronic device includes a screen, a memory, and one or more processors, the one or more processors are configured to execute one or more computer programs stored in the memory. The graphical user interface includes: a first GUI displayed on the screen, where the first GUI includes a first interface; and a second GUI displayed on the screen in response to an operation of starting a first application, where the second GUI includes the first interface and a second interface, and the first interface does not overlap the second interface.

In a possible embodiment, the first interface on the second GUI is an interface obtained after the first interface on the first GUI is moved or scaled down.

In another possible embodiment, if the electronic device is in portrait mode, the second interface on the second GUI is located above or below the first interface. Alternatively, if the electronic device is in landscape mode, the second interface on the second GUI is located on the left or right of the first interface.

In another possible embodiment, the second GUI further includes a first mark, the first mark includes a first area or a first control, and the first mark is located between the first interface and the second interface, or the first mark is located in the first interface and close to the second interface, or the first mark is located in the second interface and close to the first interface. The graphical user interface further includes: a third GUI displayed on the screen in response to an operation of swiping from the first mark to the first interface, where the third GUI includes the second interface and the first interface, a size of the second interface on the third GUI is greater than a size of the second interface on the second GUI, and a size of the first interface on the third GUI is less than a size of the first interface on the second GUI; or a fourth GUI displayed on the screen in response to an operation of swiping from the first mark to the second interface, where the fourth GUI includes the second interface and the first interface, a size of the second interface on the fourth GUI is less than a size of the second interface on the second GUI, and a size of the first interface on the fourth GUI is greater than a size of the first interface on the second GUI.

In another possible embodiment, the second interface on the second GUI includes a first data object. The graphical user interface further includes: a fifth GUI displayed on the screen in response to an operation of dragging the first data object, where the fifth GUI includes a shadow control of the first data object, the first interface, and the second interface, and the shadow control moves with a hand; and a sixth GUI displayed on the screen in response to an operation of dragging the first data object to the first interface, where the sixth GUI includes the first interface and the second interface, and the first interface includes the first data object.

In another possible embodiment, the first interface is an interface of an email application, and a body part or an attachment part of an email on the first interface on the sixth GUI includes the first data object; or the first interface is an interface of an instant messaging application, and a message editing box of the first interface on the sixth GUI includes the first data object.

In another possible embodiment, the second interface on the second GUI includes a second data object. The graphical user interface further includes: a seventh GUI displayed on the screen in response to an operation of dragging the second data object, where the seventh GUI includes a shadow control of the first data object, the first interface, and the second interface, and the shadow control moves with a hand; and an eighth GUI displayed on the screen in response to an operation of dragging the second data object to the second interface, where the eighth GUI includes the first interface and the second interface, and the second interface includes the second data object.

In another possible embodiment, the second interface on the second GUI further includes a switching control. The graphical user interface further includes: a ninth GUI displayed on the screen in response to an operation of tapping the switching control, where the ninth GUI includes the first interface and a second interface; and the second interface on the ninth GUI and the second interface on the second GUI correspond to different first applications.

In another possible embodiment, the second GUI further includes a second mark, the second mark includes a second area or a second control, and the second mark is located between the first interface and the second interface, or the second mark is located in the first interface and close to the second interface, or the second mark is located in the second interface and close to the first interface. The graphical user interface further includes: a tenth GUI displayed on the screen in response to an operation of swiping from the second mark to the first interface, where the tenth GUI includes the second interface and the first interface, a size of the second interface on the tenth GUI is greater than the size of the second interface on the second GUI, and a size of the first interface on the tenth GUI is less than the size of the first interface on the second GUI; or an eleventh GUI displayed on the screen in response to an operation of swiping from the second mark to the second interface, where the eleventh GUI includes the second interface and the first interface, a size of the second interface on the eleventh GUI is greater than the size of the second interface on the second GUI, and a size of the first interface on the eleventh GUI is less than the size of the first interface on the second GUI.

In another possible embodiment, the second GUI further includes a third control and a fourth control. The graphical user interface further includes: a twelfth GUI displayed on the screen in response to an operation of tapping the third control, where the twelfth GUI includes the first interface displayed in full screen; or a thirteenth GUI displayed on the screen in response to an operation of tapping the fourth control, where the thirteenth GUI includes the second interface displayed in full screen.

In another possible embodiment, the first interface is an interface of a second application.

In another possible embodiment, the first application is a voice assistant application or a search application.

According to another aspect, an embodiment of this application provides an interface display apparatus. The apparatus is included in an electronic device. The apparatus has a function of implementing behavior of the electronic device in any method according to the foregoing aspects and the possible embodiments. The function may be implemented by hardware, or may be implemented by hardware executing corresponding software. The hardware or the software includes at least one module or unit corresponding to the function, for example, a display module or unit, a detection module or unit, a movement module or unit, a scale-down module or unit, or a determining module or unit.

According to another aspect, an embodiment of this application provides an electronic device, including one or more processors, a screen used for displaying an interface, and a memory. The memory stores code. When the code is executed by the one or more processors, the electronic device is enabled to perform the interface display method according to any one of the possible embodiments of the foregoing aspects.

According to another aspect, an embodiment of this application provides a computer storage medium, including computer instructions. When the computer instructions are run on an electronic device, the electronic device is enabled to perform the interface display method according to any one of the possible embodiments of the foregoing aspects.

According to still another aspect, an embodiment of this application provides a computer program product. When the computer program product is run on a computer, the computer is enabled to perform the interface display method according to any one of the possible embodiments of the foregoing aspects.

According to yet another aspect, an embodiment of this application provides a chip system. The chip system is applied to an electronic device. The chip system includes one or more interface circuits and one or more processors. The interface circuit and the processor are interconnected through a line. The interface circuit is configured to receive a signal from a memory of the electronic device, and send the signal to the processor, where the signal includes computer instructions stored in the memory. When the processor executes the computer instructions, the electronic device is enabled to perform the interface display method according to any one of the possible embodiments of the foregoing aspects.

BRIEF DESCRIPTION OF DRAWINGS

FIG. 25A and FIG. 25B are schematic diagrams of another group of interfaces according to an embodiment of this application;

FIG. 26A and FIG. 26B are schematic diagrams of another group of interfaces according to an embodiment of this application;

DESCRIPTION OF EMBODIMENTS

The following describes the technical solutions in the embodiments of this application with reference to the accompanying drawings in the embodiments of this application. In the descriptions of the embodiments of this application, unless otherwise specified, "/" means "or". For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions of the embodiments of this application, "a plurality of" means two or more.

Figure 1A:
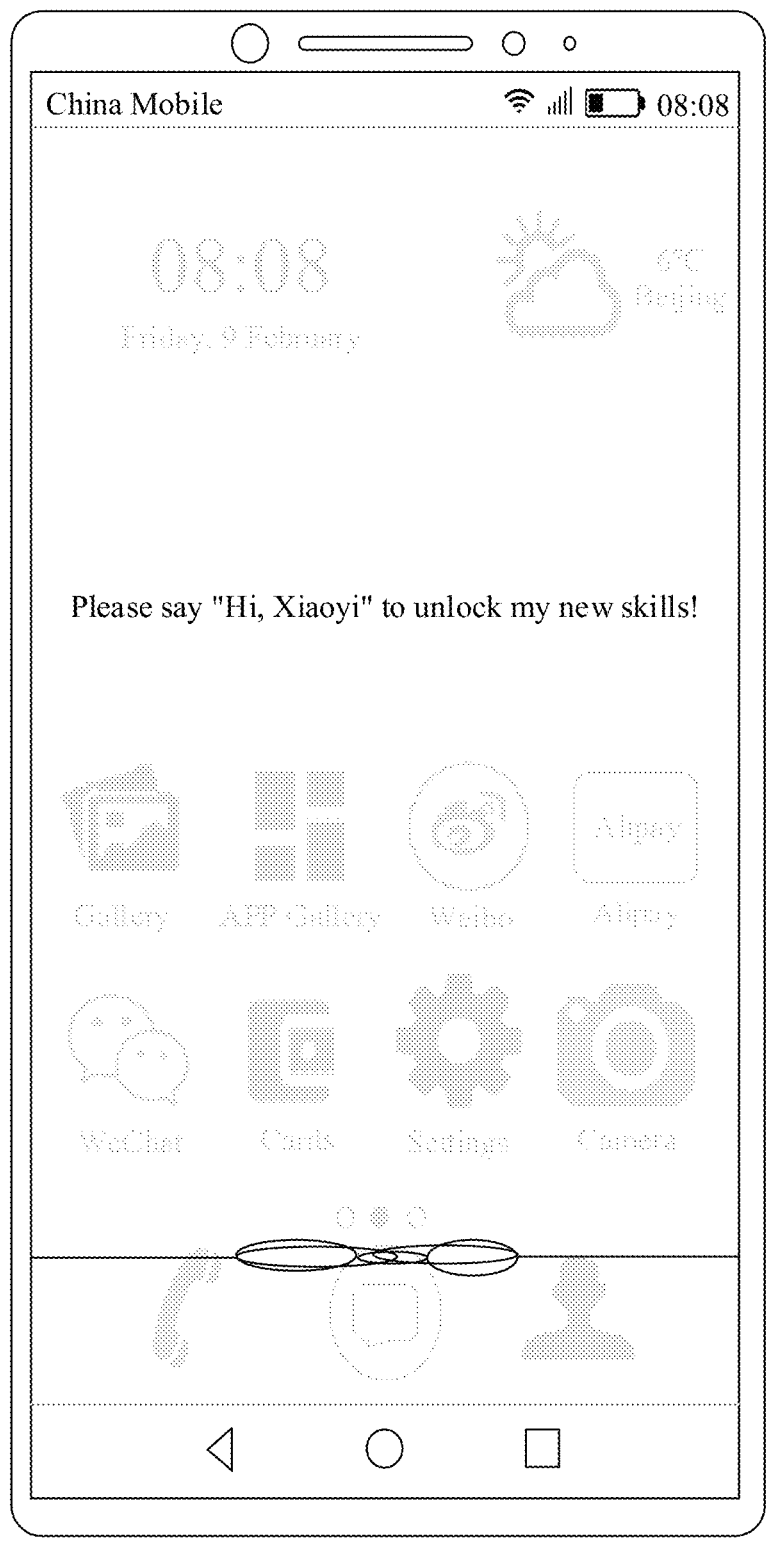
FIG. 1A to FIG. 1D are schematic diagrams of a group of interfaces according to the conventional technology.
Figure 1B:
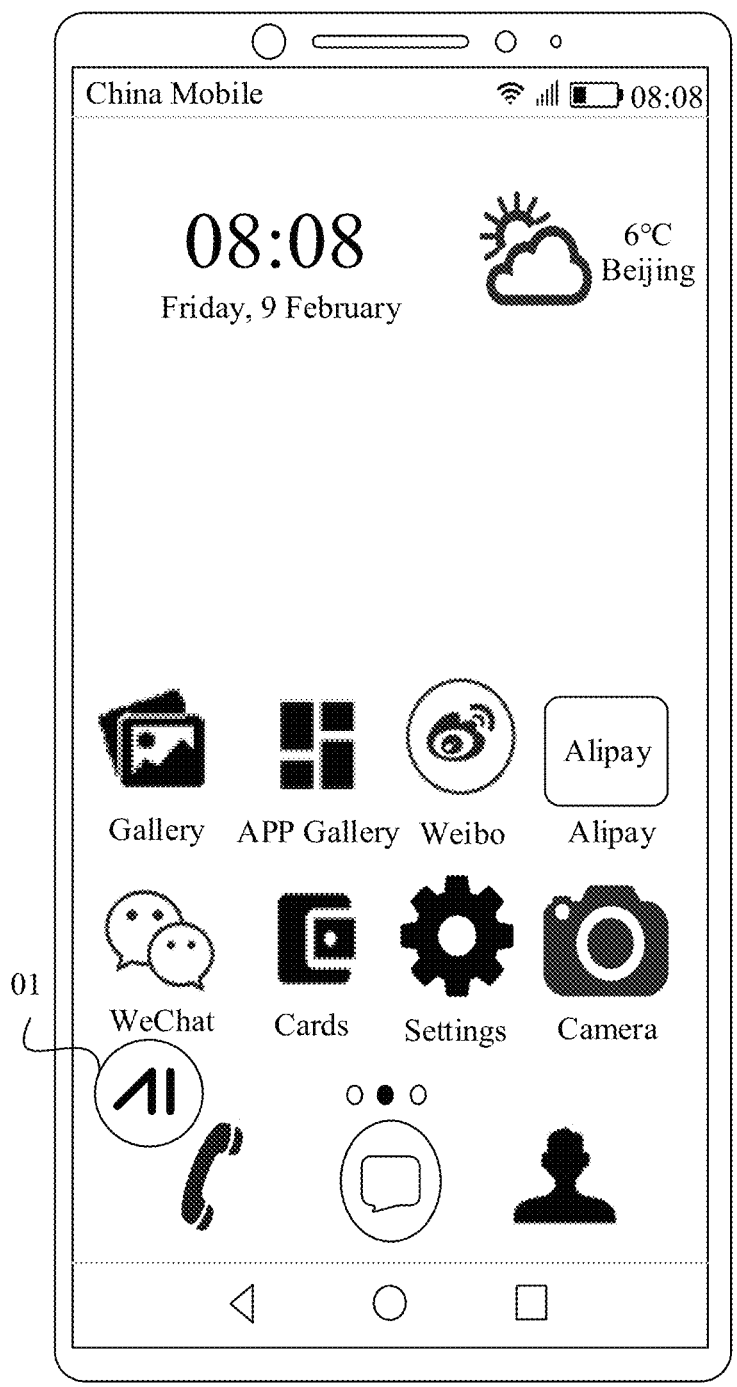
Figure 1C:
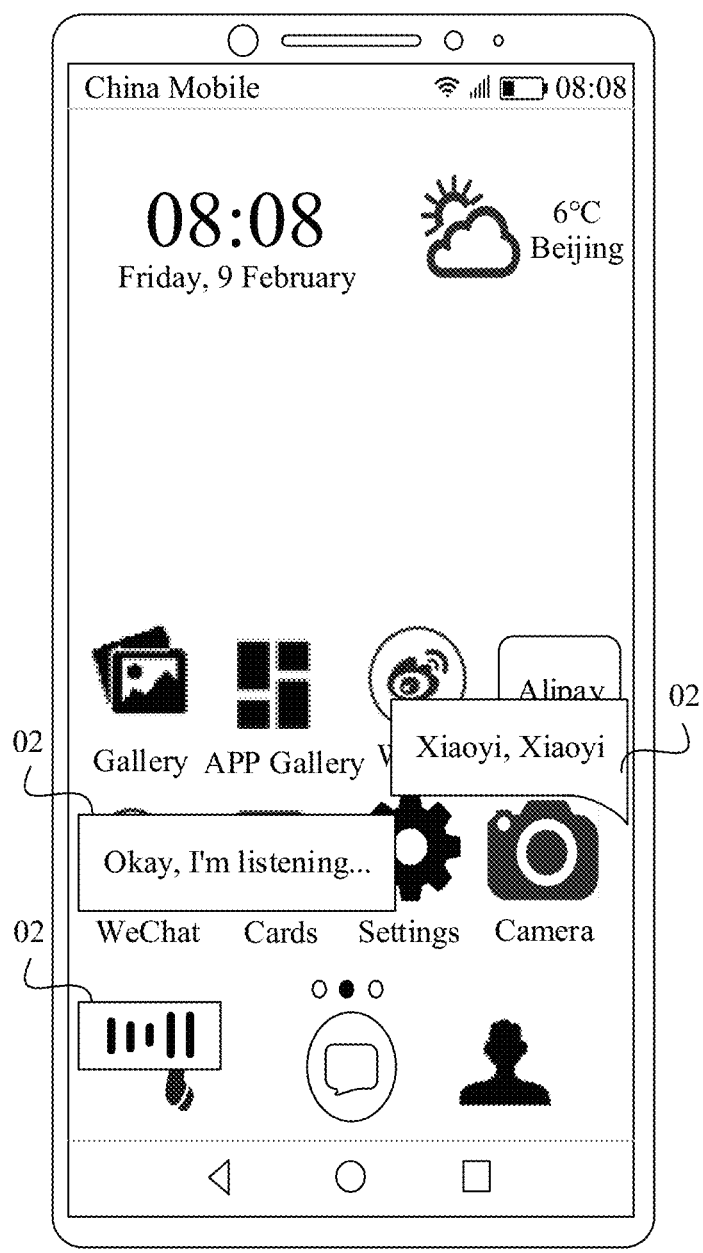

In the conventional technology shown in FIG. 1A to FIG. 1C, after an electronic device displays an original interface, when a user uses a voice assistant or a global search, an interface of the voice assistant or the global search is displayed on the original interface in a floating manner, and the interface of the voice assistant or the global search blocks the original interface of the electronic device. As a result, interaction between the user and the original interface is affected.

An embodiment of this application provides an interface display method, and the method may be applied to an electronic device. Based on the method, when displaying an original first interface, if detecting an operation of starting a first application, the electronic device moves the first interface to reserve display space (or referred to as a display area) for a second interface of the first application such as a voice assistant or a global search. The electronic device displays the second interface in the reserved space. In this way, the electronic device may simultaneously display the first interface and the second interface, and the second interface does not float on the first interface. Therefore, the second interface does not block the first interface, and does not affect interaction between a user and the first interface. An integrated display effect of the first interface and the second interface is better, and better immersive experience can be provided for the user.

In addition, after the electronic device displays the first interface and the second interface, the user may not only interact with the first interface, but also interact with the second interface. Furthermore, data may be also exchanged between the first interface and the second interface by using a drag operation.

The electronic device may be a mobile phone, a tablet computer, a wearable device, a vehicle-mounted device, an augmented reality (AR)/virtual reality (VR) device, a notebook computer, an ultra-mobile personal computer (UMPC), a netbook, a personal digital assistant (pPDA), or the like. A specific type of the electronic device is not limited in the embodiments of this application.

Figure 2:
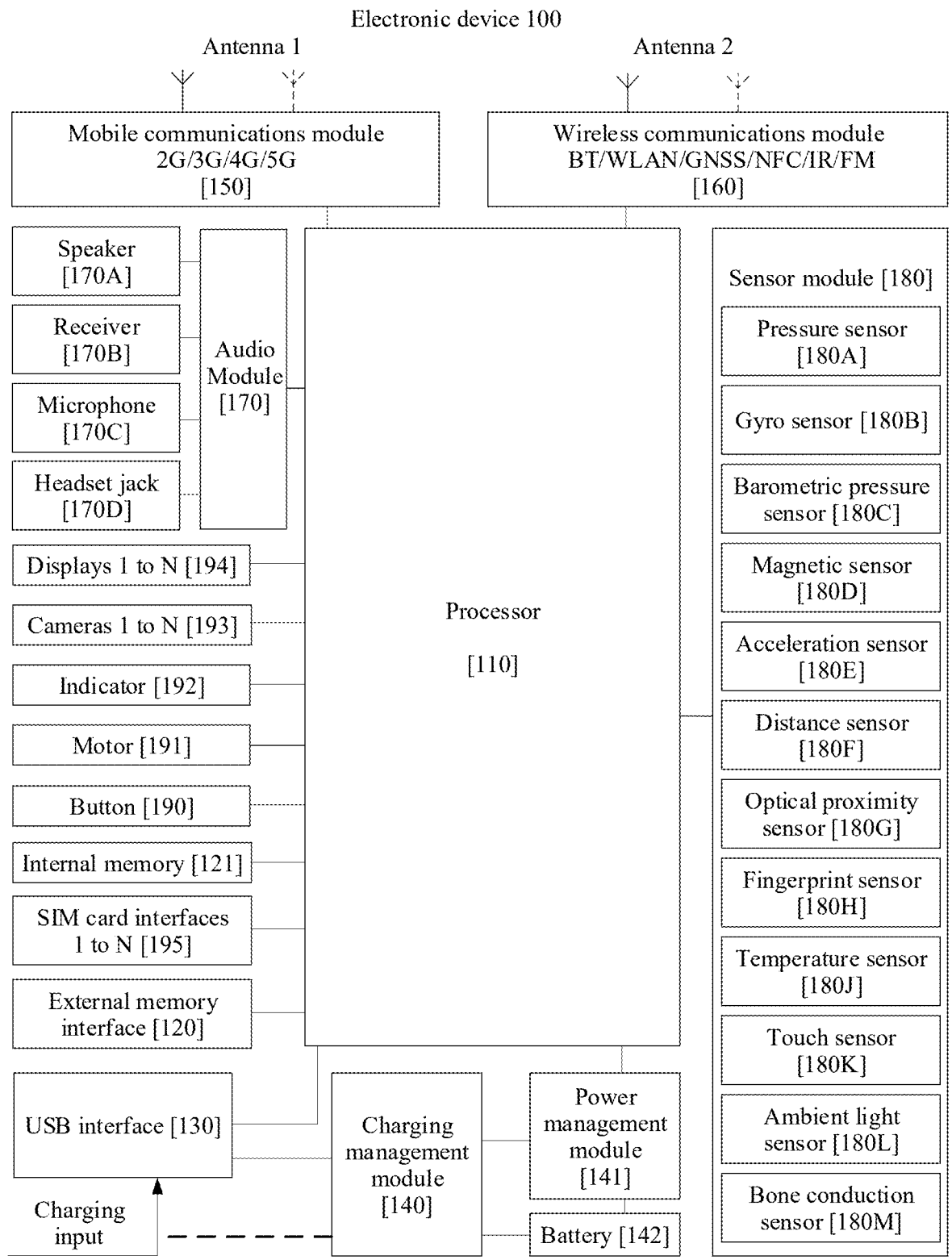
FIG. 2 is a schematic diagram of a structure of an electronic device according to an embodiment of this application.

For example, FIG. 2 is a schematic diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type C port, or the like. The USB interface 130 may be configured to connect to a charger to charge the electronic device 100, or may be configured to transmit data between the electronic device 100 and a peripheral device, or may be configured to connect to a headset, to play audio through the headset. This interface may be further configured to connect to another electronic device such as an AR device.

The charging management module 140 is configured to receive charging input from the charger. The charger may be a wireless charger or a wired charger. In some embodiments in which wired charging is used, the charging management module 140 may receive charging input from the wired charger through the USB interface 130. In some embodiments of wireless charging, the charging management module 140 may receive wireless charging input through a wireless charging coil of the electronic device 100. The charging management module 140 may further supply power to the electronic device by using the power management module 141 when the battery 142 is charged.

The power management module 141 is configured to connect to the battery 142, the charging management module 140, and the processor 110. The power management module 141 receives input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (e.g., electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may further be multiplexed to improve antenna utilization. For example, the antenna 1 may be multiplexed as a diversity antenna of a wireless local area network. In some other embodiments, an antenna may be used in combination with a tuning switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 100. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 of the electronic device 100 are coupled, and the antenna 2 and the wireless communications module 160 are coupled, so that the electronic device 100 may communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may use a liquid crystal display (LCD), an organic light-emitting diode (OLED), an active-matrix organic light-emitting diode (AMOLED), a flexible light-emitting diode (FLED), a mini LED, a micro LED, a micro OLED, a quantum dot light-emitting diode (QLED), or the like. In some embodiments, the electronic device 100 may include one or N displays 194, where N is a positive integer greater than 1.

In some embodiments, the display 194 may be configured to: after detecting an operation of starting the first application by the user, move the original interface to reserve the space for displaying an interface of the first application, so that the interface of the first application does not float on the original interface.

The electronic device 100 can implement the photographing function by using the ISP, the camera 193, the video codec, the GPU, the display 194, the application processor, and the like.

The ISP is configured to process data fed back by the camera 193. For example, during photographing, a shutter is pressed, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on an image noise, luminance, and complexion. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more video codecs. In this way, the electronic device 100 can play or record videos of a plurality of coding formats, for example, moving picture experts group (moving picture experts group, MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be configured to be connected to an external memory card such as a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121 to implement various function applications and data processing of the electronic device 100. The internal memory 121 may include a program storage area and a data storage area. The program storage area may store an operating system, an application required by at least one function (for example, a voice playing function or an image playing function), and the like. The data storage area may store data (such as audio data and a phone book) and the like that are created during use of the electronic device 100. In addition, the internal memory 121 may include a high-speed random access memory, and may further include a nonvolatile memory, for example, at least one magnetic disk storage device, a flash memory device, or a universal flash storage (UFS).

In some embodiments, the processor 110 runs the instructions stored in the internal memory 121, so that when the first interface is displayed, if the operation of starting the first application is detected, the processor 110 moves the first interface to reserve the space for displaying the interface of the first application, so that the interface of the first application no longer blocks the first interface, and the user directly interacts with the first interface and the interface of the first application.

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may further be configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode through the speaker 170A.

The receiver 170B, also referred to as an "earpiece", is configured to convert an audio electrical signal into a sound signal. When a call is answered or voice information is received through the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may place the mouth of the user near the microphone 170C to make a sound, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, so as to implement a directional recording function and the like.

In some embodiments, the microphone 170C may be configured to detect a voice instruction that the user indicates to start the first application such as a voice assistant, a voice instruction that the user interacts with the voice assistant, and the like.

The headset jack 170D is configured to connect to a wired headset. The headset jack 170D may be a USB interface 130, or may be a 3.5 mm open mobile terminal platform (open mobile terminal platform, OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects a strength of the touch operation through the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an application icon "Messaging", an instruction for viewing an SMS message is executed. When a touch operation whose touch operation intensity is greater than or equal to the first pressure threshold is performed on an application icon "Messaging", an instruction for creating an SMS message is executed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 shakes, and calculates, based on the angle, a distance for which a lens module needs to compensate, and allows the lens to eliminate the shake of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a flip phone, the electronic device 100 can detect opening and closing of a flip cover by using the magnetic sensor 180D. Further, a feature such as automatic unlocking upon opening of the flip cover is set based on a detected opening or closing state of the flip cover.

The acceleration sensor 180E may detect magnitudes of accelerations of the electronic device 100 in various directions (usually on three axes), and may detect magnitude and a direction of gravity when the electronic device 100 is still. The acceleration sensor 180E may be further configured to identify a posture of the electronic device, and applied to an application such as switching between landscape mode and portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing.

The optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be configured to automatically unlock and lock a screen in a flip cover mode and a pocket mode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint-based unlocking, application access locking, fingerprint-based photographing, fingerprint-based call answering, and the like by using a feature of the collected fingerprint.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is lower than another threshold, the electronic device 100 heats up the battery 142, to avoid abnormal shutdown of the electronic device 100 due to a low temperature. In some other embodiments, when the temperature is lower than still another threshold, the electronic device 100 boosts an output voltage of the battery 142 to avoid abnormal shutdown due to a low temperature.

The touch sensor 180K is also referred to as a "touch panel". The touch sensor 180K may be disposed in the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. Visual output related to the touch operation may be provided on the display 194. In some other embodiments, the touch sensor 180K may alternatively be disposed on a surface of the electronic device 100 and is located at a position different from that of the display 194.

In some embodiments, the touch sensor 180K may be configured to detect a touch operation in which the user indicates to start the first application such as a voice assistant, a drag operation performed by the user between the original interface and the interface of the first application, and the like.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may further be customized.

The indicator 192 may be an indicator, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be inserted into the same SIM card interface 195 at the same time. The plurality of cards may be of a same type or of different types. The SIM card interface 195 is applicable to different types of SIM cards. The SIM card interface 195 is also applicable to an external storage card. The electronic device 100 interacts with a network through the SIM card, to implement functions such as calling and data communications. In some embodiments, the electronic device 100 uses an eSIM, namely, an embedded SIM card. The eSIM card may be embedded into the electronic device 100, and cannot be separated from the electronic device 100.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

In this embodiment of this application, an operation detection component of the electronic device 100 may detect an operation in which the user indicates to start the first application. For example, the operation detection component may be the microphone 170C, the touch sensor 180K, or the like. The processor 110 controls to move the original interface, to reserve space for displaying the interface of the first application, so that the interface of the first application does not float on the original interface. The display 194 displays the original interface and the interface of the first application. The touch sensor 180K may further detect a drag operation performed by the user between the original interface and the interface of the first application. The processor 110 implements interaction between the original interface and the interface of the first application based on the drag operation.

The following describes the interface display method provided in this embodiment of this application by using an example in which the electronic device having the structure shown in FIG. 2 is a mobile phone.

The user uses the mobile phone, and the mobile phone displays the first interface. The first interface may be a home screen. Alternatively, the first interface may be an interface of any application running on the mobile phone. For example, the first interface may be a settings interface, a WeChat interface, a player interface, a browser interface, a gallery interface, a camera interface, a Weibo interface, a reader interface, an email interface, a game interface, or the like. For example, refer to FIG. 3A. The first interface is a home screen.

The mobile phone detects an operation of starting the first application by the user. The first application is a preset specific application. For example, the first application may be an application such as a voice assistant or a global search. The first application may be an application that does not run currently, or may be an application that currently runs in the background.

The operation of starting the first application by the user is a preset operation, and there may be a plurality of operation manners specifically. An example in which the first application is a voice assistant is used for description. For example, the user speaks a wake-up word such as "wake up", to indicate to start the voice assistant. For another example, the user indicates to start the voice assistant by using a first touch operation. For example, the first touch operation may be an operation of swiping down from the top of a screen by the user; for another example, as shown in FIG. 3B, the first touch operation may be an operation of swiping down with two fingers by the user; and for another example, the first touch operation may be an operation of drawing a preset track, such as a circle track shown in FIG. 3C, on a screen by the user. For another example, the user indicates to start the voice assistant by using a first air-separated operation. For another example, as shown in FIG. 3D, the first touch operation may be an operation of pressing and holding a menu button in a navigation bar by the user.

After detecting the operation of starting the first application by the user, the mobile phone moves the first interface, to reserve display space for the second interface. The mobile phone displays the second interface in the space reserved after the first interface is moved. The second interface is the interface of the first application. Therefore, the mobile phone may simultaneously display an interface of the voice assistant and the first interface on the screen. This mode may be referred to as a half-screen mode.

In this way, when displaying the first interface, the mobile phone may display the interface of the first application in response to the operation of starting the first application by the user. In addition, the interface of the first application does not float on the first interface, so that the interface of the first application does not block the first interface. Therefore, the interface of the first application does not affect interaction between the user and the first interface, and user experience can be improved.

In some embodiments, the mobile phone may move the first interface downward, and display the interface of the first application in space reserved after the first interface is moved downward. Content at the bottom of the first interface cannot be displayed because it is moved out of the screen. In addition, in a dynamic process in which the first interface is gradually moved and the interface of the first application is displayed, the mobile phone performs corresponding animation display.

Figure 4:
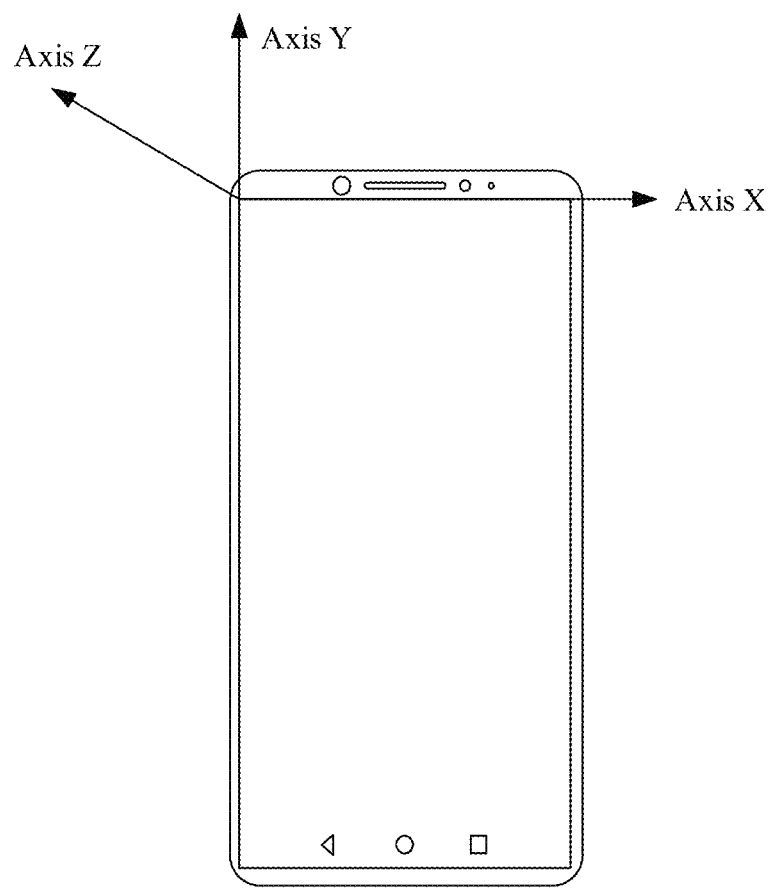
FIG. 4 is a schematic diagram of a coordinate system according to an embodiment of this application.

In other words, the mobile phone displays the first interface at the lower part of the screen, and displays the interface of the first application at the upper part of the screen in an extension manner. Refer to a schematic diagram of a coordinate system shown in FIG. 4. The mobile phone displays the interface of the first application in the Y axis direction of the screen in an extension manner. A location of the interface of the first application and a location of the first interface are the same in the Z axis direction, that is, the interface of the first application does not float on the first interface.

In this way, the user may view the interface of the specific first application at the top of the screen of the mobile phone each time by using the preset operation, to obtain consistent experience.

The following is mainly described by using an example in which the first application is the voice assistant.

Figure 5A:
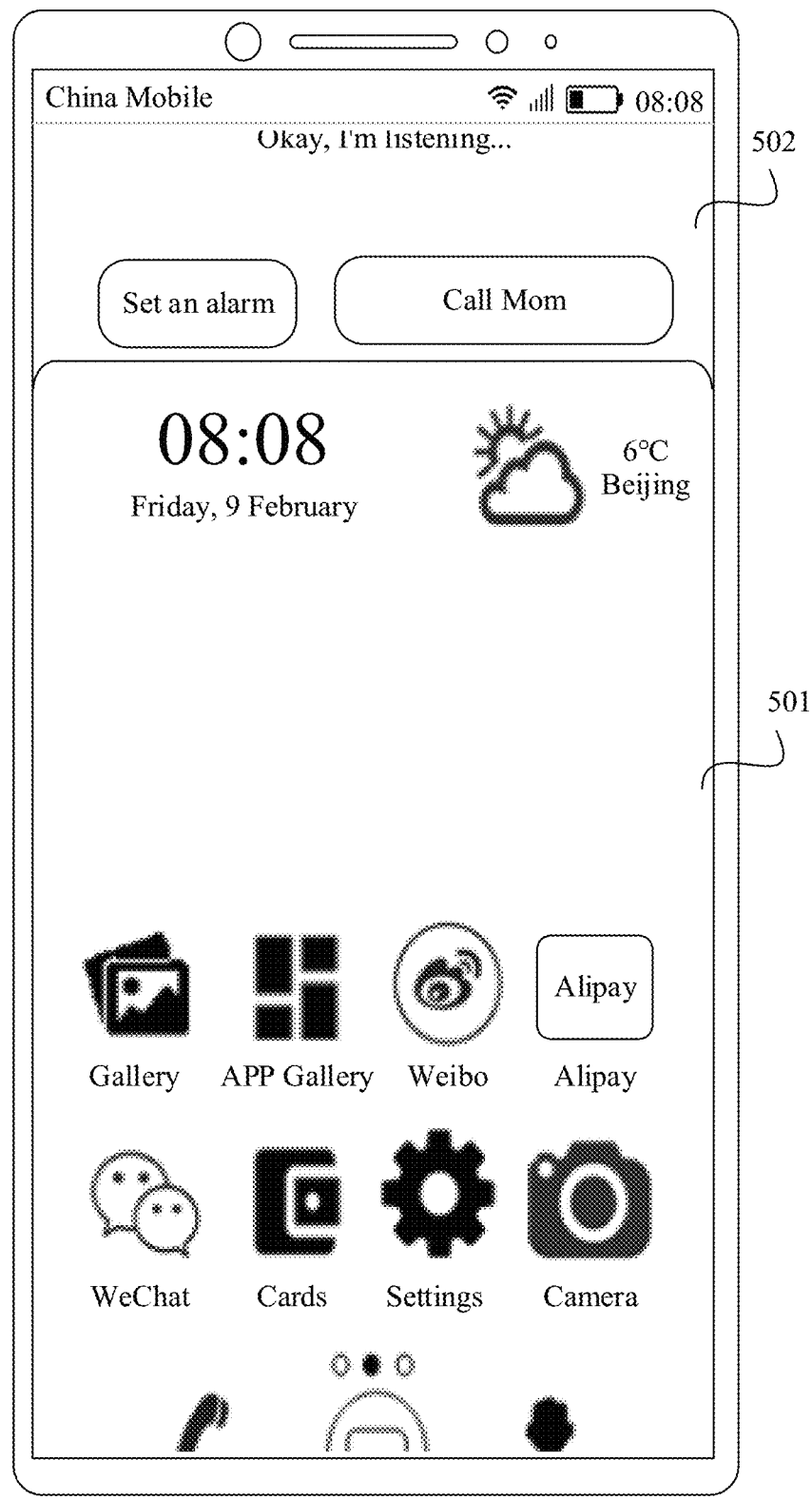
FIG. 5A and FIG. 5B are schematic diagrams of another group of interfaces according to an embodiment of this application.

The interface of the voice assistant may be displayed in a plurality of manners. For example, refer to FIG. 5A and FIG. 5B. A first interface 501 is a home screen, and the first interface 501 gradually moves downward (or is referred to as translation movement). As the first interface 501 moves downward, an interface 502 of the voice assistant gradually and dynamically switches in from the top of the screen. When the first interface 501 moves to reserve a second area 504 on the screen, the second area is used to display the second interface 502. After the first interface 501 is moved, an area occupied by the moved first interface 501 is a first area 503. In addition, the first area 503 and the second area 504 do not overlap, that is, the second interface 502 and the first interface 501 do not block each other. Therefore, visual experience provided for the user is that the interface of the voice assistant comes out from the top of the screen to push the first interface to move downward and occupy some display space of the first interface.

Figure 6A:
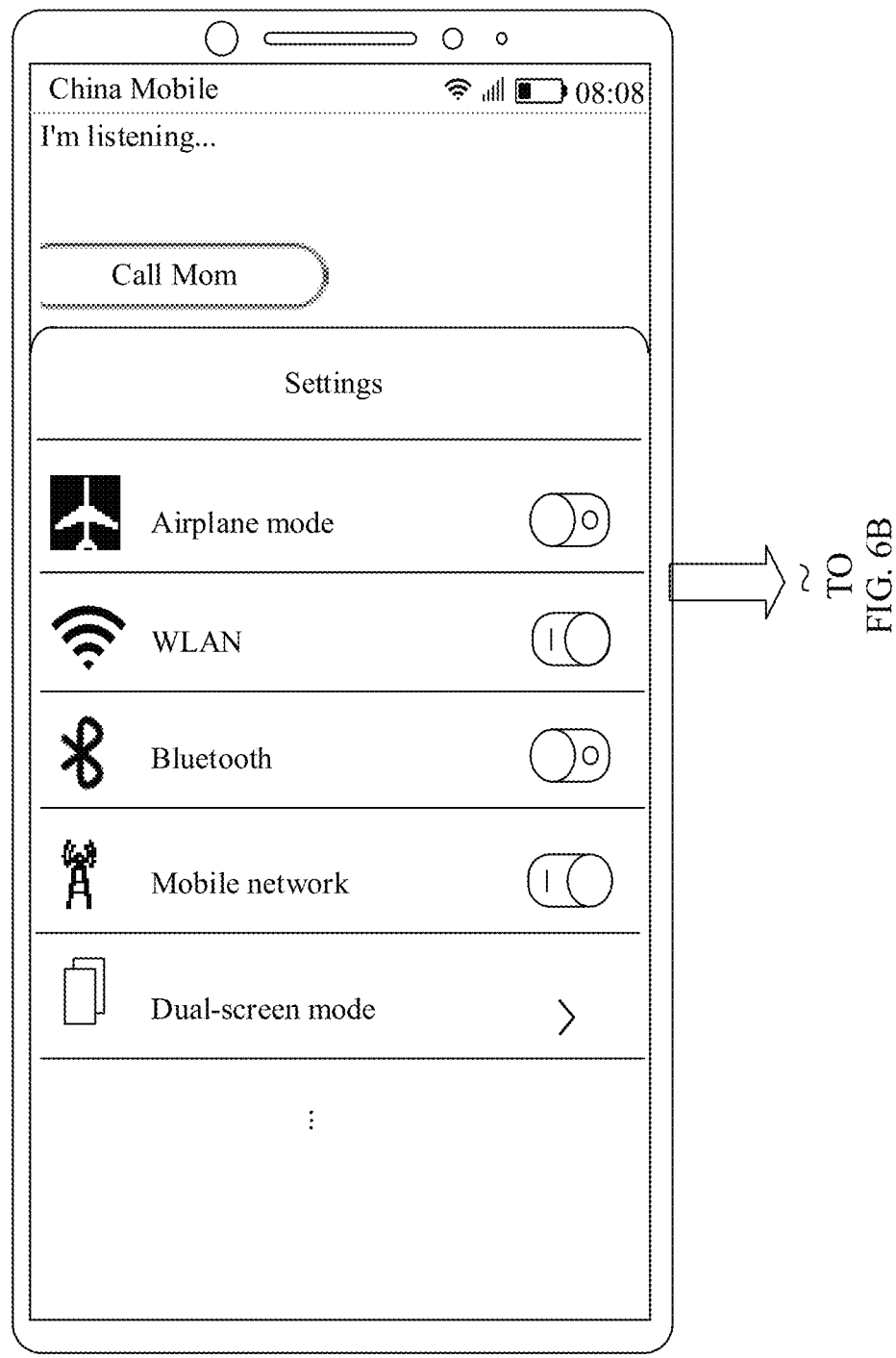
FIG. 6A to FIG. 6C are schematic diagrams of another group of interfaces according to an embodiment of this application.
Figure 6B:
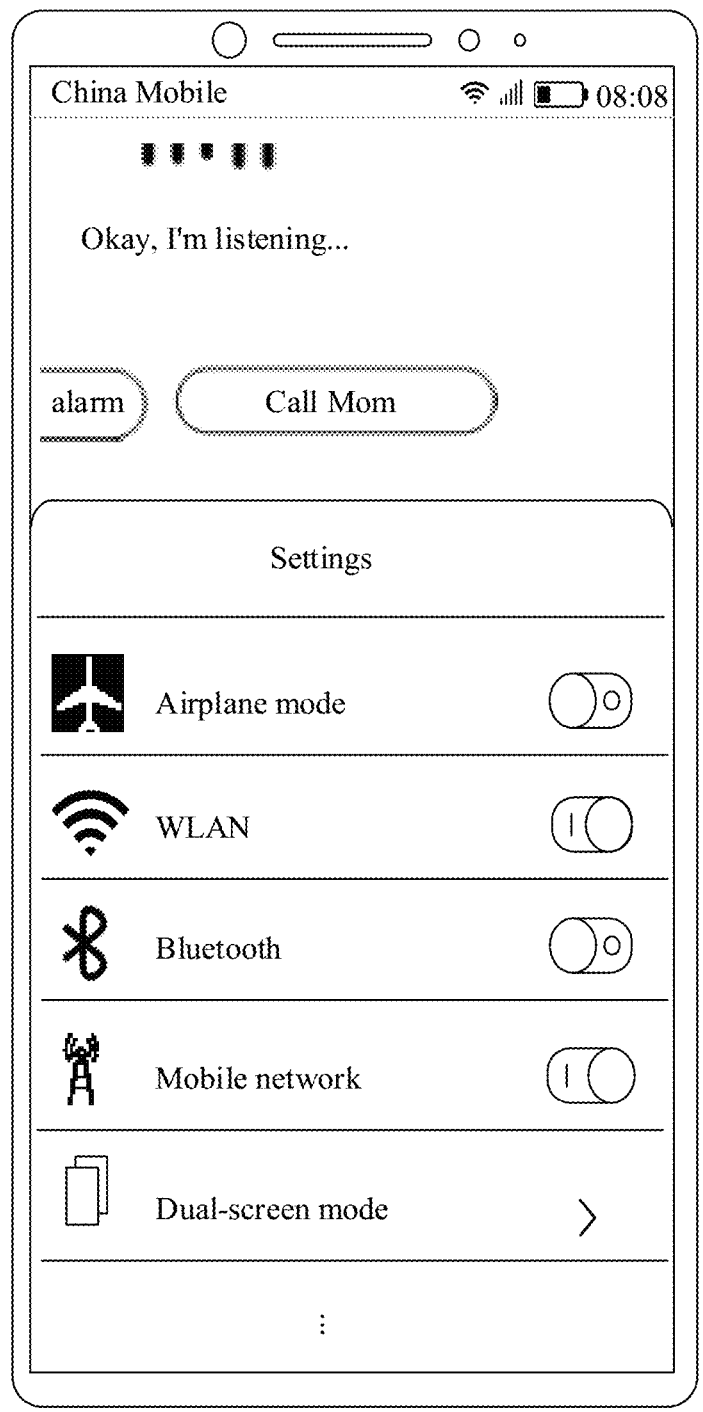
Figure 6C:
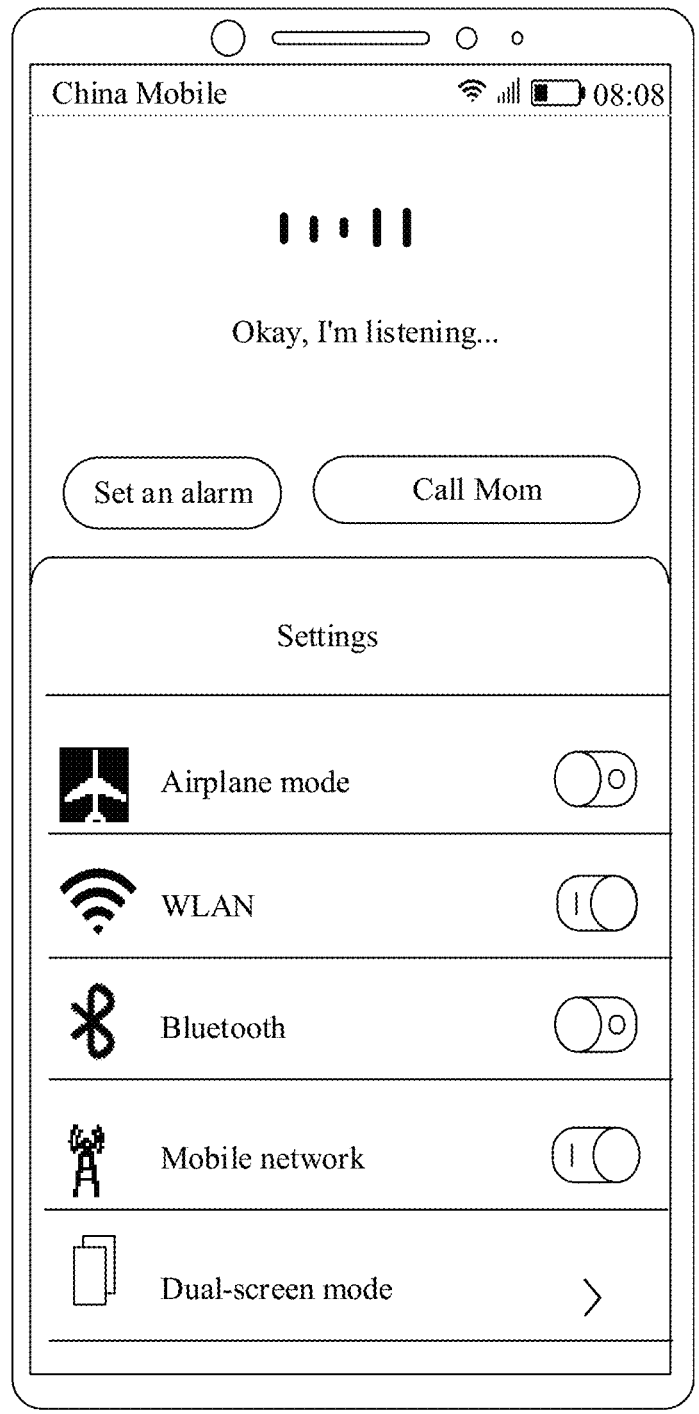

For another example, refer to FIG. 6A to FIG. 6C. The first interface gradually moves downward, and the interface of the voice assistant gradually and dynamically switches in from the upper left corner (or may be the upper right corner) of the screen. The first interface is a settings interface.

Figure 7A:
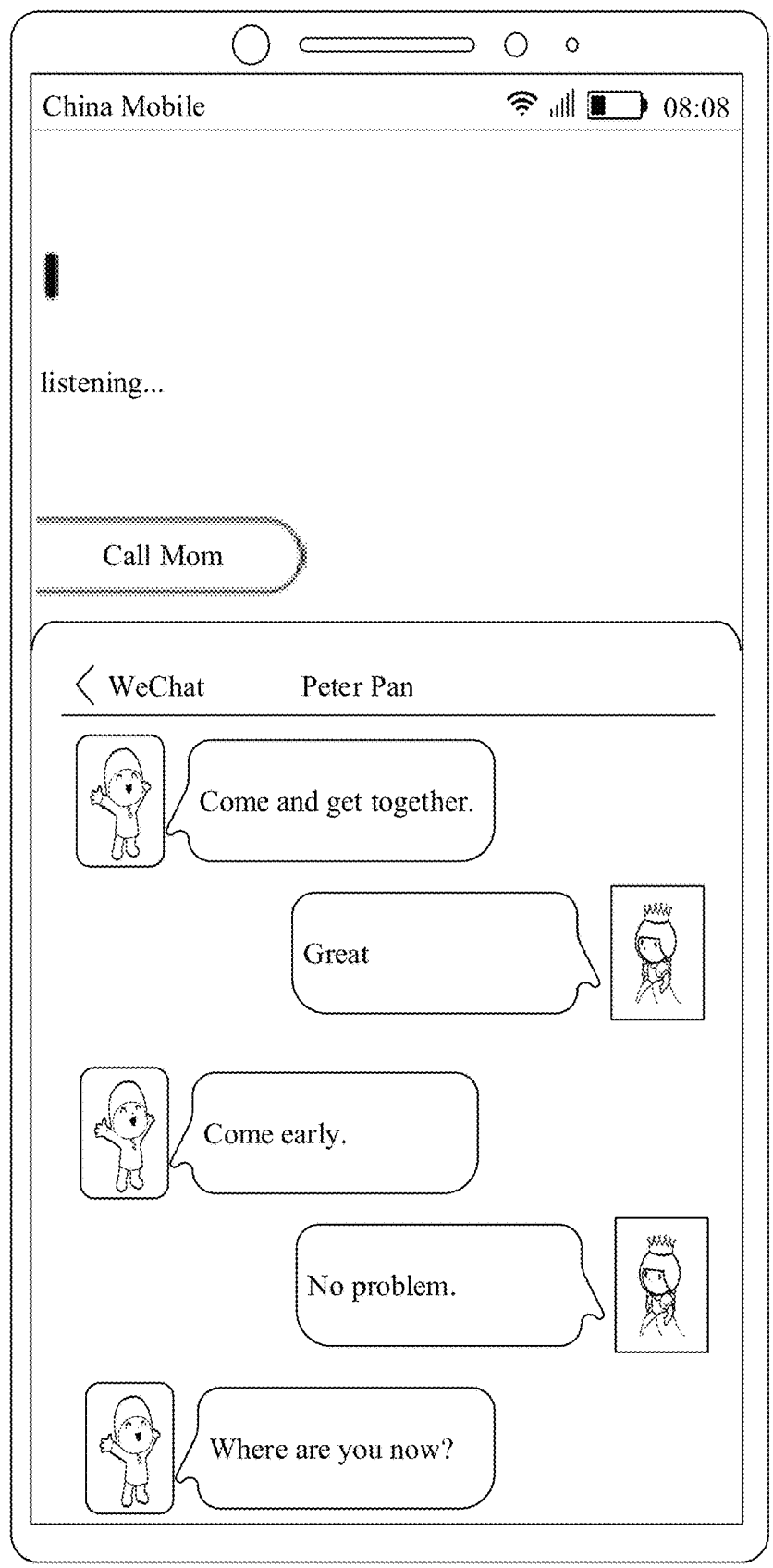
FIG. 7A to FIG. 7C are schematic diagrams of another group of interfaces according to an embodiment of this application.
Figure 7B:
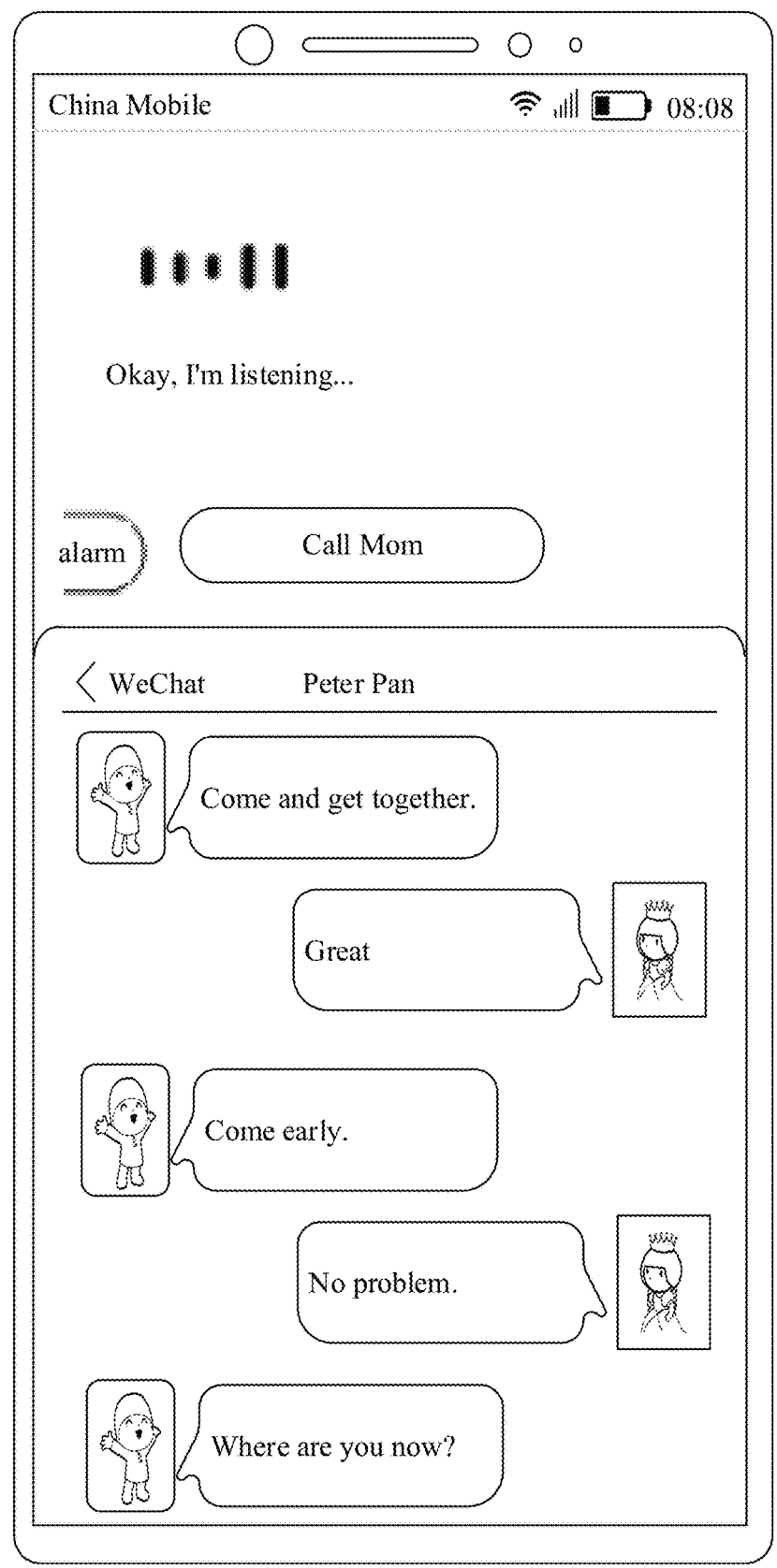
Figure 7C:
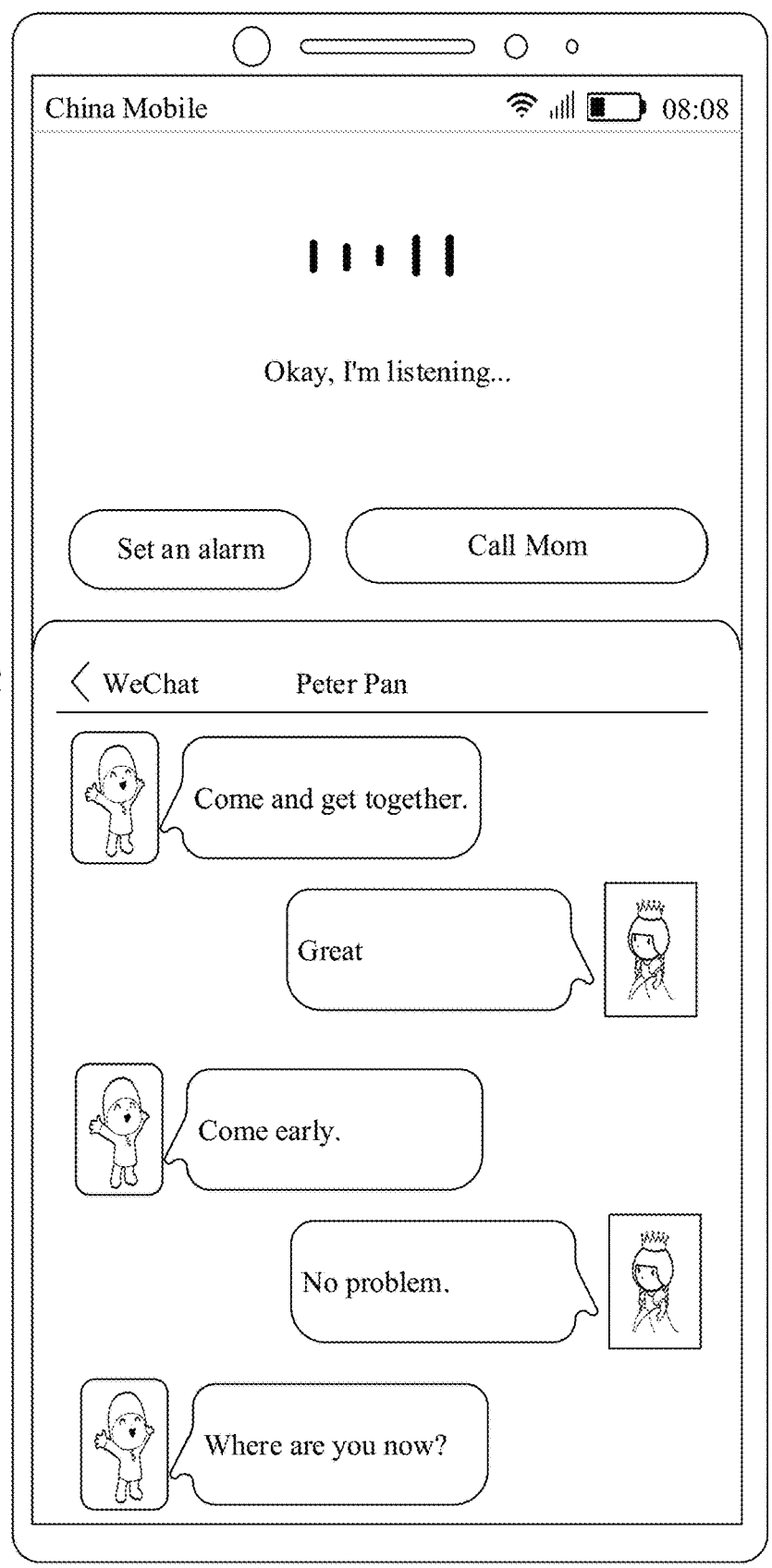

For another example, refer to FIG. 7A to FIG. 7C. The first interface gradually moves downward, and the interface of the voice assistant gradually and dynamically switches in from the left side (or may be the right side) of the upper part of the screen. The first interface is a WeChat interface.

In this embodiment of this application, fusion processing may be performed between the first interface and the interface of the voice assistant, to provide an integrated visual effect for the user, and improve immersive use experience of the user.

The first interface and the interface of the voice assistant may be separately displayed in two windows. In this embodiment of this application, a separation line between the two windows is canceled, that is, borders of the windows at a junction of the two windows are canceled. In addition, the interface of the voice assistant and the first interface may complement each other at display positions. For example, refer to FIG. 8A and FIG. 8B. At a rounded corner position in a dotted circle, the first interface and the interface of the voice assistant may complement each other. This can provide visual experience of an integrated interface for the user.

Figure 8A:
FIG. 8A to FIG. 8D are schematic diagrams of another group of interfaces according to an embodiment of this application.
Figure 8B:
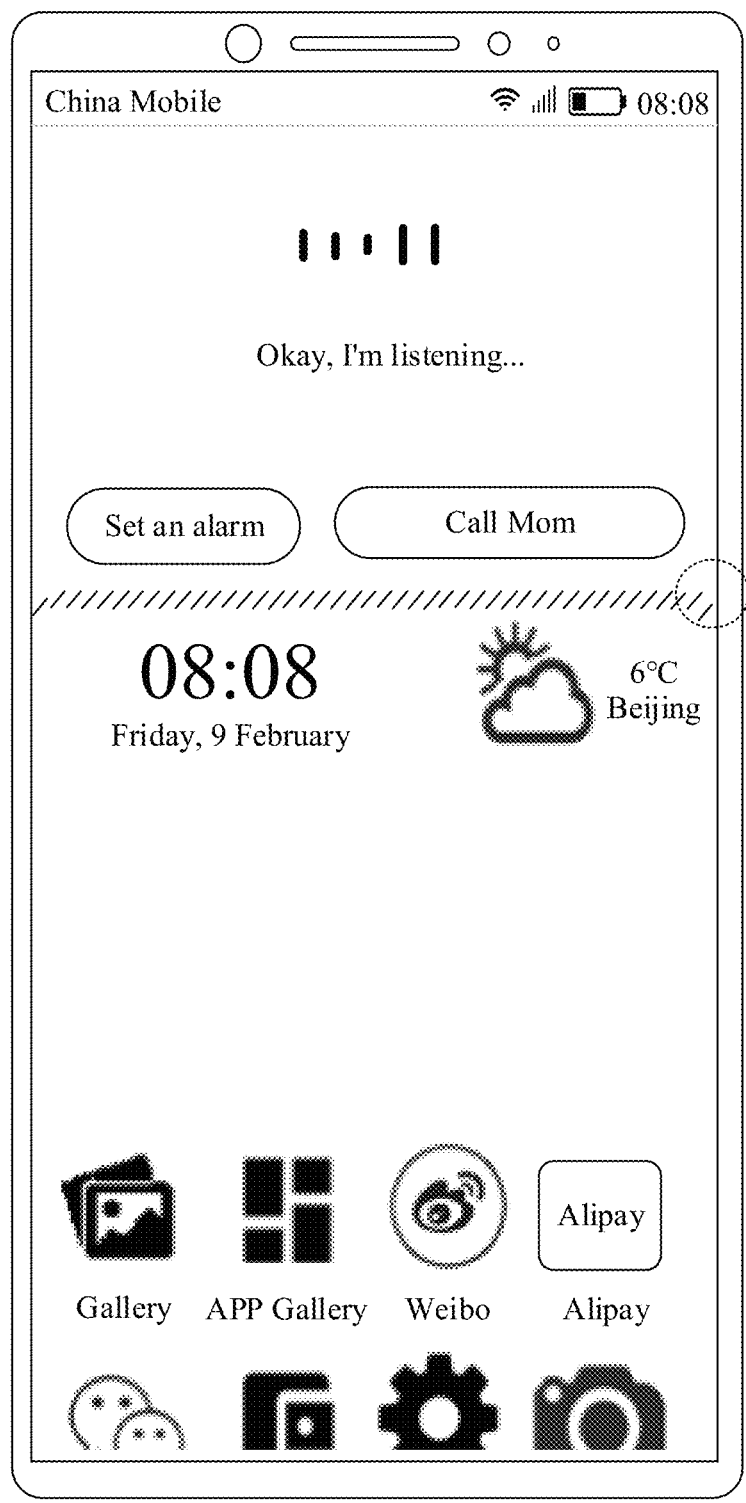

A corner position of the first interface adjacent to the interface of the voice assistant may be a rounded corner, so that a junction between the two interfaces is smoother. In addition, a shadow transition is performed between the first interface and the interface of the voice assistant, so that a sense of abruptness caused by a sudden change between the two interfaces can be reduced, and color transition between the two interfaces is more natural. This can further provide an integrated feeling for the user, and improve immersive visual experience. For example, areas filled with diagonal lines in FIG. 8A and FIG. 8B are shaded parts.

After the first interface moves, content at the bottom of the first interface cannot be displayed because it is moved out of the screen. The mobile phone may further display the first interface in a scrolling manner based on an operation of the user. For example, in a case shown in FIG. 8C, in response to an operation of swiping up on the first interface by the user, the mobile phone scrolls up and displays content of the first interface, to display a first interface shown in FIG. 8D. In a case shown in FIG. 8D, in response to an operation of swiping down on the second interface by the user, the mobile phone scrolls down and displays content of the first interface, to display the first interface shown in FIG. 8C.

Figure 1D:
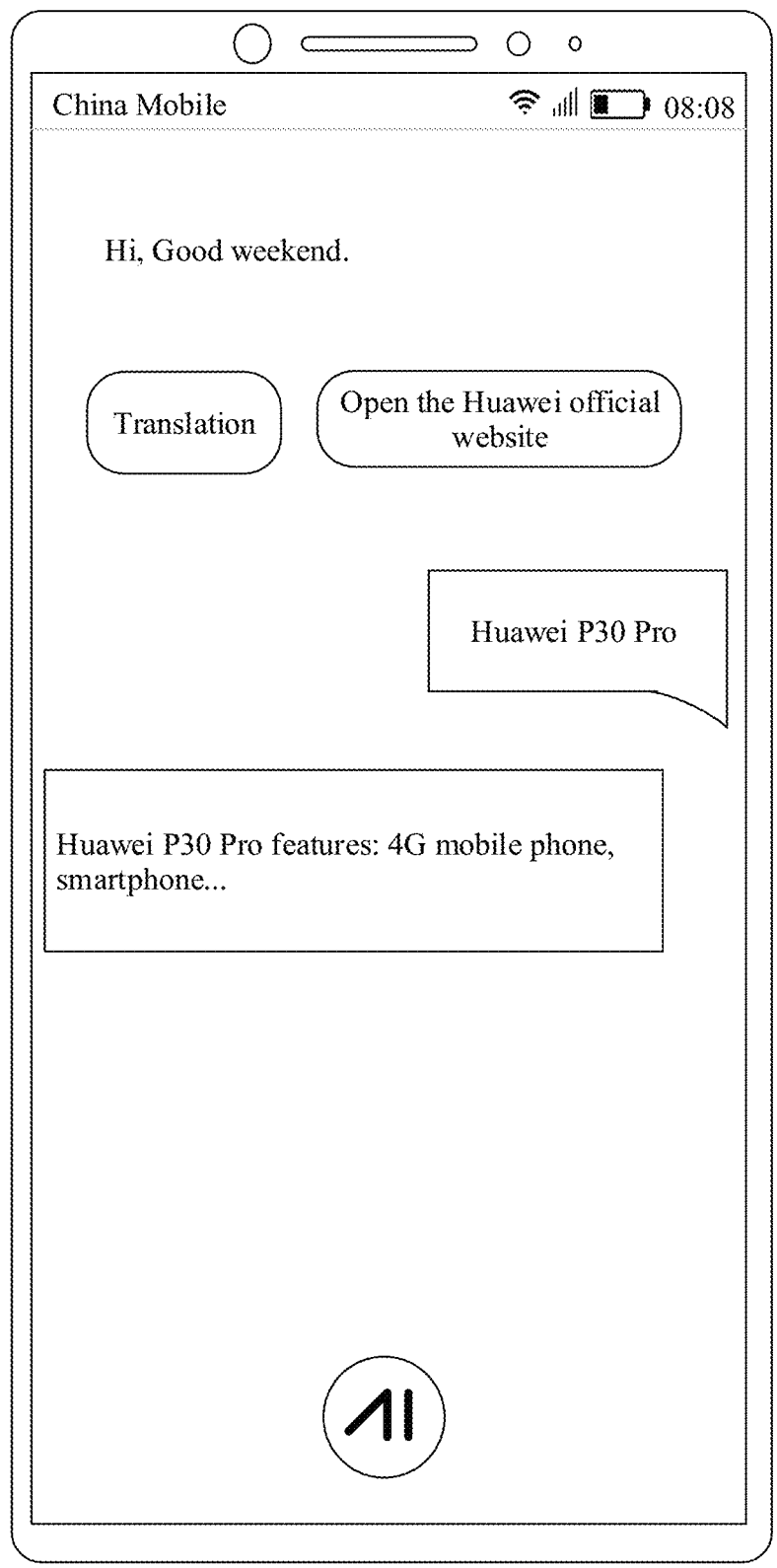

In some conventional technologies, a mobile phone displays an original interface. When a user uses a voice assistant or a global search, the mobile phone exits from displaying the original interface, and displays an interface of the voice assistant or an interface of the global search in full screen. Exiting the original interface makes it impossible for the user to interact with the original interface. For example, refer to FIG. 1D. The mobile phone exits from displaying a home screen (namely, the original interface), and displays the interface of the voice assistant in full screen, so that the user cannot interact with the home screen (for example, the user cannot tap an icon in the home screen).

Usually, after temporarily processing a related service by using the voice assistant or the global search, the user still wants to return to the original interface to interact with the original interface, so as to continue to use an original application corresponding to the original interface. For example, when the user uses WeChat, the mobile phone displays a WeChat interface (namely, the original interface). Then, the user views weather conditions by using the voice assistant. After that, the user wants to continue to use WeChat.

In the conventional technology, exiting the original interface when the voice assistant is used makes it impossible for the user to continue to interact with the original interface. In this embodiment of this application, the mobile phone may simultaneously display the interface of the voice assistant and the first interface (namely, the original interface). The user may not only directly interact with the voice assistant, but also directly interact with the first interface. Therefore, user operations are simple, operability is strong, and use experience of the user is relatively good.

For example, in the conventional technology, when a user uses WeChat, a mobile phone displays a WeChat interface. When the user views weather conditions by using a voice assistant, the mobile phone exits the WeChat interface and displays an interface of the voice assistant in full screen. When the user wants to continue to use WeChat, the user needs to exit the interface of the voice assistant and start the WeChat interface again.

Figure 9A:
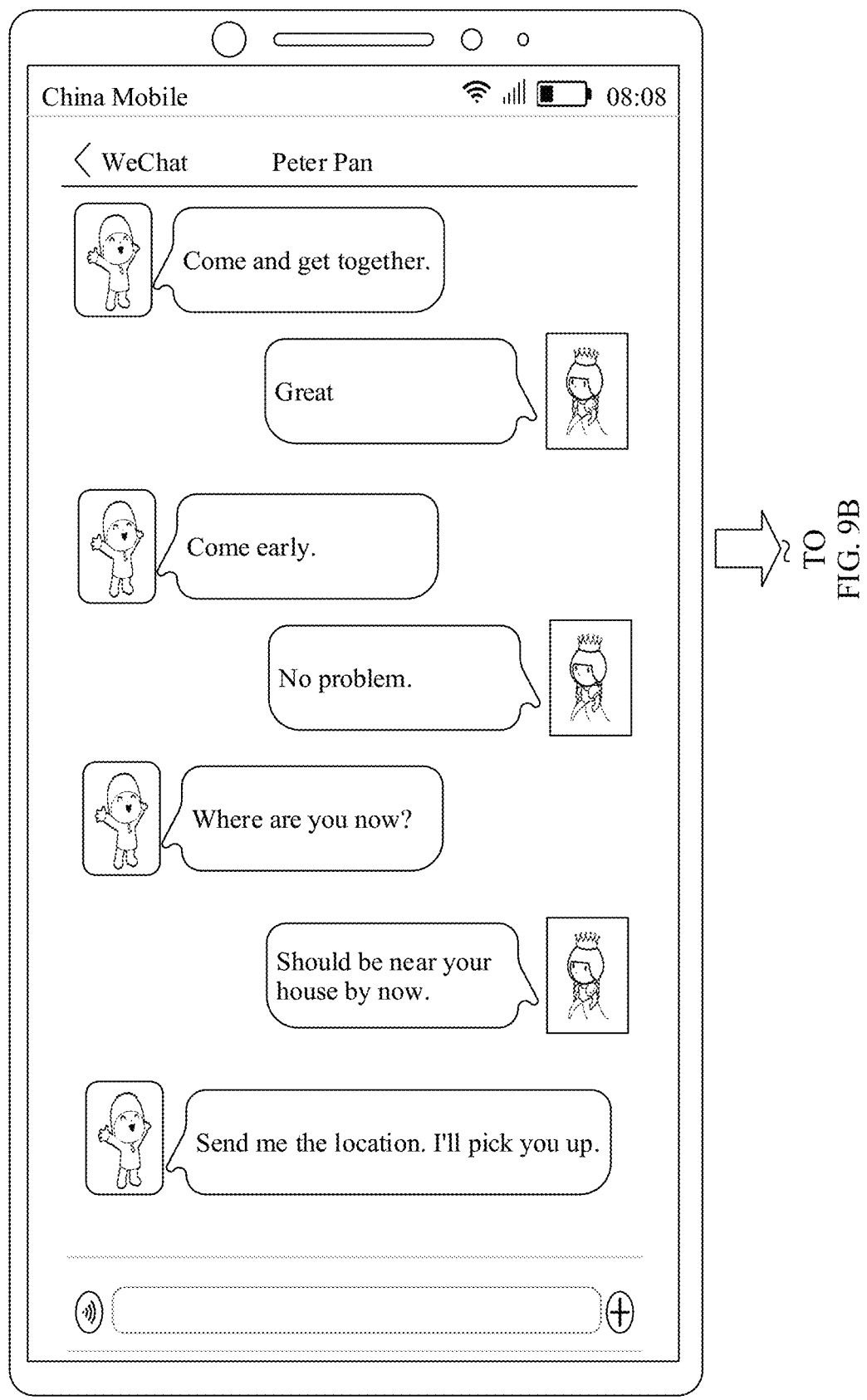
FIG. 9A to FIG. 9C are schematic diagrams of another group of interfaces according to an embodiment of this application.
Figure 9B:
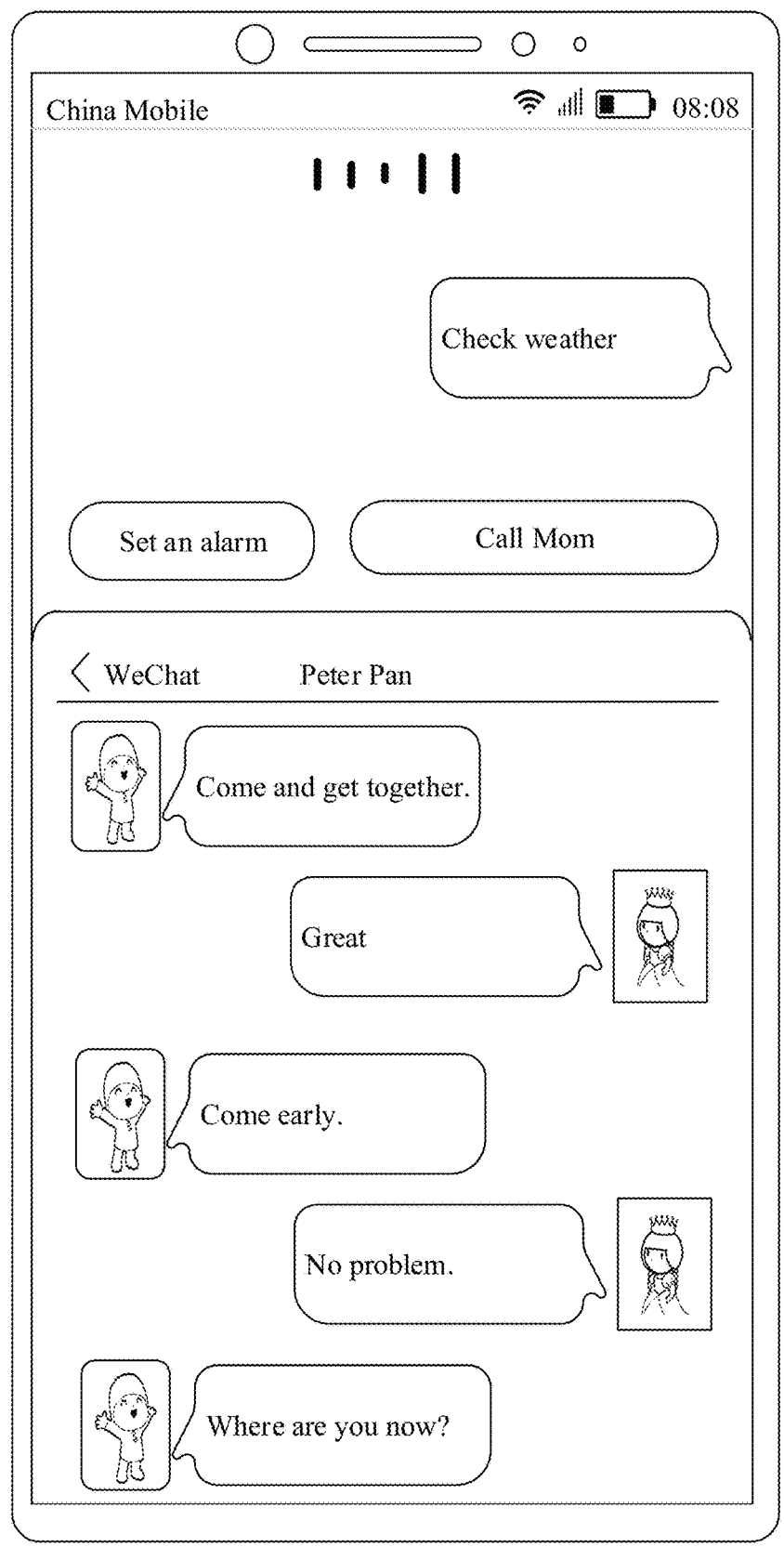
Figure 9C:
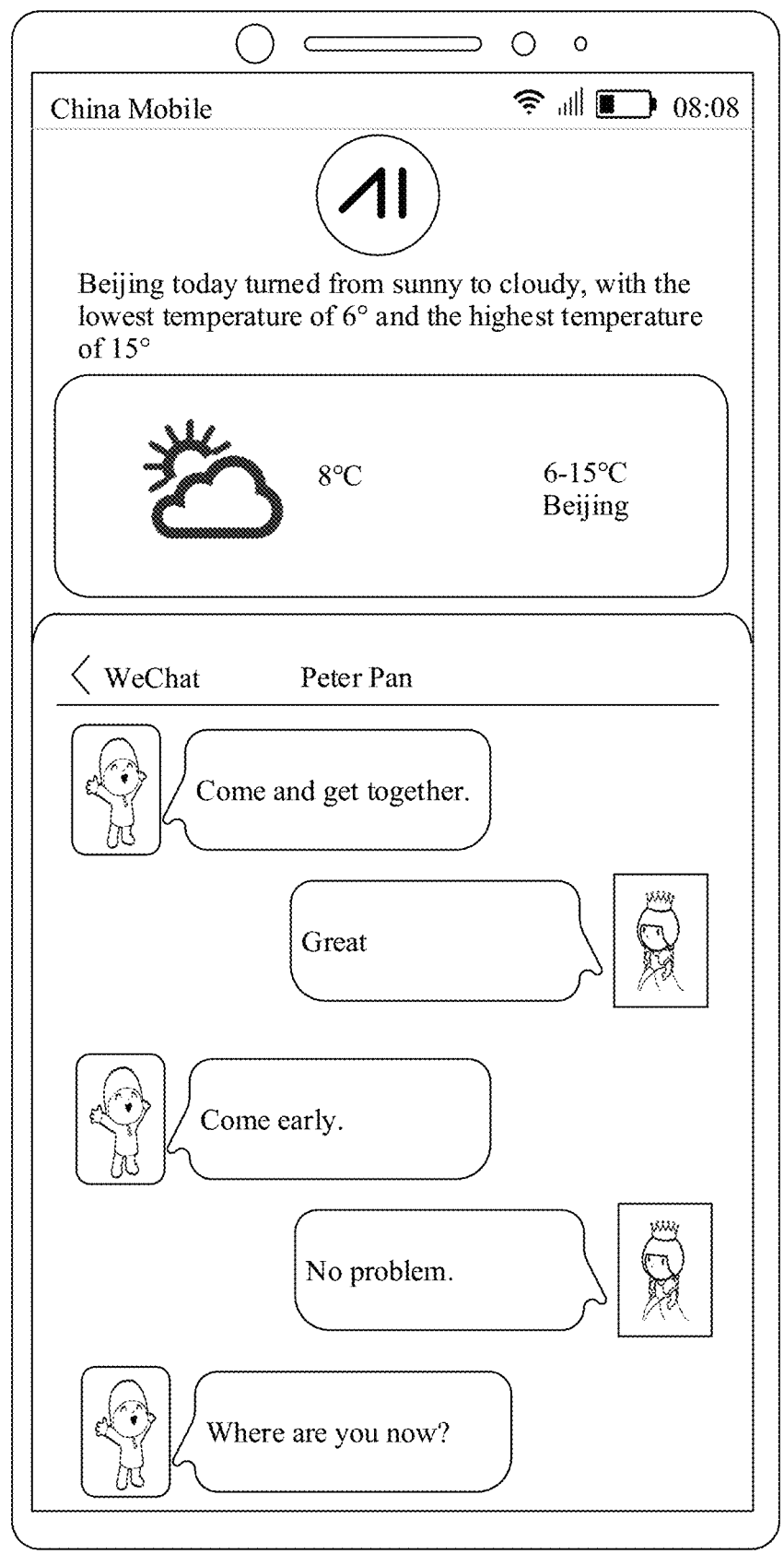

However, in this embodiment of this application, when a user uses WeChat, as shown in FIG. 9A, a mobile phone may display a WeChat interface. When the user views weather conditions by using a voice assistant, as shown in FIG. 9B and FIG. 9C, the mobile phone may simultaneously display the WeChat interface and an interface of the voice assistant. When the user wants to continue to use WeChat, the user may directly interact with the WeChat interface, without requiring a complicated operation process as in the conventional technology. This can simplify and facilitate user operations.

Figure 8C:
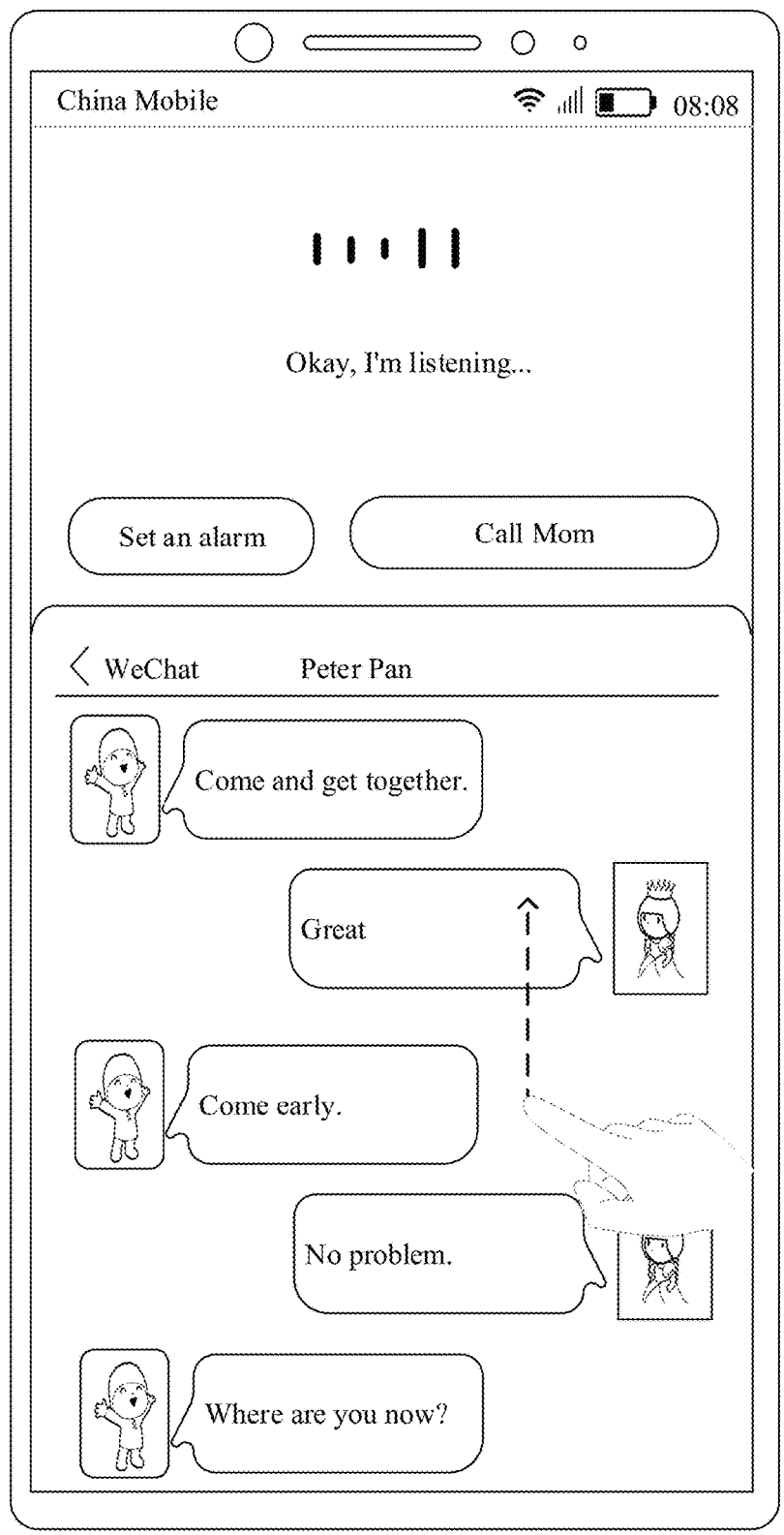
Figure 8D:
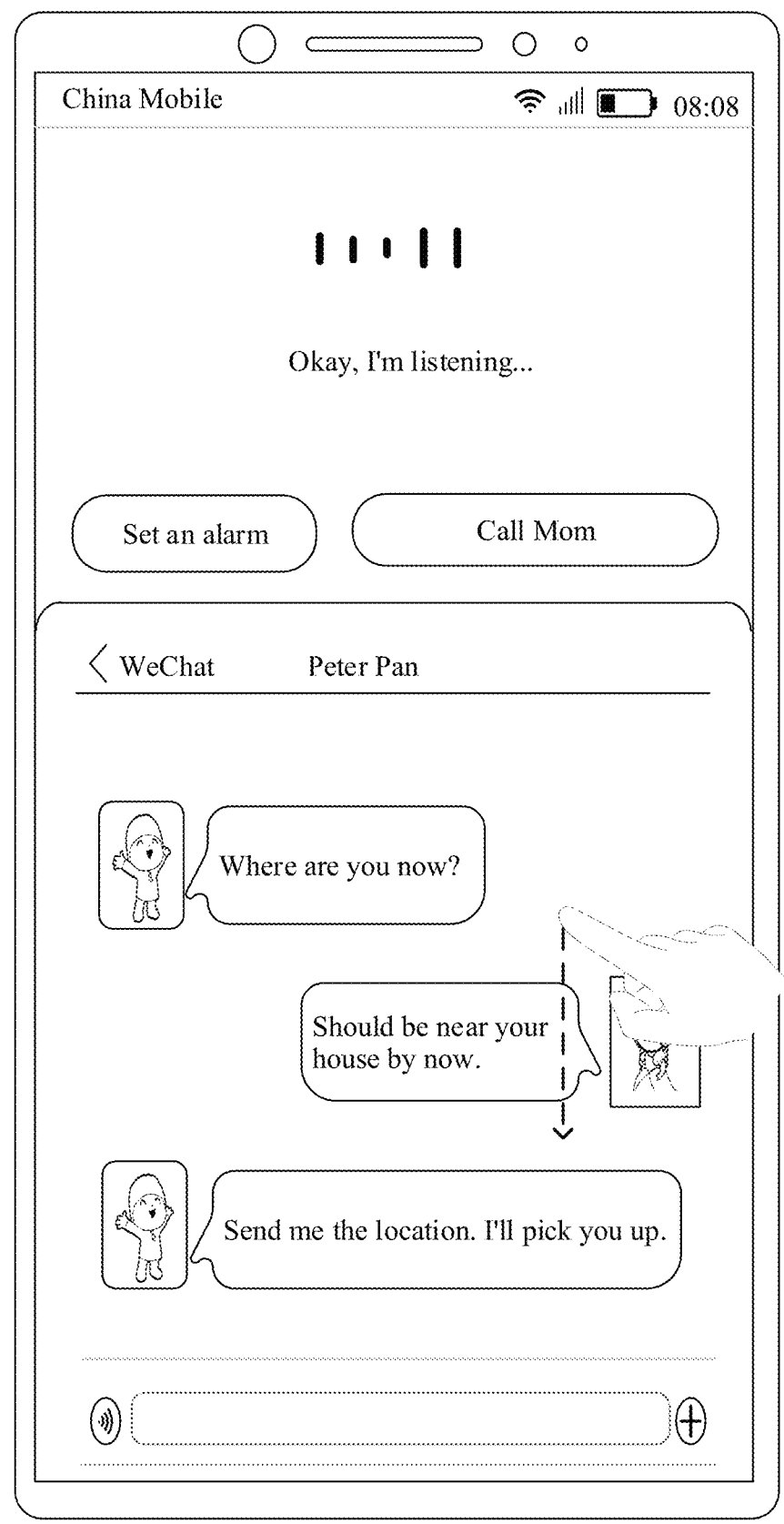

For another example, in the case shown in FIG. 8C, if the mobile phone detects that the user taps or drags a control of "call Mom" in the interface of the voice assistant, the mobile phone may perform an operation of calling Mom.

In this embodiment of this application, after the mobile phone simultaneously displays the interface of the voice assistant and the first interface, if the mobile phone detects an interaction operation performed by the user on the voice assistant, the mobile phone may respond by using the interface of the voice assistant. When the user interacts with the interface of the voice assistant, a size and content of the interface of the voice assistant may change with a change in the interaction process.

Figure 10A:
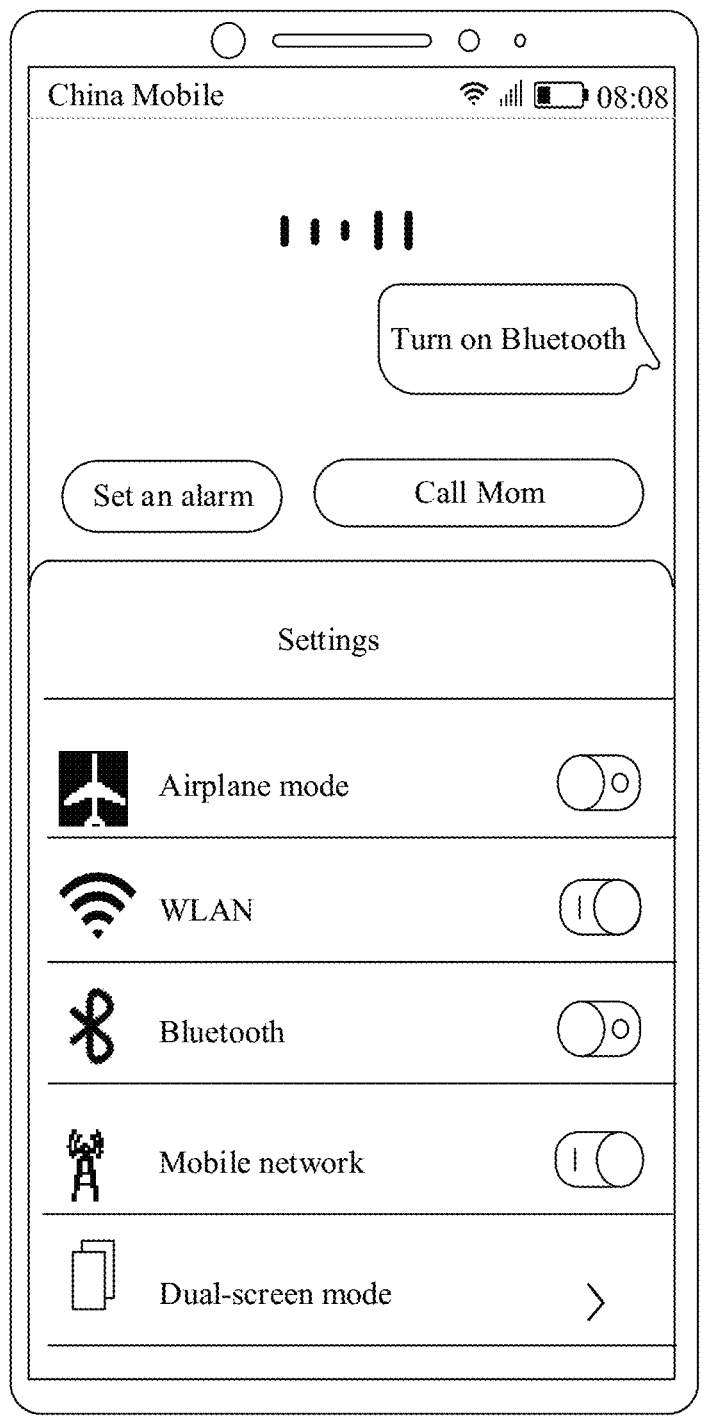
FIG. 10A and FIG. 10B are schematic diagrams of another group of interfaces according to an embodiment of this application.
Figure 10B:
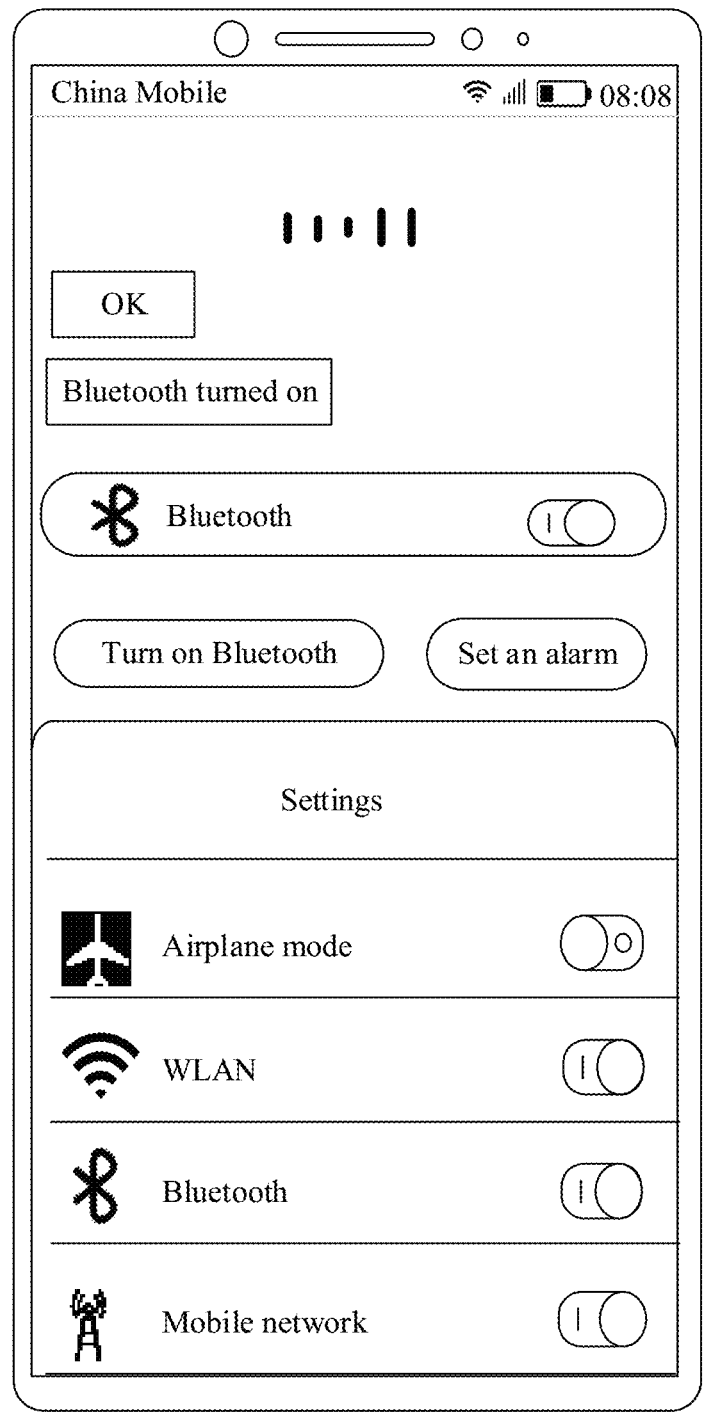

For example, in a case shown in FIG. 10A, if the mobile phone detects that the user indicates to turn on Bluetooth through a voice, the interface of the voice assistant is switched from the interface shown in FIG. 10A to the interface shown in FIG. 10B. Compared with the interface of the voice assistant shown in FIG. 10A, the interface of the voice assistant shown in FIG. 10B becomes larger, that is, a size (or referred to as a display range) of the interface of the voice assistant becomes larger. In addition, the mobile phone turns on Bluetooth in response to a voice instruction of the user.

Furthermore, when the interface of the voice assistant becomes larger, the first interface automatically becomes smaller correspondingly, that is, a size (or referred to as a display range) of the first interface becomes smaller. When the interface of the voice assistant becomes smaller, the first interface automatically becomes larger correspondingly. For example, by comparing the interface shown in FIG. 10A with the interface shown in FIG. 10B, it can be learned that when the interface of the voice assistant becomes larger, the first interface automatically becomes smaller accordingly.

Figure 11A:
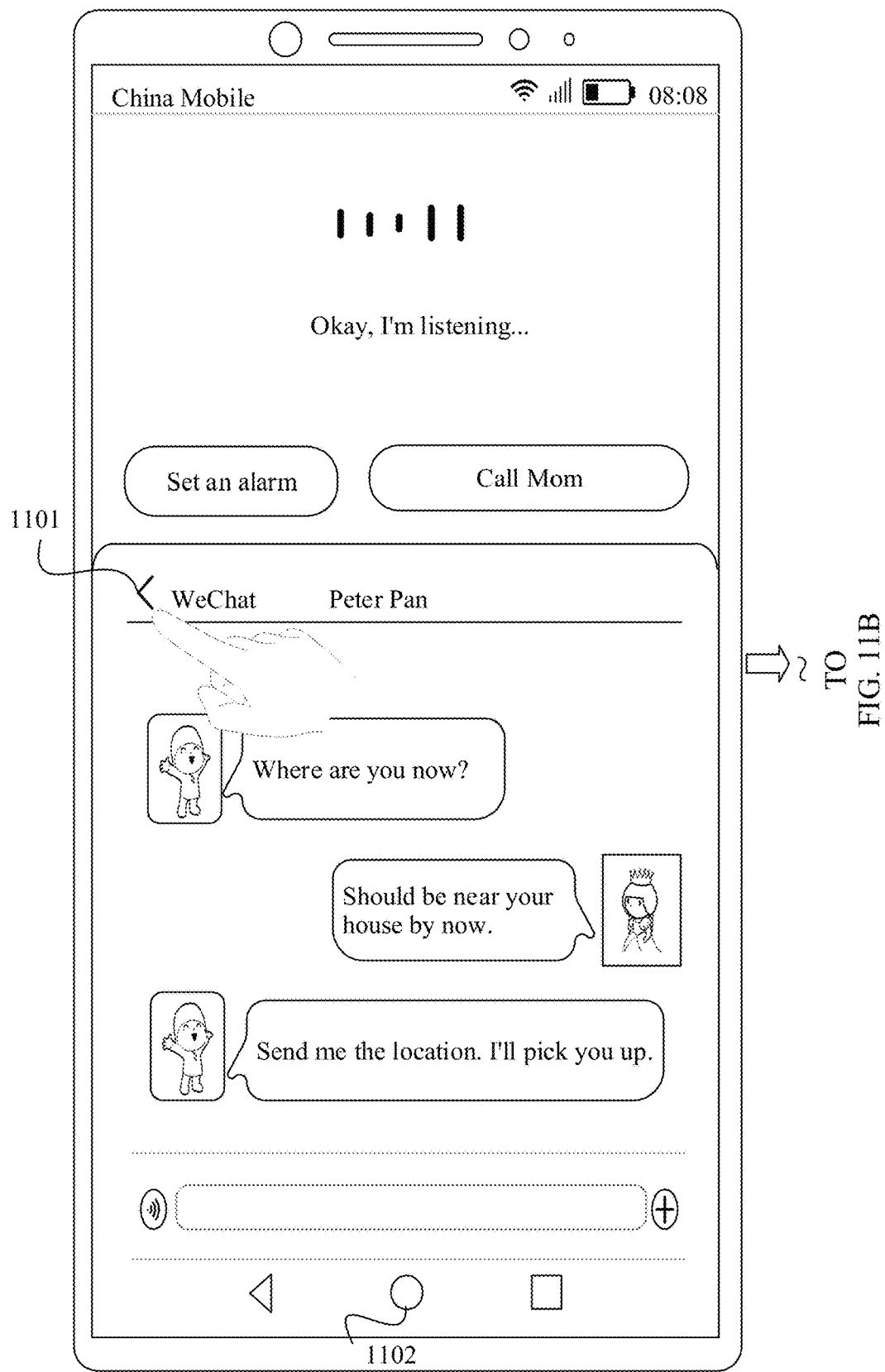
FIG. 11A to FIG. 11D are schematic diagrams of another group of interfaces according to an embodiment of this application.
Figure 11B:
Figure 11C:
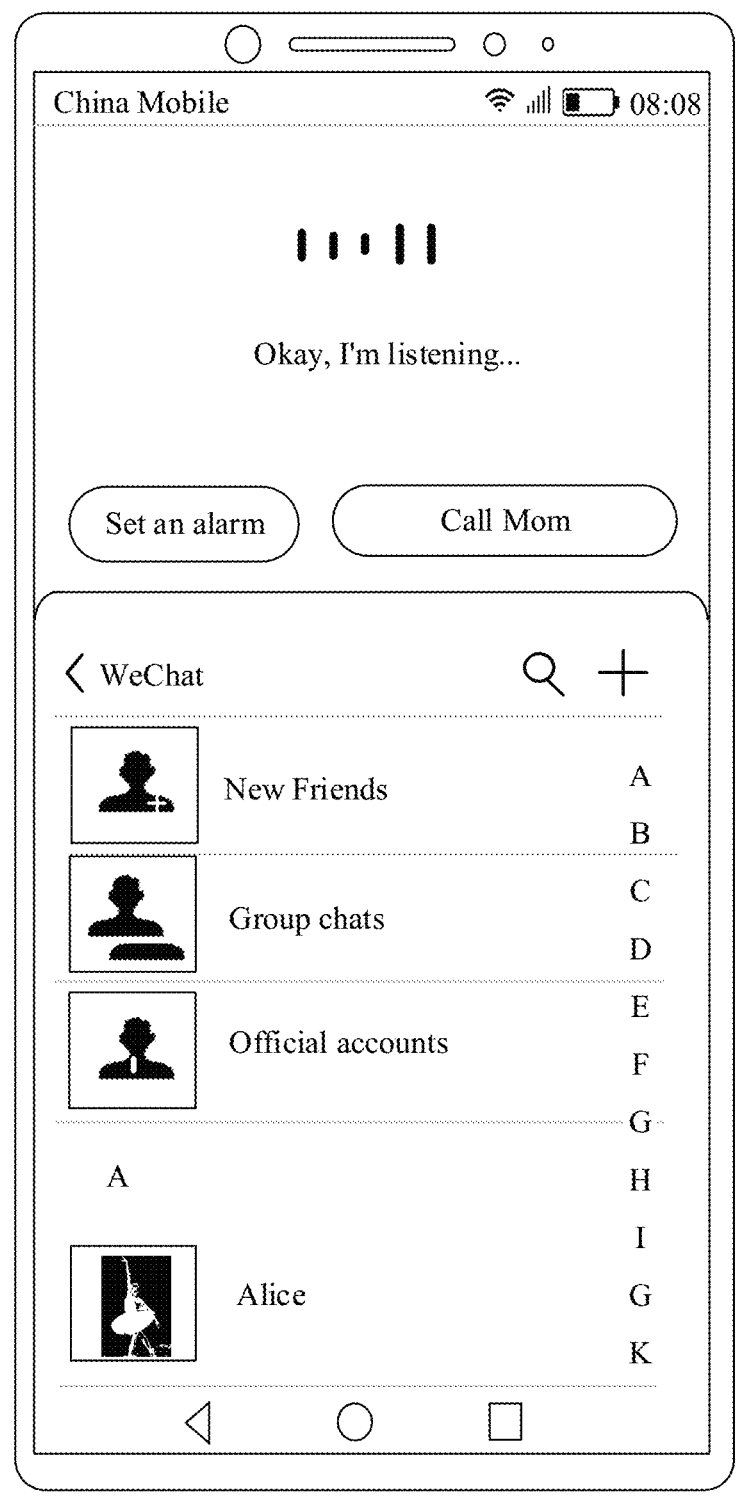
Figure 11D:

After the mobile phone simultaneously displays the interface of the voice assistant and the first interface, if an interaction operation performed by the user on the first interface is detected, the mobile phone may respond by using the first interface. When the user interacts with the first interface, content of the first interface may change with a change in an interaction process. For example, in a case shown in FIG. 11A, if the mobile phone detects an operation of tapping a return control 1101 in the first interface by the user, the mobile phone switches to display the first interface shown in FIG. 11B. For another example, in a case shown in FIG. 11B, if the mobile phone detects an operation of swiping leftward on the first interface by the user, the mobile phone switches to display the first interface shown in FIG. 11C, where the first interface is a contacts interface of WeChat. For another example, in the case shown in FIG. 11A, if the mobile phone detects an operation of tapping a home button 1102 by the user, the mobile phone switches to display the first interface shown in FIG. 11D, where the first interface is the home screen.

In some embodiments, a size of the interface of the voice assistant and a size of the first interface may change based on an indication of the user. For example, if the mobile phone detects an operation of swiping from a first mark to the interface of the voice assistant by the user, the interface of the voice assistant decreases, and the first interface moves upward accordingly. Alternatively, if the mobile phone detects an operation of swiping from a first mark to the first interface by the user, the interface of the voice assistant increases, and the first interface moves downward accordingly. The first mark may include a third area or a first control. The first mark is located between the first area and the second area, or the first mark is located in the first area and close to the second area, or the first mark is located in the second area and close to the first area.

Figure 12A:
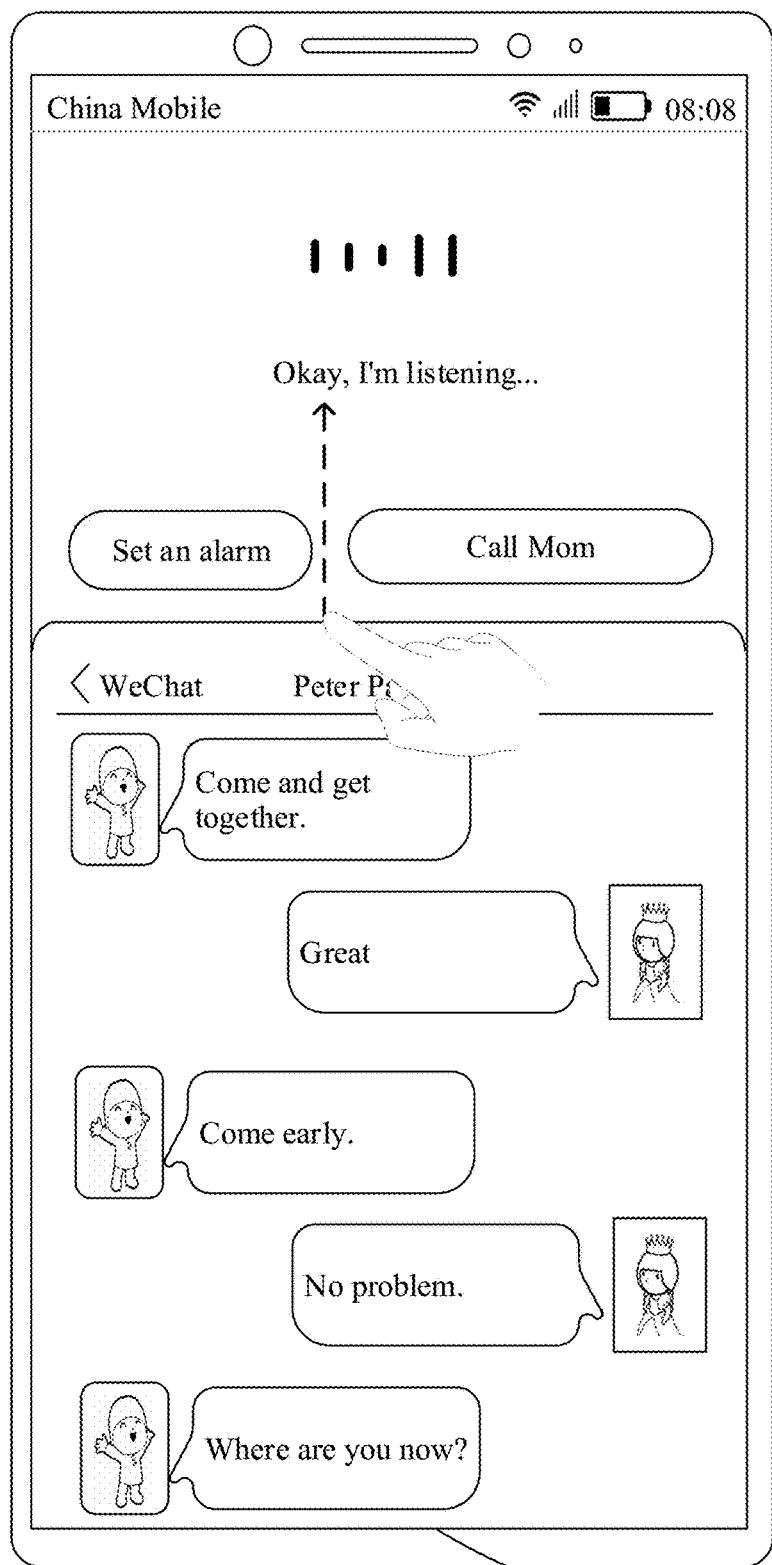
FIG. 12A to FIG. 12C are schematic diagrams of another group of interfaces according to an embodiment of this application.

For example, the first mark may be a boundary area between the interface of the voice assistant and the first interface shown in FIG. 12A. For another example, the first mark may be a boundary line of a boundary area between the interface of the voice assistant and the first interface.

Figure 12B:
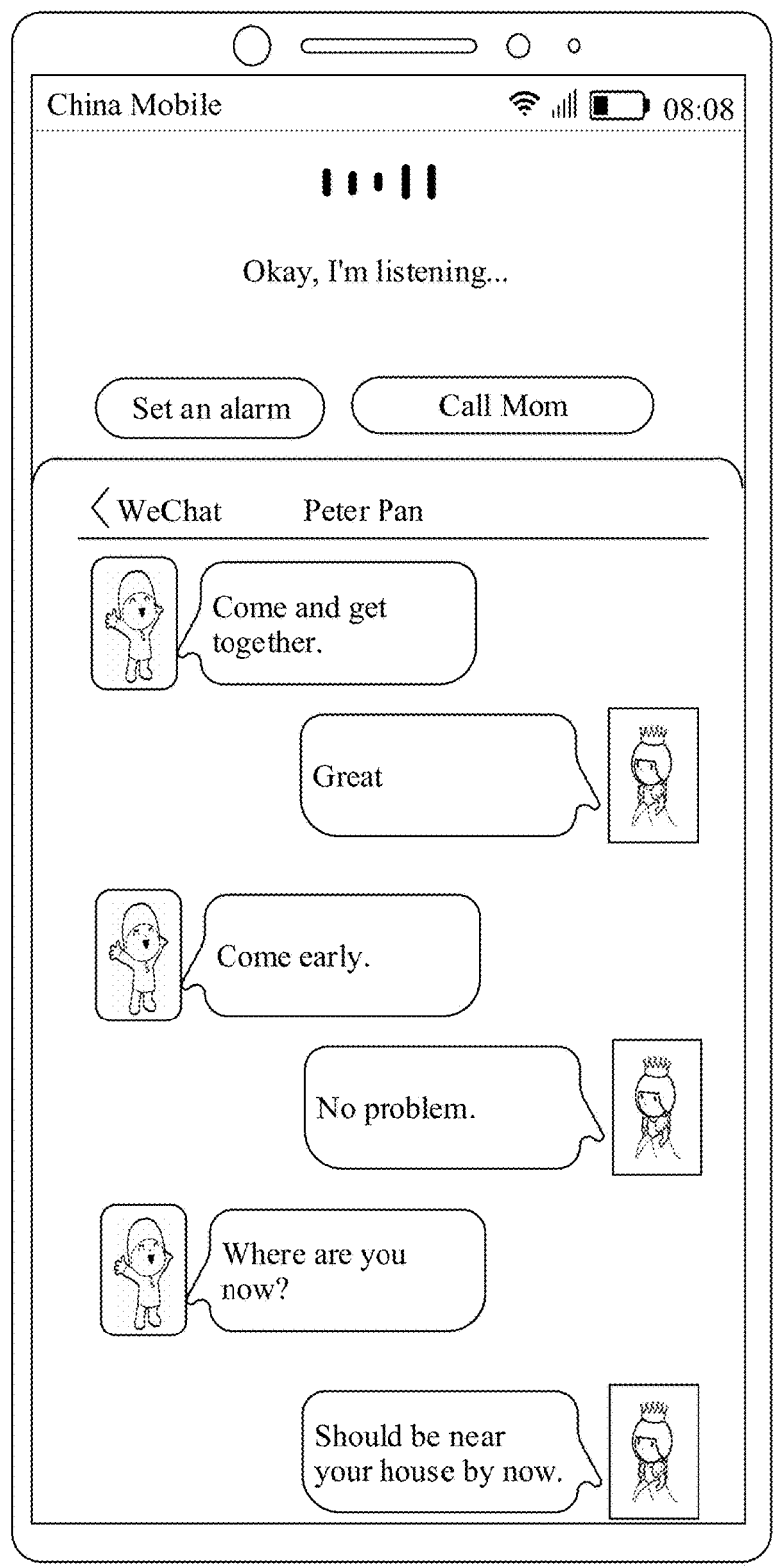
Figure 12C:
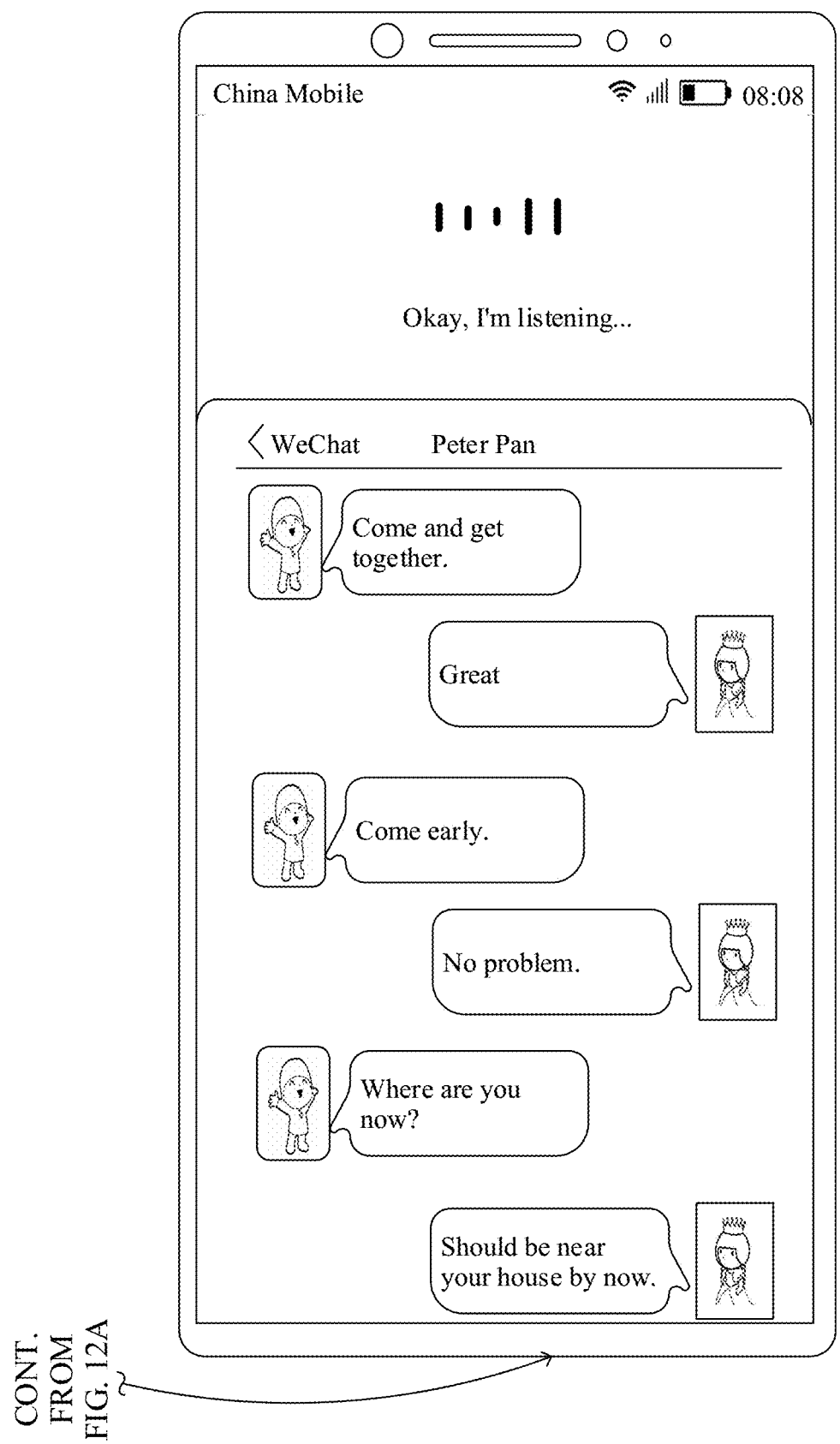

In some embodiments, refer to FIG. 12B. After the first interface is moved upward, a height of the interface of the voice assistant is reduced, and content of the interface of the voice assistant is scaled down for display. In some other embodiments, refer to FIG. 12C. After the first interface is moved upward, content at the bottom of the interface of the voice assistant is hidden as the first interface is moved upward.

If the mobile phone detects an operation of swiping down by the user on the boundary area between the interface of the voice assistant and the first interface, the first interface moves downward, the first interface decreases, the height of the interface of the voice assistant increases, and the interface of the voice assistant increases.

In some embodiments, the first application may be an application having a search or find function, for example, a voice assistant application or a global search application.

For the first application such as the voice assistant that has the search or find function, when the user uses the original application, the user may need to search for or find some related information by using the first application such as the voice assistant, and then return to the original application to use the information. In the conventional technology, a mobile phone exits an original interface when a voice assistant is used. Therefore, a user needs to exit an interface of the voice assistant, and starts the original interface again, so that the user can use, in the original application, related information found by the voice assistant. Consequently, user operations are complex and time-consuming, and user experience is poor.

In this embodiment of this application, the mobile phone may simultaneously display the interface of the voice assistant and the first interface, and interaction may be directly performed between the interface of the voice assistant and the first interface. The mobile phone may display found or searched related information in the interface of the voice assistant. By an interaction operation between the interface of the voice assistant and the first interface, the related information searched for or found by the voice assistant may be conveniently and directly used on the first interface.

For example, the user may directly drag (or drag and drop) a data object between the first interface and the interface of the voice assistant, to directly perform data interaction between the first interface and the interface of the voice assistant, and use, on the first interface, related information provided by the voice assistant. In this way, the related information provided by the voice assistant can be re-used without the need to exit the interface of the voice assistant and start the first interface again. Therefore, the interface display method provided in this embodiment of this application can simplify user operations, save operation time, and improve user experience.

For example, the data object may be a file, or may be a segment of characters, or other types of data information. For example, the file may be a document, music, a multimedia file, a picture, a card interface, an icon, a contact card, a GIF image, or the like. The user may drag (or drag and drop) a data object on the interface of the voice assistant to the first interface. The data object may be a result of interaction between the user and the voice assistant, to provide content of the interface of the voice assistant for the first interface. Alternatively, the user may drag a data object on the first interface to the interface of the voice assistant, to provide related information on the first interface for the voice assistant, so that the voice assistant performs operations such as searching, finding, or responding based on the related information.

Figure 13A:
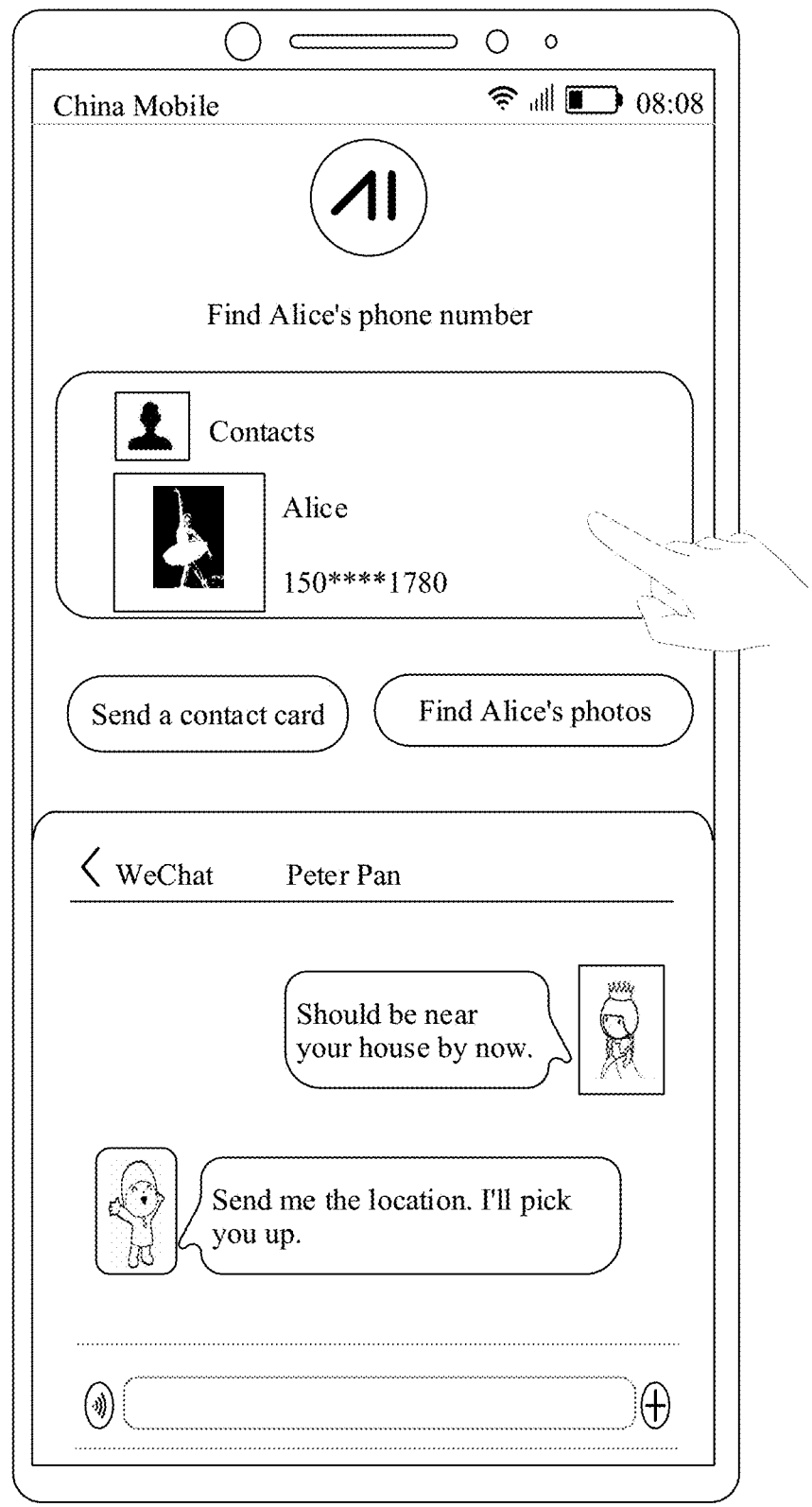
FIG. 13A to FIG. 13E(d) are schematic diagrams of another group of interfaces according to an embodiment of this application.
Figure 13B:
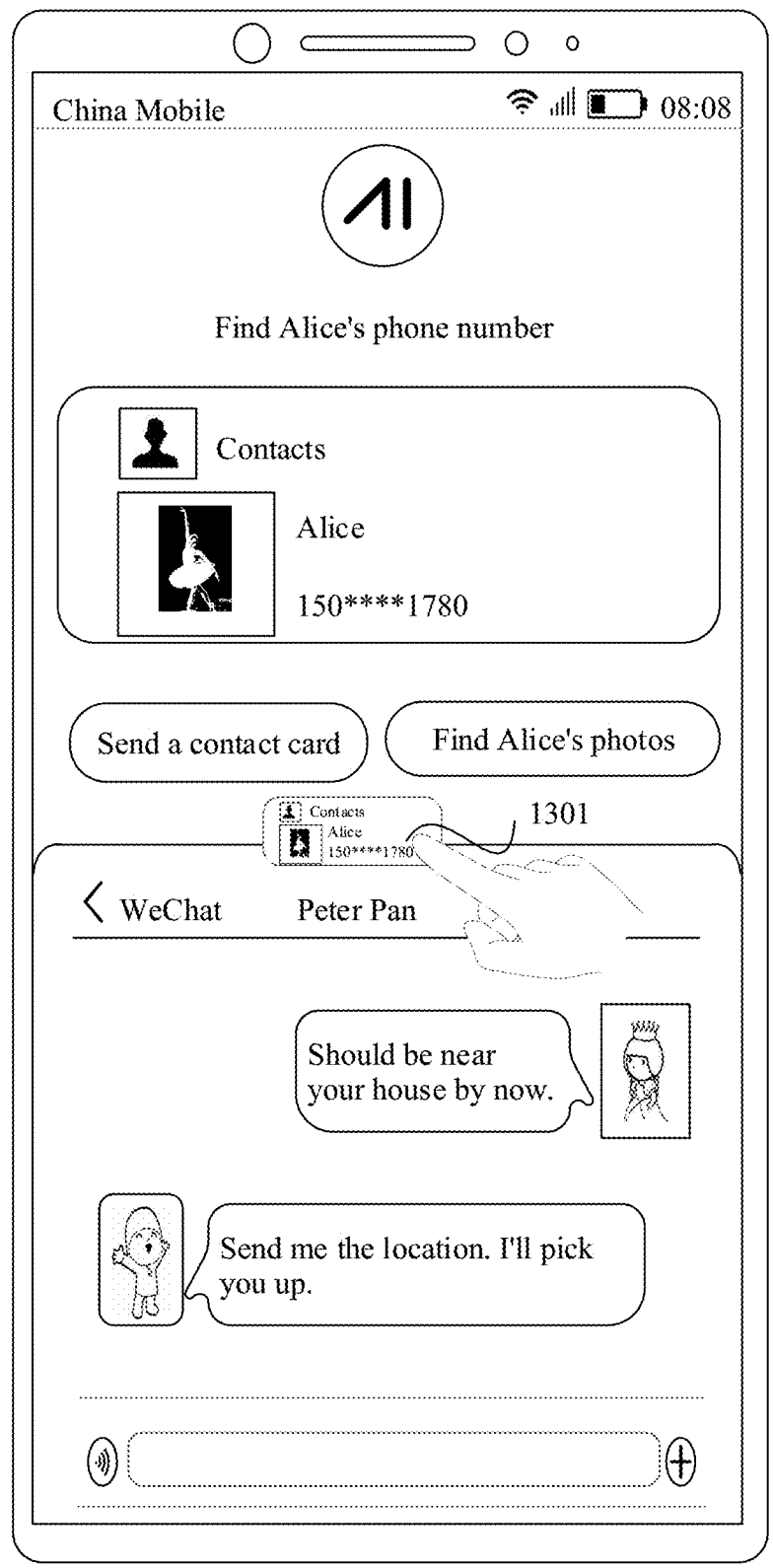
Figure 13C:
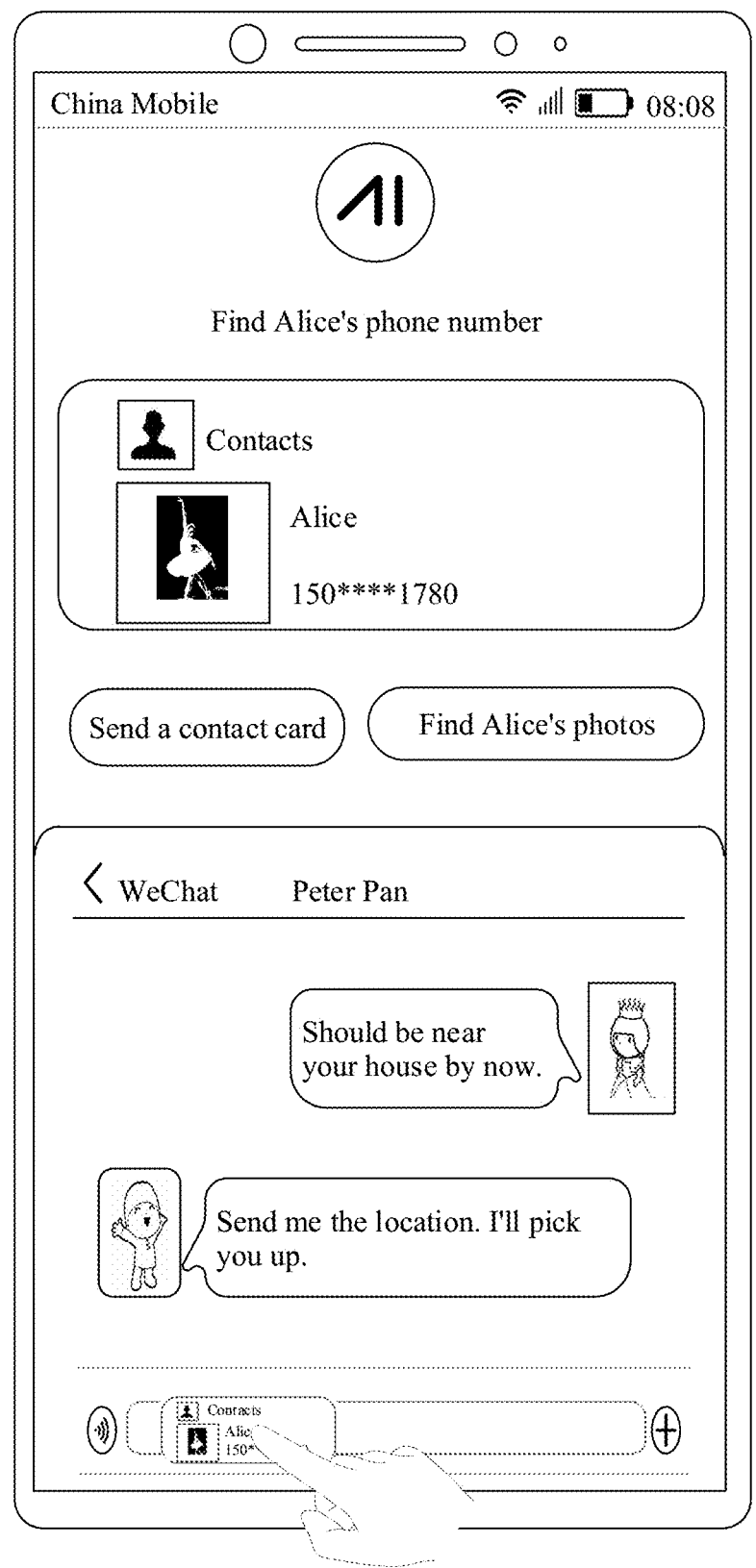
Figure 13D:
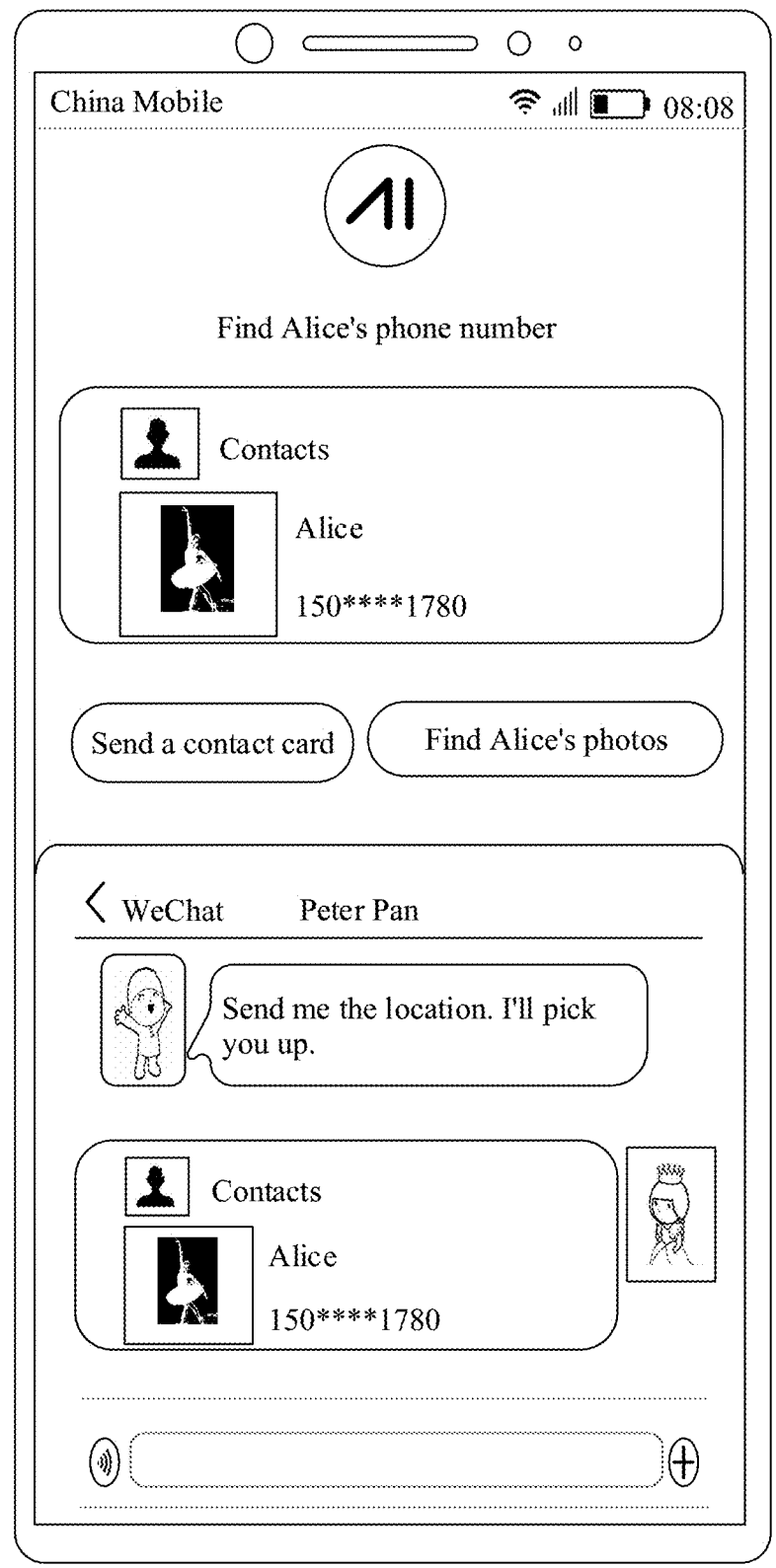

For example, the first interface is an interface of WeChat, Messages, or another instant messaging application, and the data object is a data object such as a contact card, a picture, or an account found by the voice assistant. For example, as shown in FIG. 13A, the user finds a contact card of Alice by using the voice assistant. Refer to FIG. 13B. The mobile phone detects that the user drags the contact card of Alice from the interface of the voice assistant. As shown in FIG. 13C, the mobile phone detects that the user drags the contact card of Alice to a message sending window of WeChat (or drags the contact card of Alice to a WeChat interface) and then releases. In some embodiments, refer to FIG. 13D. The mobile phone automatically sends the contact card of Alice to Peter Pan. In some other embodiments, the mobile phone inserts the contact card of Alice into a message editing box, and sends the contact card of Alice to Peter Pan after detecting an operation in which the user indicates to send the contact card of Alice.

In some embodiments, in a dragging process of the data object, the mobile phone may display a shadow control of the data object, and the shadow control of the data object may move with a hand. For example, the shadow control may be an element 1301 shown in FIG. 13B.

In addition, some shortcut controls may be displayed in the interface of the voice assistant. These shortcut controls may be used to perform operations related to content currently displayed in the interface of the voice assistant, such as, a control of "send a contact card" and a control of "search for an Alice's photo", so that the user can quickly perform a related operation on the currently displayed content by using the shortcut control.

Figure 13E:
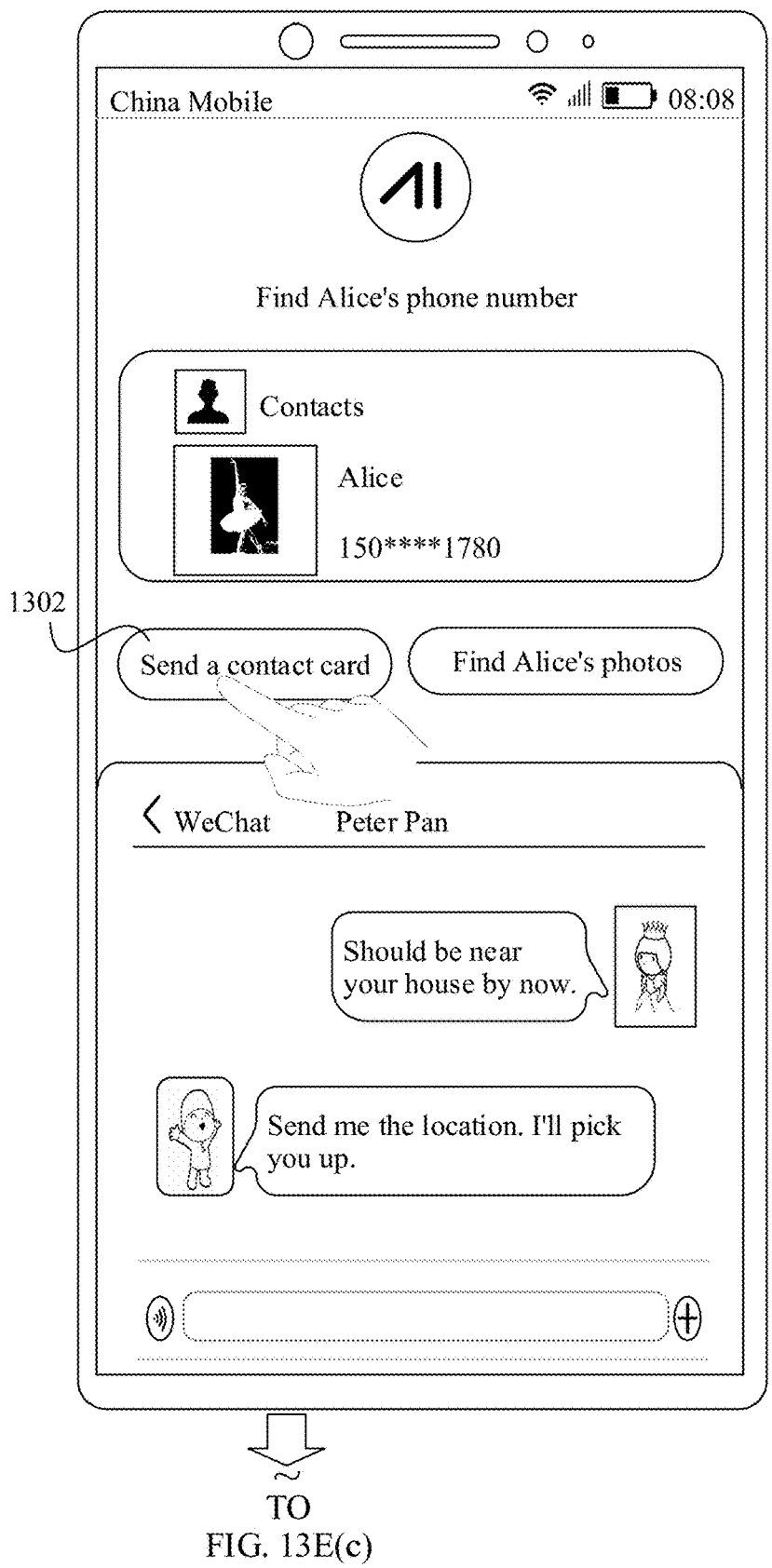
Figure 13E:
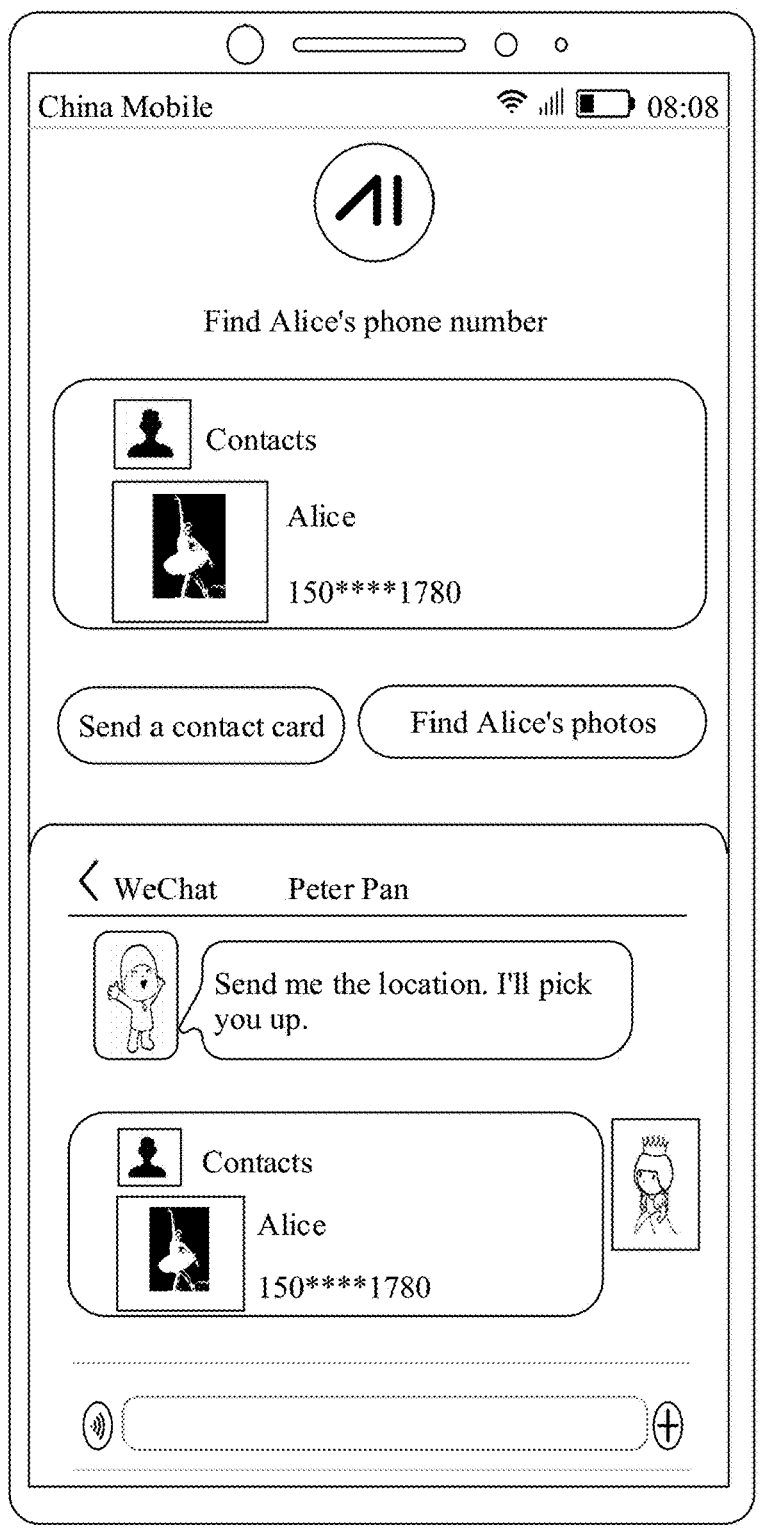
Figure 13E:
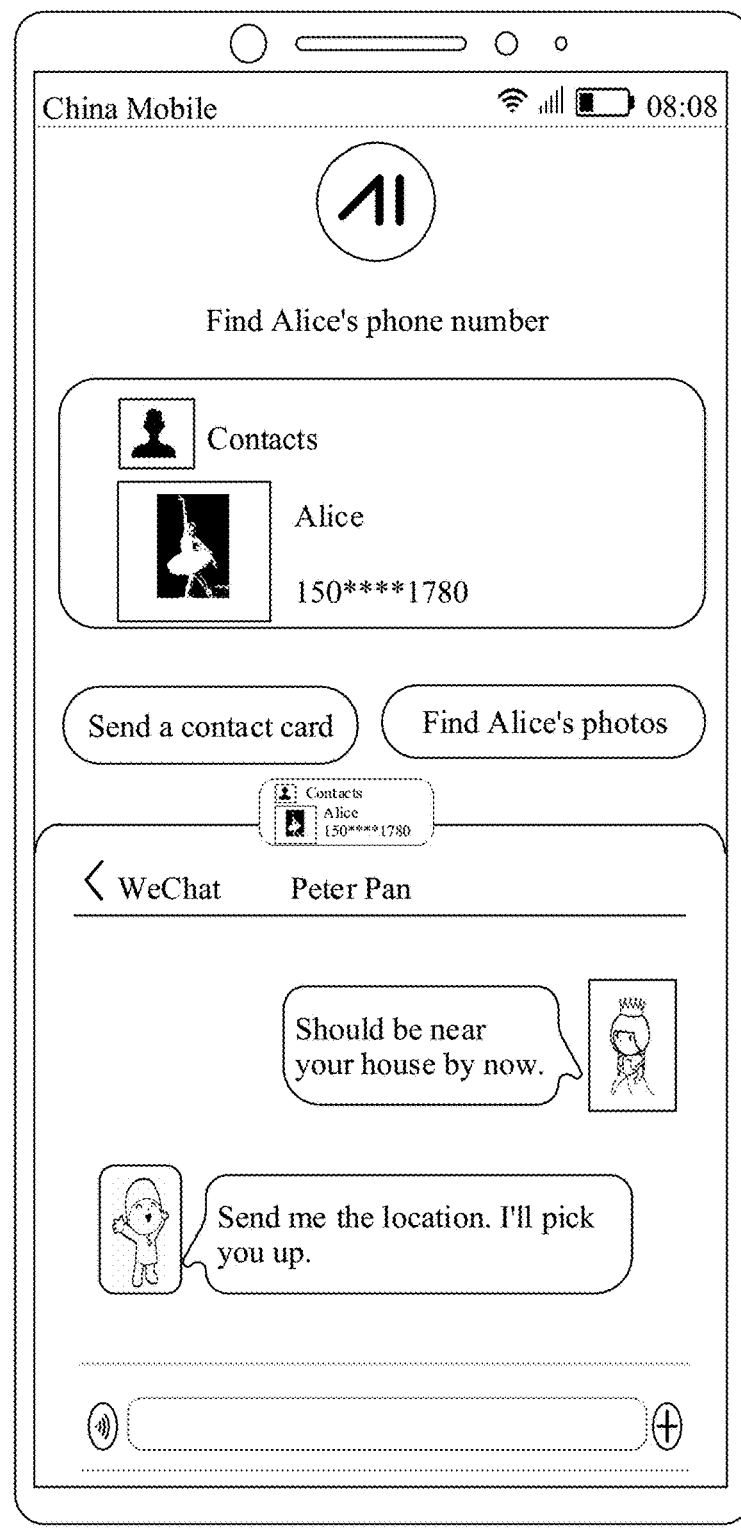
Figure 13E:
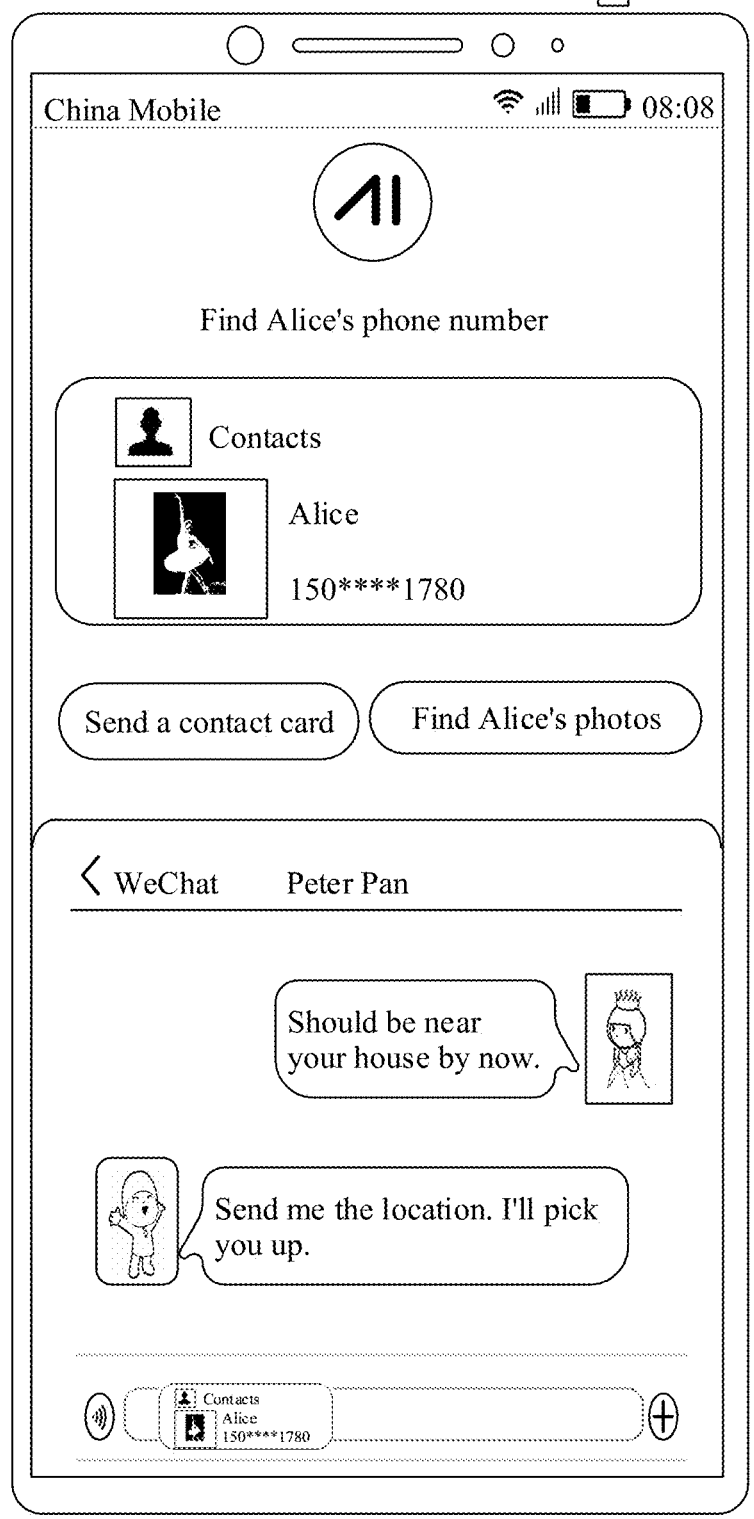
Figure 14A:
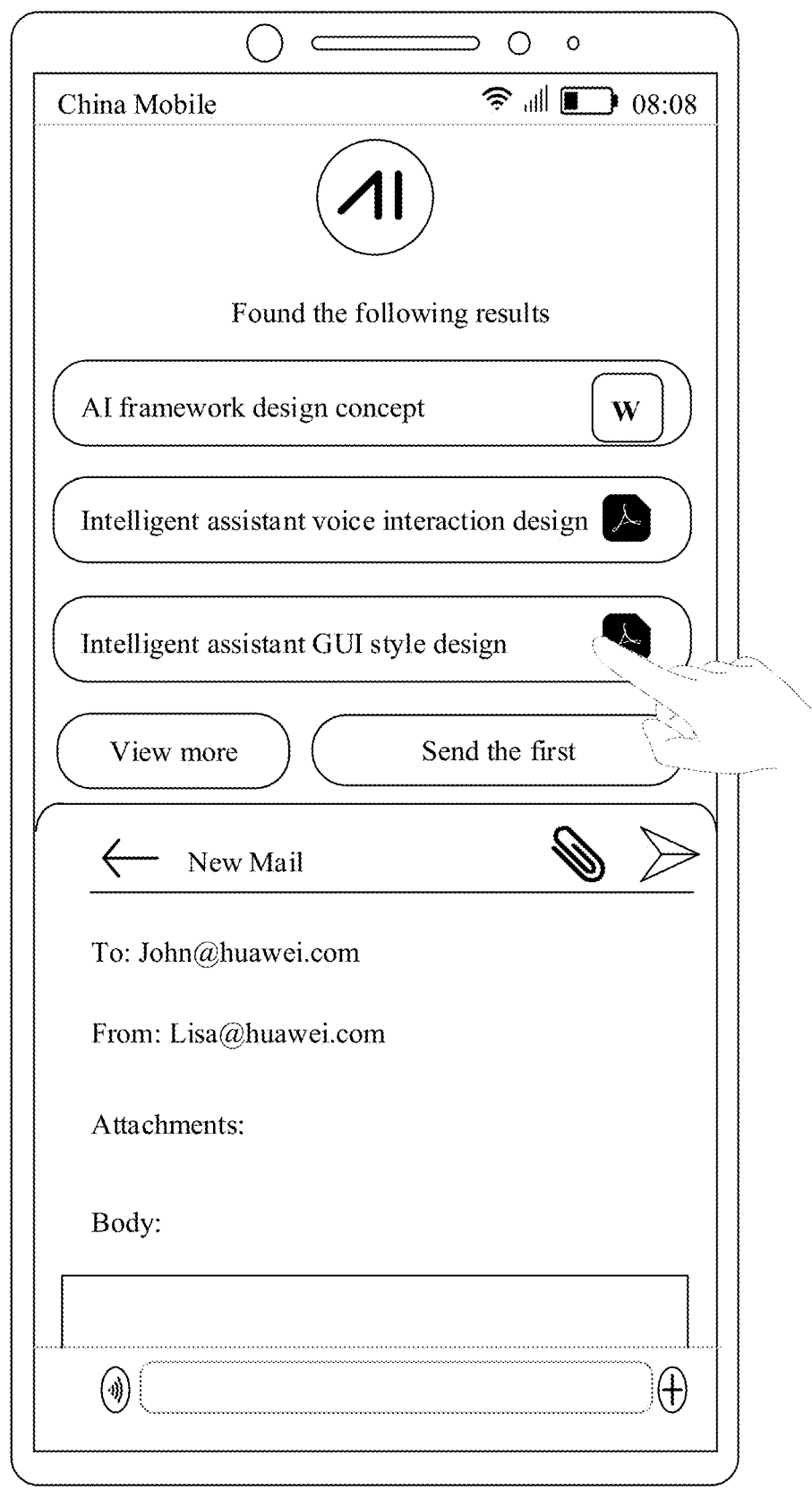
FIG. 14A to FIG. 14F are schematic diagrams of another group of interfaces according to an embodiment of this application.
Figure 14B:
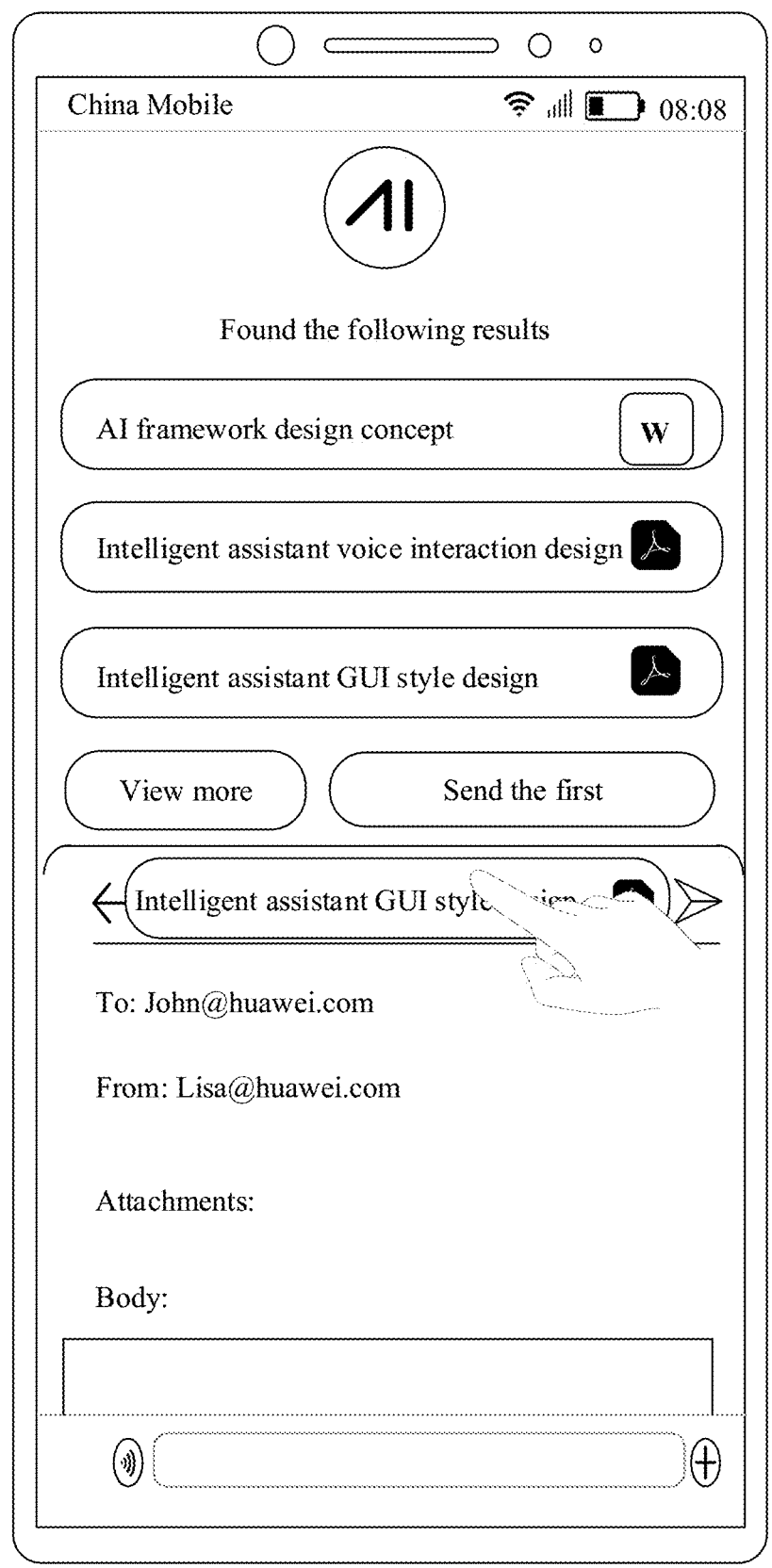
Figure 14C:
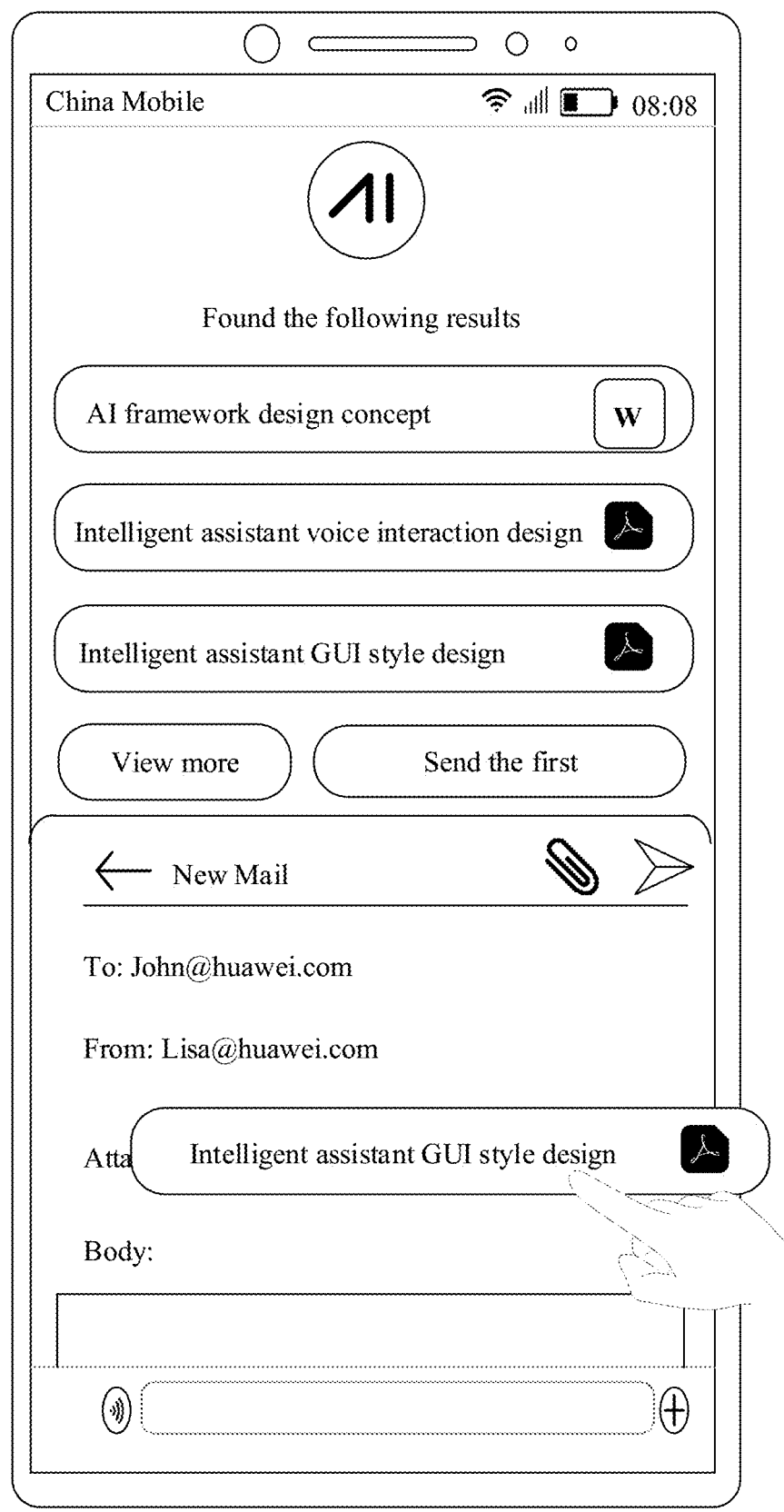
Figure 14D:
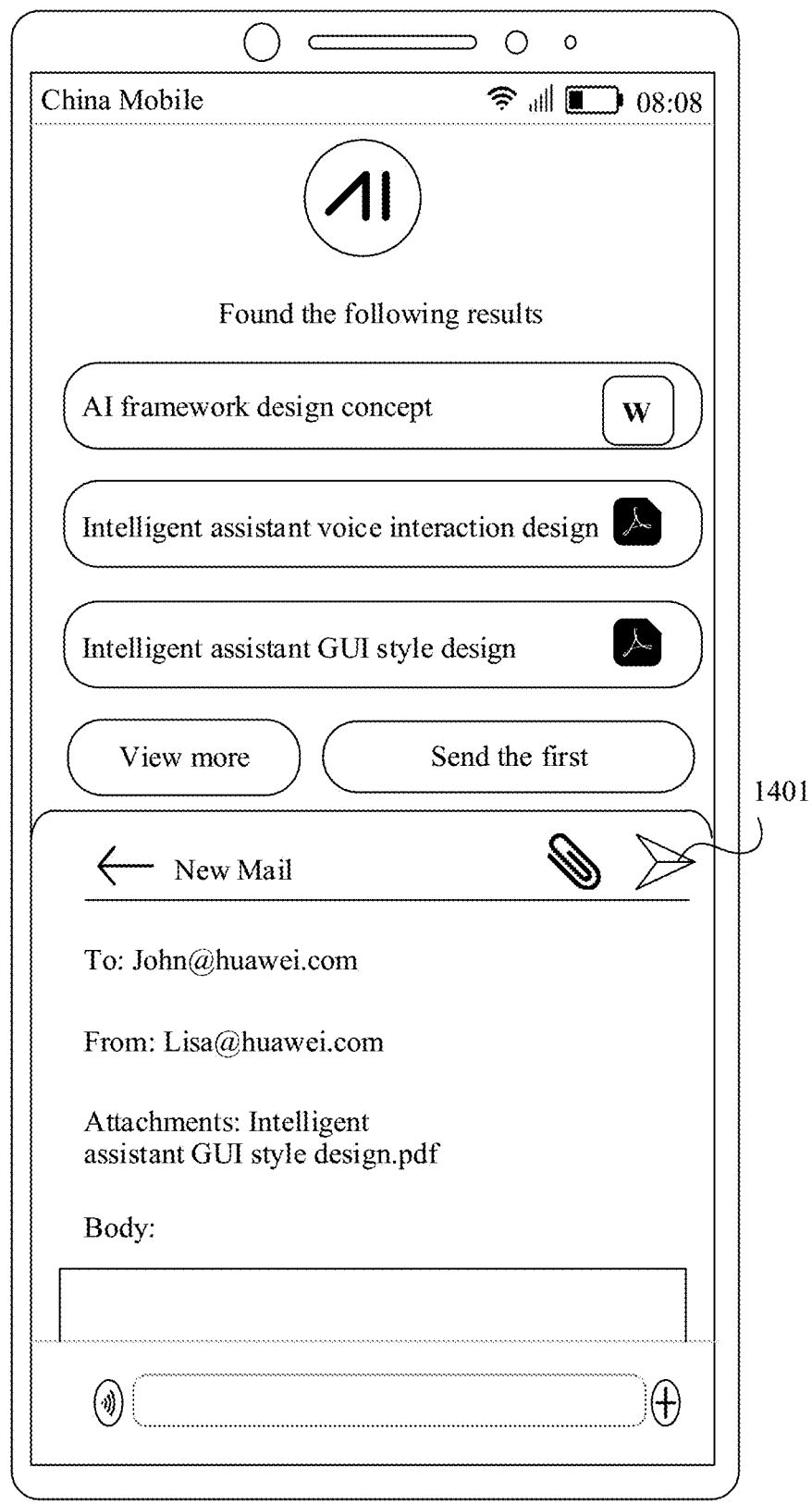
Figure 14E:
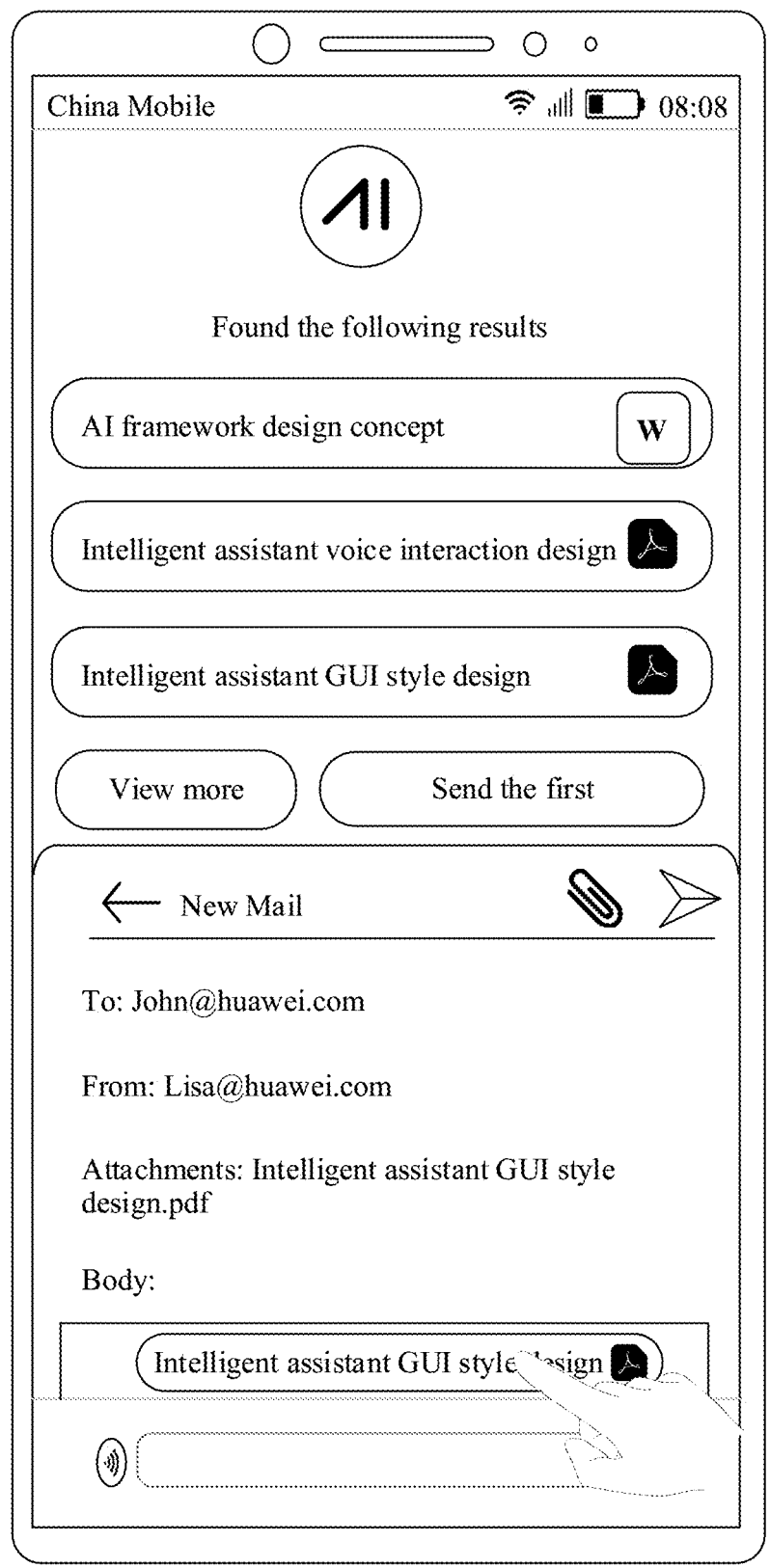
Figure 14F:
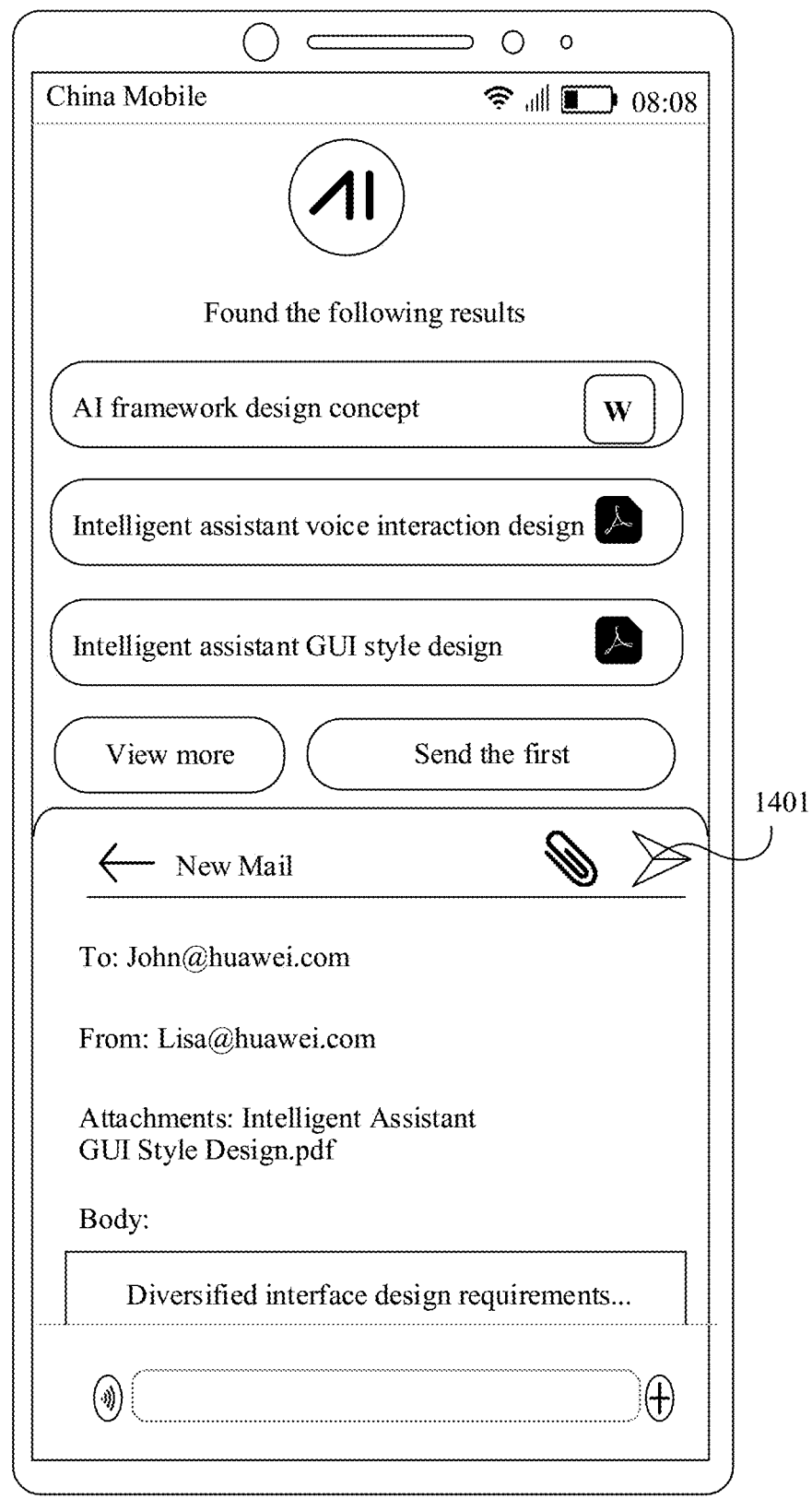

For example, after the mobile phone detects an operation of tapping, by the user, a shortcut control 1302 of "send a contact card" shown in FIG. 13E(a), the mobile phone sends the contact card of Alice through WeChat in the first interface, as shown in FIG. 13E(b).

Alternatively, after the mobile phone detects an operation of tapping, by the user, a shortcut control 1302 of "send a contact card" shown in FIG. 13E(a), a shadow control of the contact card of Alice may automatically move to the first interface, as shown in FIG. 13E(c). Then as shown in FIG. 13E(b), the contact card of Alice may be sent to a friend through WeChat in the first interface.

Alternatively, after the mobile phone detects an operation of tapping, by the user, a shortcut control 1302 of "send a contact card" shown in FIG. 13E(a), a shadow control of the contact card of Alice may automatically move to a message editing box of the first interface, as shown in FIG. 13E(d). Then as shown in FIG. 13E(b), the contact card of Alice may be sent to a friend through WeChat in the first interface.

For another example, after the mobile phone detects an operation of tapping, by the user, a shortcut control 1302 of "send a contact card" shown in FIG. 13E(a), the mobile phone may pop up a sharing list, so that the user selects a manner for sending or sharing the contact card of Alice, for example, the sharing list may include "send to messaging", "send to chat through WeChat", "share on moments", "Bluetooth", "shared on Weibo", "send email", and the like.

In some other embodiments, the shortcut control may alternatively be a control that is generated by the mobile phone according to a recent voice instruction of the user. Because an operation recently indicated by the user through a voice is likely to be re-executed, the user can conveniently and quickly perform a related operation again by using a shortcut control. For example, after the user indicates to "search for the contact card of Alice" through a voice, the mobile phone may generate a shortcut control of "search for the contact card of Alice".

In some other embodiments, in the case shown in FIG. 13A, the user may also indicate, through a voice, to send a contact card, so that the contact card of Alice may be sent to a friend through WeChat in the first interface in a manner shown in FIG. 13E(a) to FIG. 13E(d), or the contact card of Alice may be sent in a sharing manner in a sharing list popped up by the mobile phone.

For another example, the first interface is an email interface, and the data object is a document. After detecting that the user drags, to the email interface, a document found by the voice assistant on the interface of the voice assistant, the mobile phone adds the document as an attachment of an email, or uses content of the document as the body of an email, so that the user can send the document to others through the email.

For example, refer to FIG. 14A to FIG. 14D. After the document is dragged from the interface of the voice assistant to an attachment position of the email and is released, the mobile phone adds the data object as the attachment of the email. Then, the mobile phone can automatically send the email to the other party. Alternatively, the mobile phone may send the email to the other party after detecting an operation of tapping a sending control 1401 by the user.

For another example, refer to FIG. 14A, FIG. 14B, FIG. 14E, and FIG. 14F. In some embodiments, after the document is dragged from the interface of the voice assistant to a text box of the body of the email and is released, the mobile phone inserts content of the document into the body of the email. Then, the mobile phone can automatically send the email to the other party. Alternatively, the mobile phone may send the email to the other party after detecting an operation of tapping a sending control 1401 by the user.

In some other embodiments, after detecting that the user indicates, through a voice, to send a voice instruction of a smart assistant interface style design, the mobile phone may add a document of the smart assistant interface style design as an attachment or a body of an email on the first interface, and then send the document through the email.

In some other embodiments, when the data object is a file, the mobile phone may use the data object as an attachment of an email. When the data object is a segment of characters, the mobile phone can insert the data object into a body of an email.

Figure 15A:
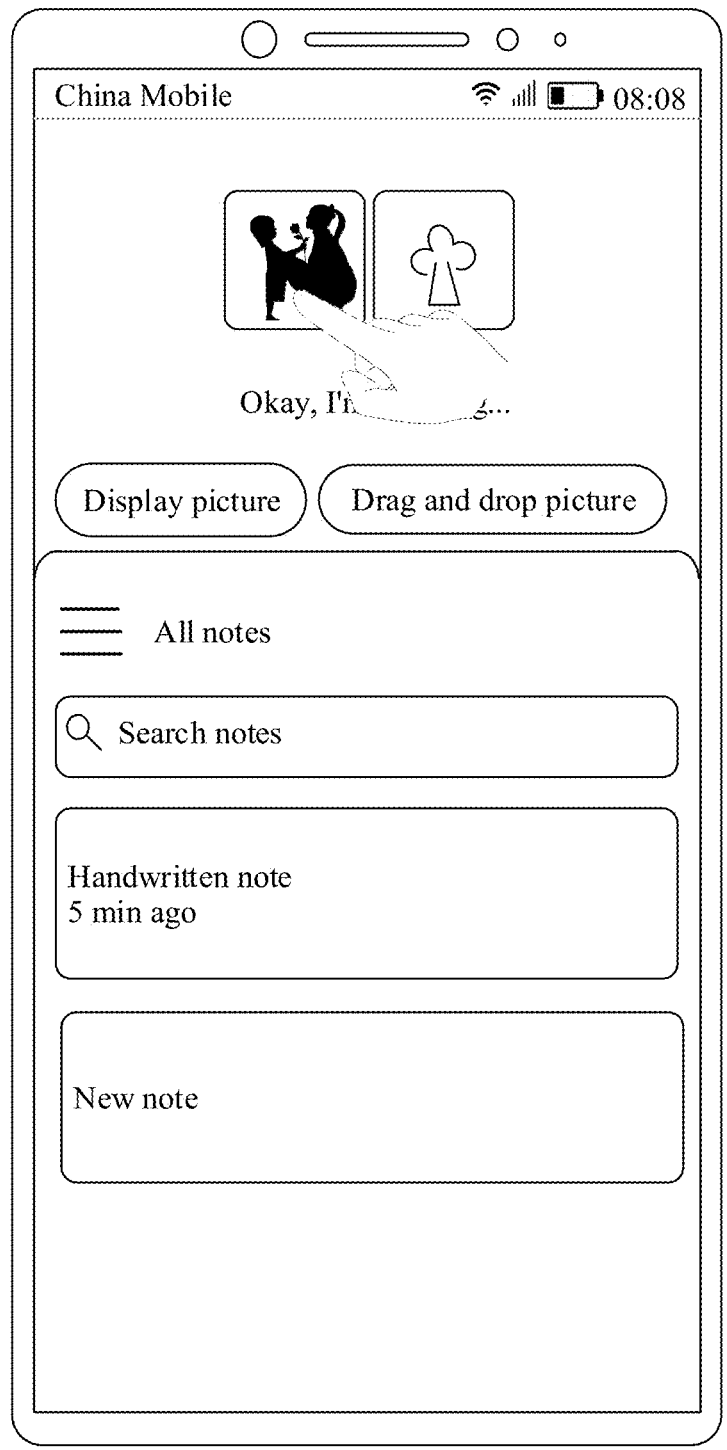
FIG. 15A to FIG. 15F are schematic diagrams of another group of interfaces according to an embodiment of this application.
Figure 15B:
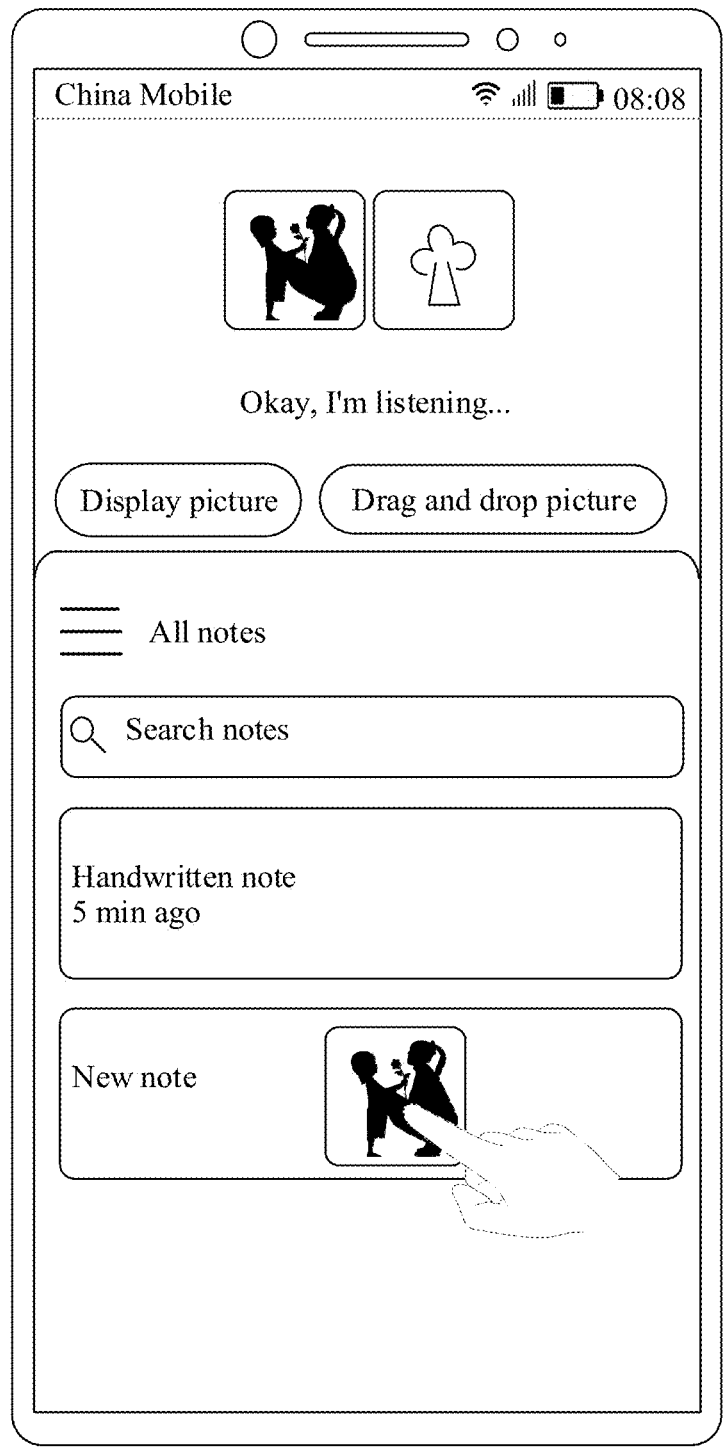
Figure 15C:
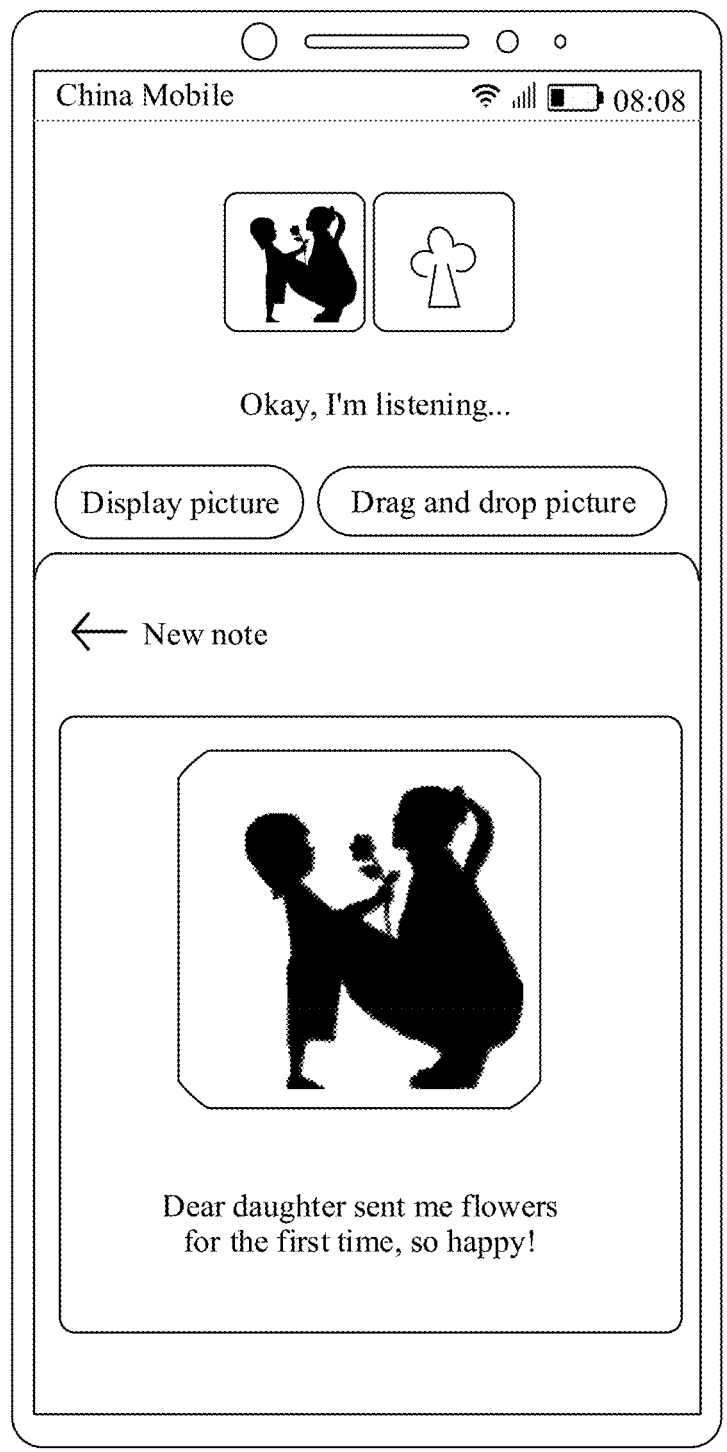

For another example, the first interface is a memo interface, and the data object is a picture, a file, a contact card, or the like obtained by the voice assistant. For example, refer to FIG. 15A and FIG. 15B. After the mobile phone detects that the user drags a picture obtained by the voice assistant on the interface of the voice assistant to a position of "new note" in the memo interface, as shown in FIG. 15C, the mobile phone adds the picture to a new note.

Figure 15D:
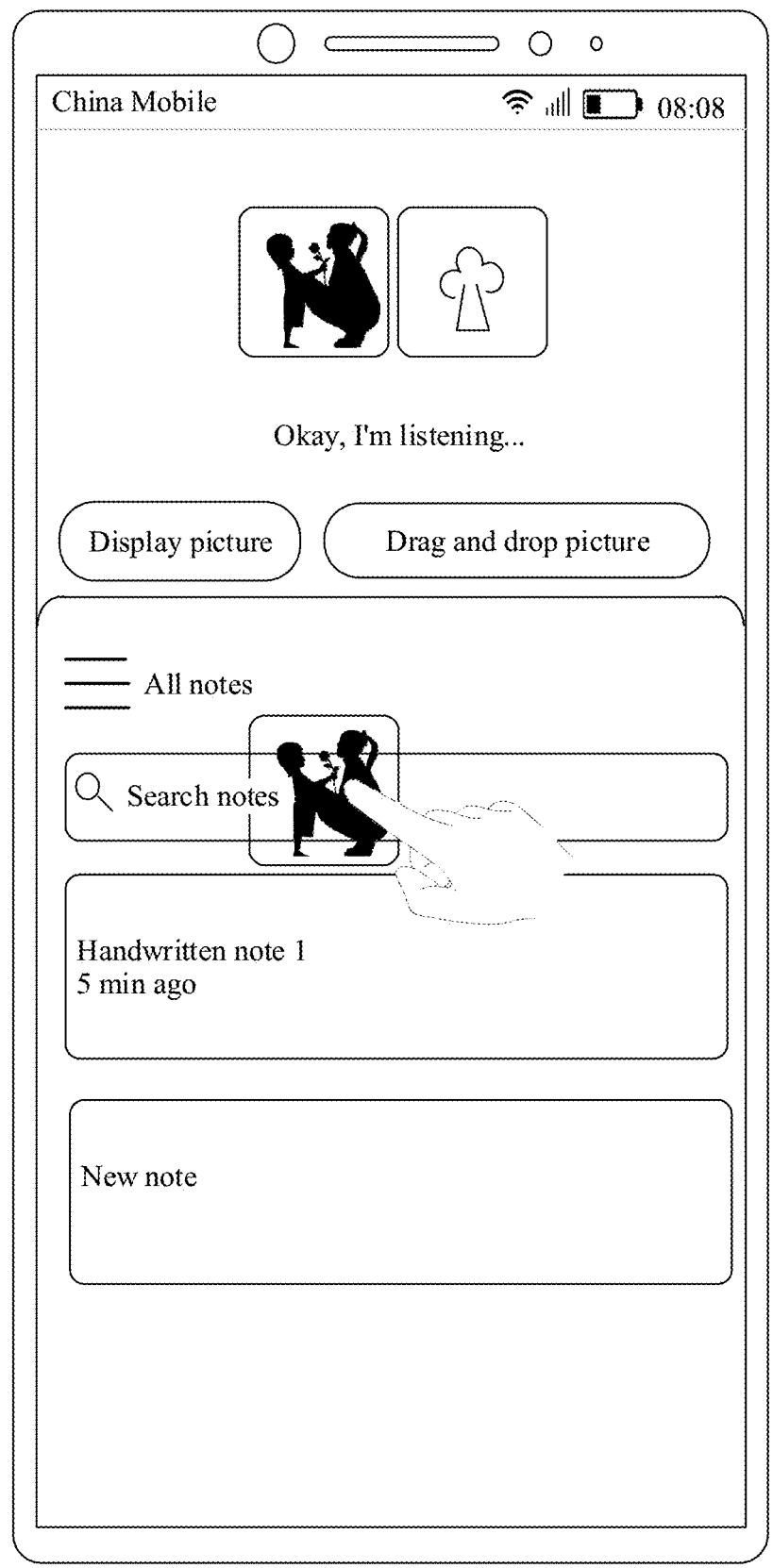
Figure 15E:
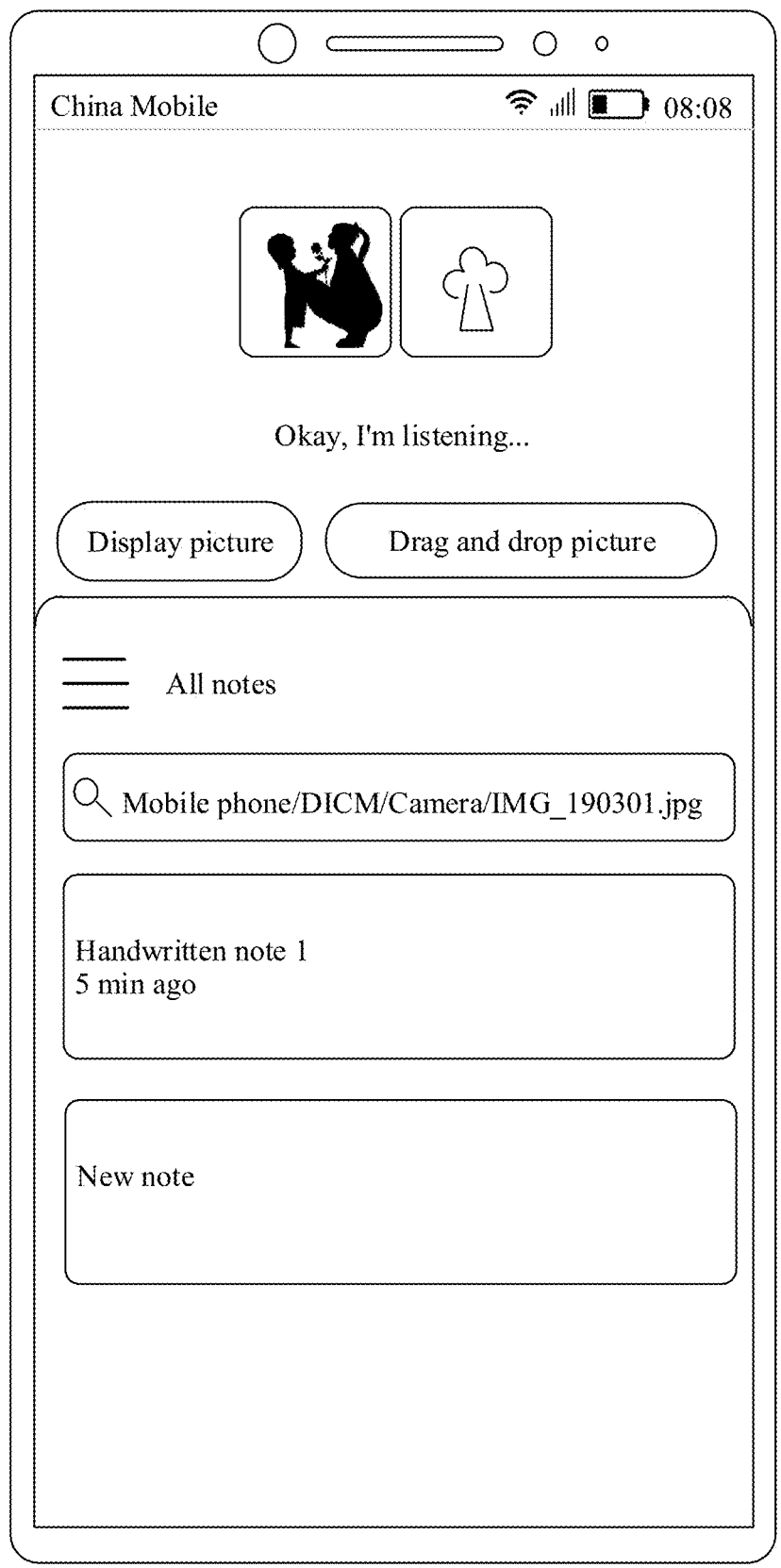
Figure 15F:
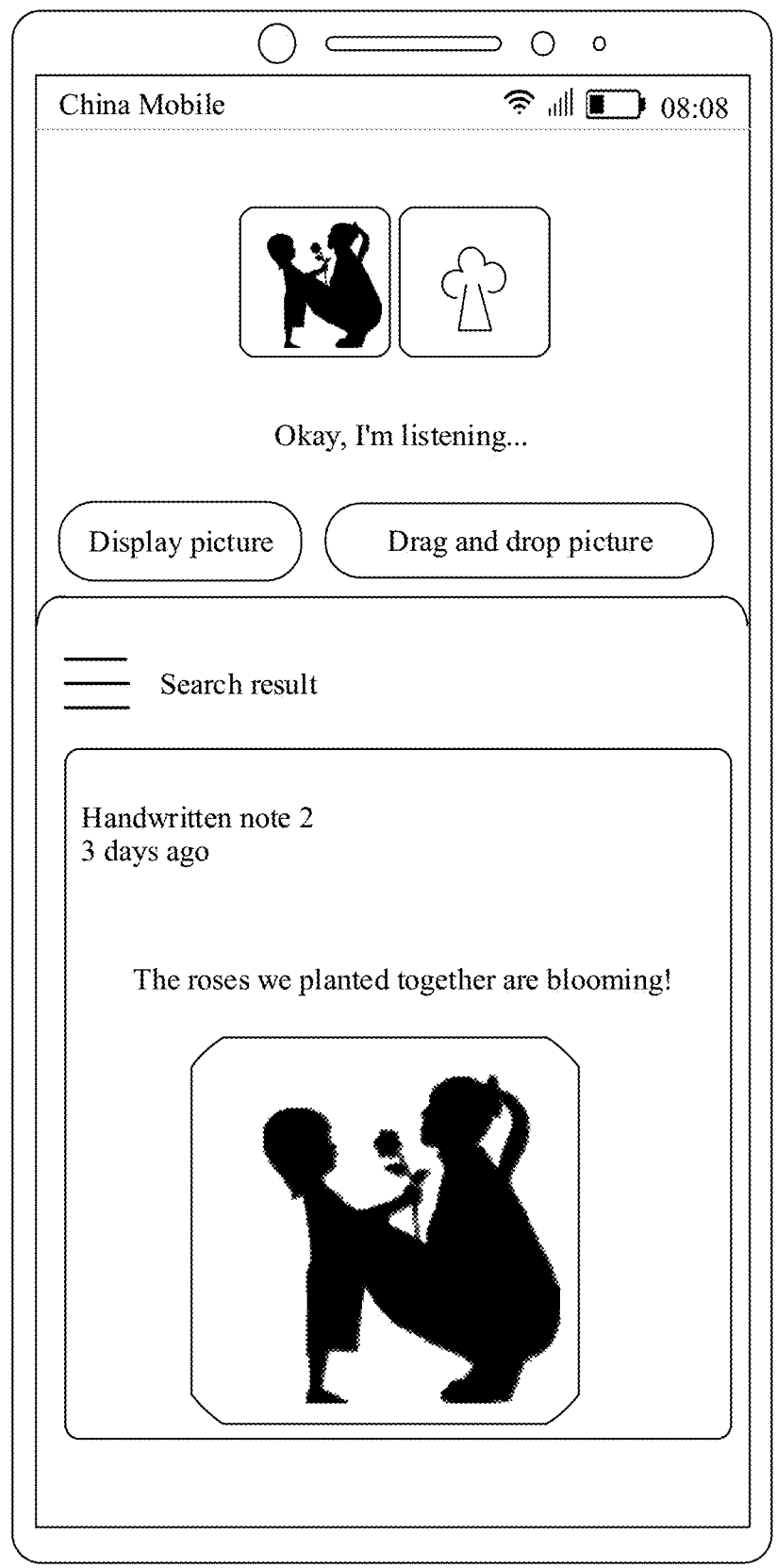

For another example, refer to FIG. 15D and FIG. 15E. After the mobile phone detects that the user drags a picture obtained by the voice assistant on the interface of the voice assistant to a position of a note search box in the memo interface, the mobile phone searches established notes for a note related to the picture. In some embodiments, the mobile phone may obtain identification information of the picture, for example, a name, a storage address, or an ID, to search, based on the identification information, for a note including the picture. For example, refer to FIG. 15F. The mobile phone finds a handwritten note 2 including the picture.

Figure 16A:
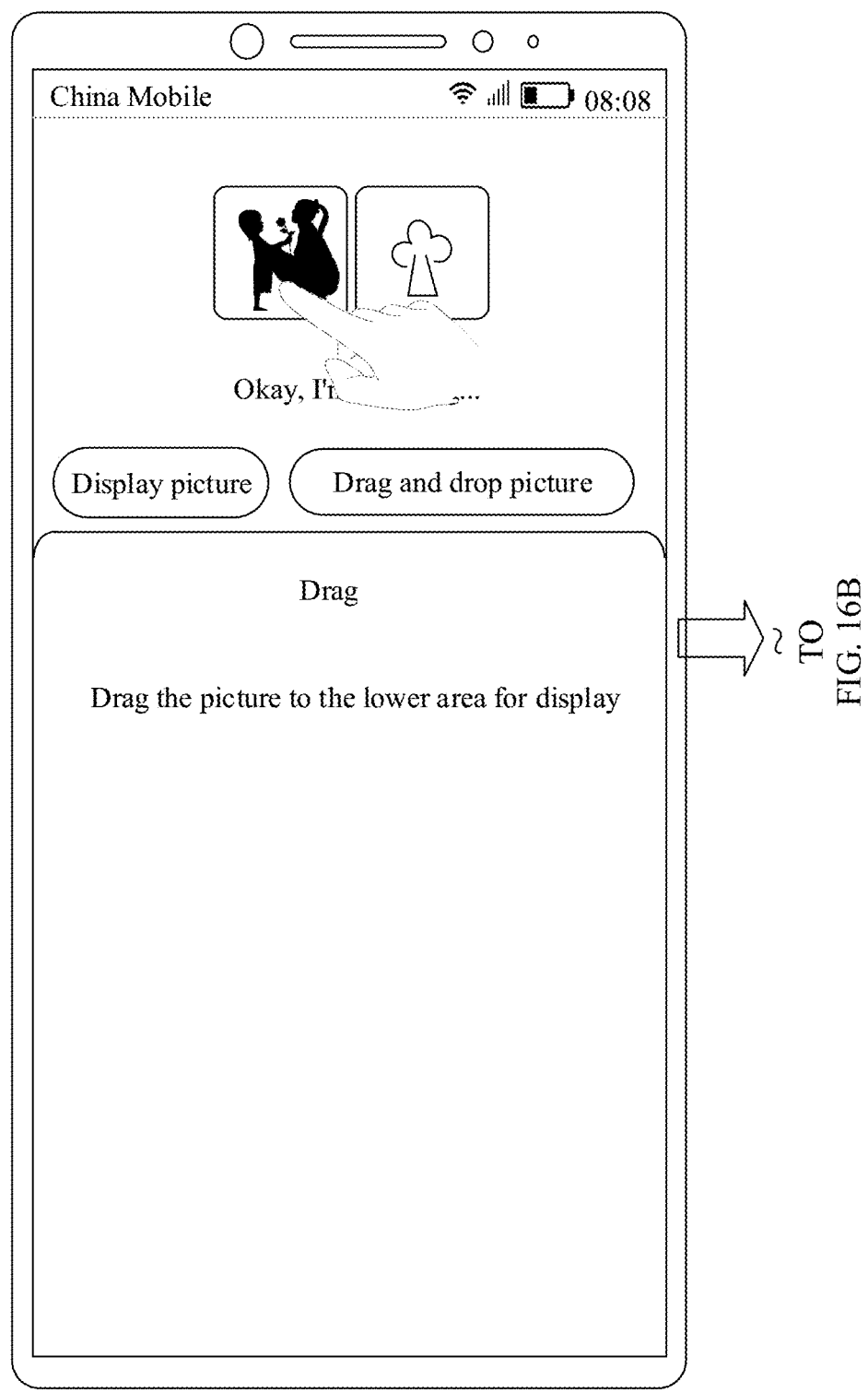
FIG. 16A to FIG. 16C are schematic diagrams of another group of interfaces according to an embodiment of this application.
Figure 16B:
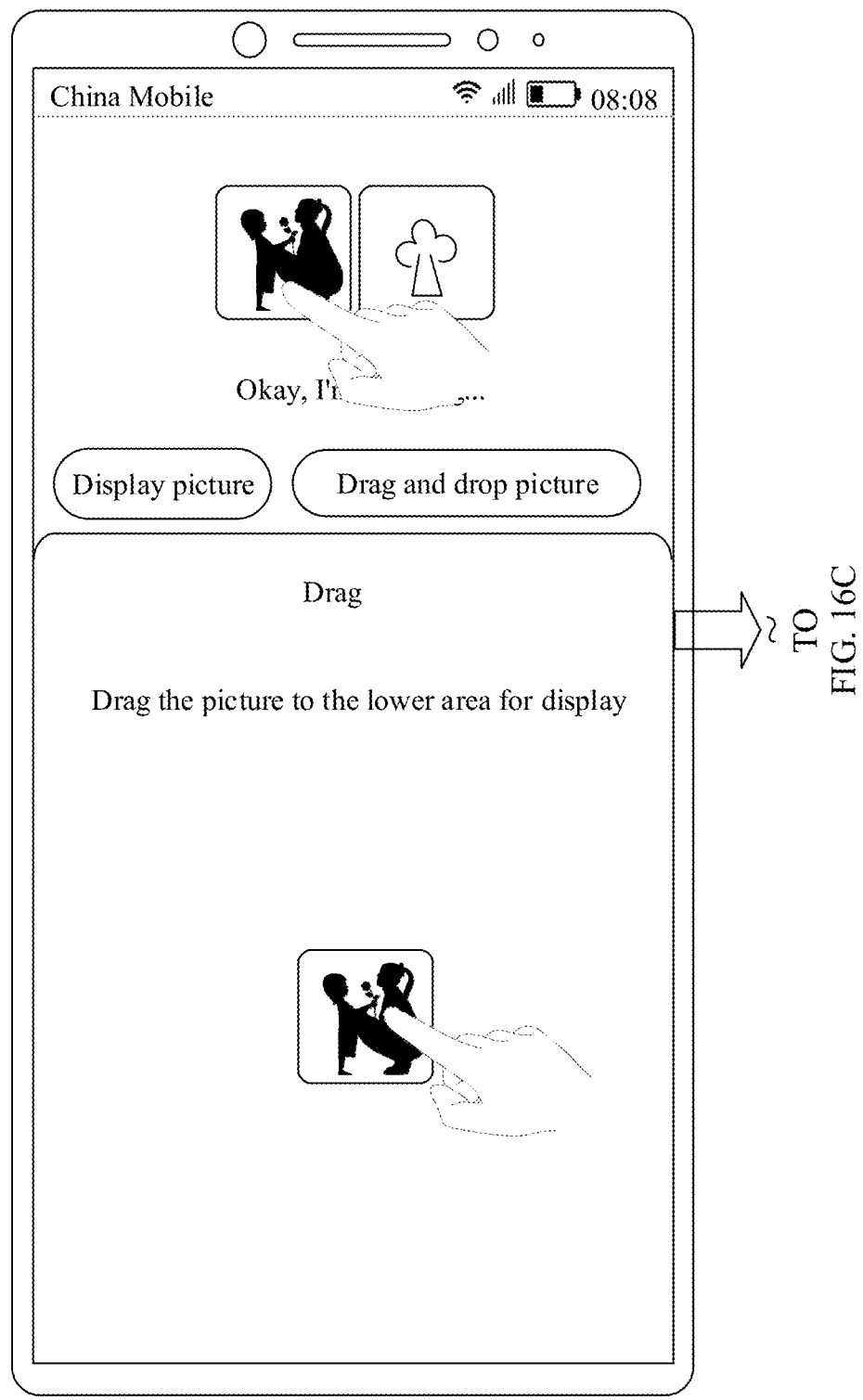
Figure 16C:
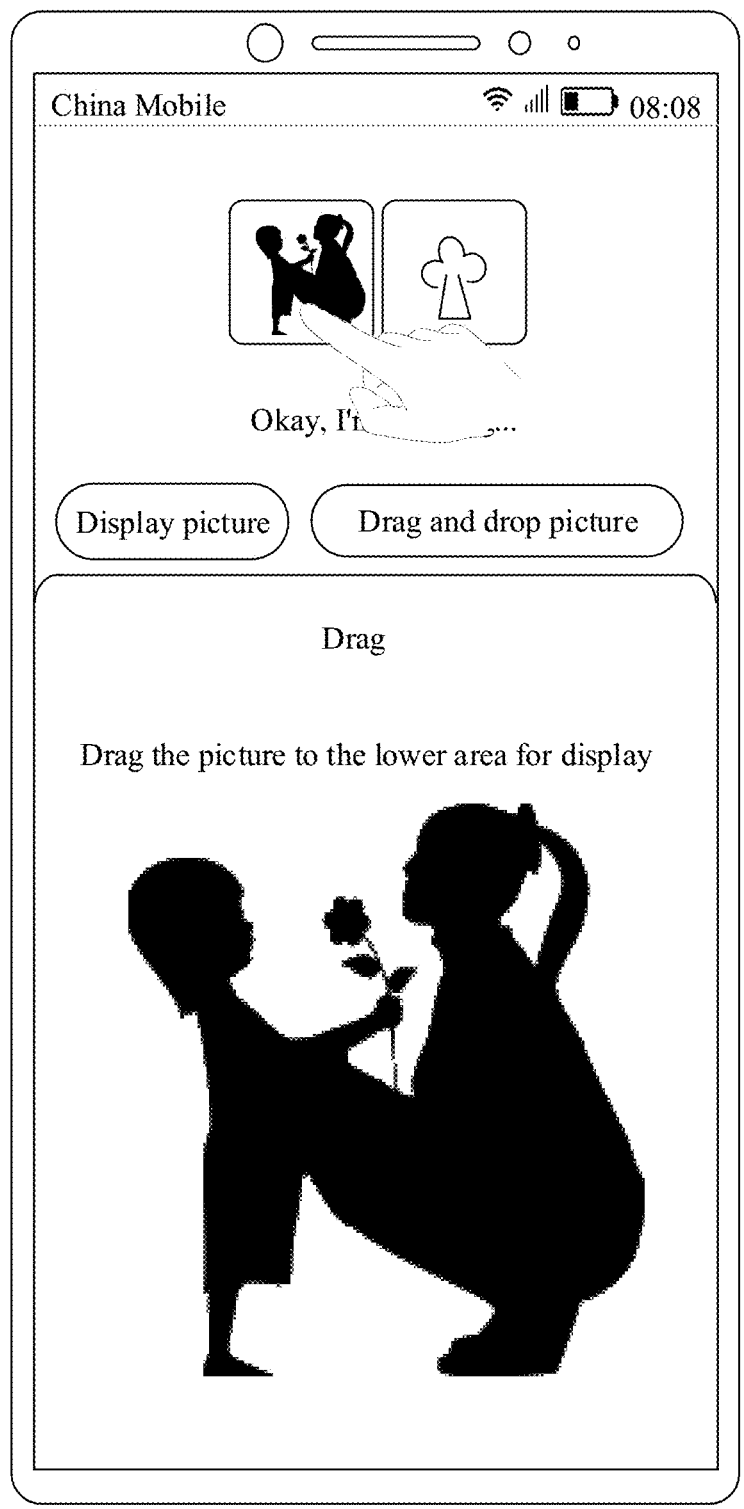

For another example, the first interface is an interface of an image display application (for example, may be a gallery), and the data object is a picture. Refer to FIG. 16A to FIG. 16C. After the mobile phone detects that the user drags the picture obtained by the voice assistant on the interface of the voice assistant to the interface of the image display application, the mobile phone scales up and displays the picture on the interface of the image display application.

For another example, the first interface is an interface of a contact application, and the data object is contact information such as a phone number or a contact card obtained by the voice assistant. The user may drag the contact information in the interface of the voice assistant to the interface of the contact application, to generate a new contact.

For another example, the first interface is a home screen, and the data object is an application icon obtained by the voice assistant. The user can drag the contact information in the interface of the voice assistant to the home screen, so that the application icon is displayed on the home screen.

For another example, the first interface is a WeChat interface, and a WeChat friend requests the user to send contact information of Tom. The user may drag a text "contact information of Tom" sent by the WeChat friend in the WeChat interface to the interface of the voice assistant. Then, the voice assistant finds a contact card of Tom. The user can drag the contact card of Tom in the interface of the voice assistant to the WeChat interface, and the WeChat sends the contact card of Tom to the friend.

In some embodiments, when the mobile phone simultaneously displays the interface of the voice assistant and the first interface, the mobile phone may display the interface of the voice assistant or the first interface in full screen according to an indication of the user. In addition, in a dynamic process of switching from a half-screen mode to a full-screen mode of displaying the interface of the voice assistant or the first interface, the mobile phone performs corresponding animation display.

For example, when the mobile phone simultaneously displays the interface of the voice assistant and the first interface, if the mobile phone detects an operation in which the user indicates to exit the voice assistant, the mobile phone may stop displaying the interface of the voice assistant, and display the first interface in full screen. For example, the user may indicate, through a voice, to exit the voice assistant. For another example, the user may hold and drag up the interface of the voice assistant, to indicate to exit the voice assistant. An operation in which the user indicates to exit the voice assistant and an operation in which the user indicates to start the voice assistant may be the same or different.

Figure 17A:
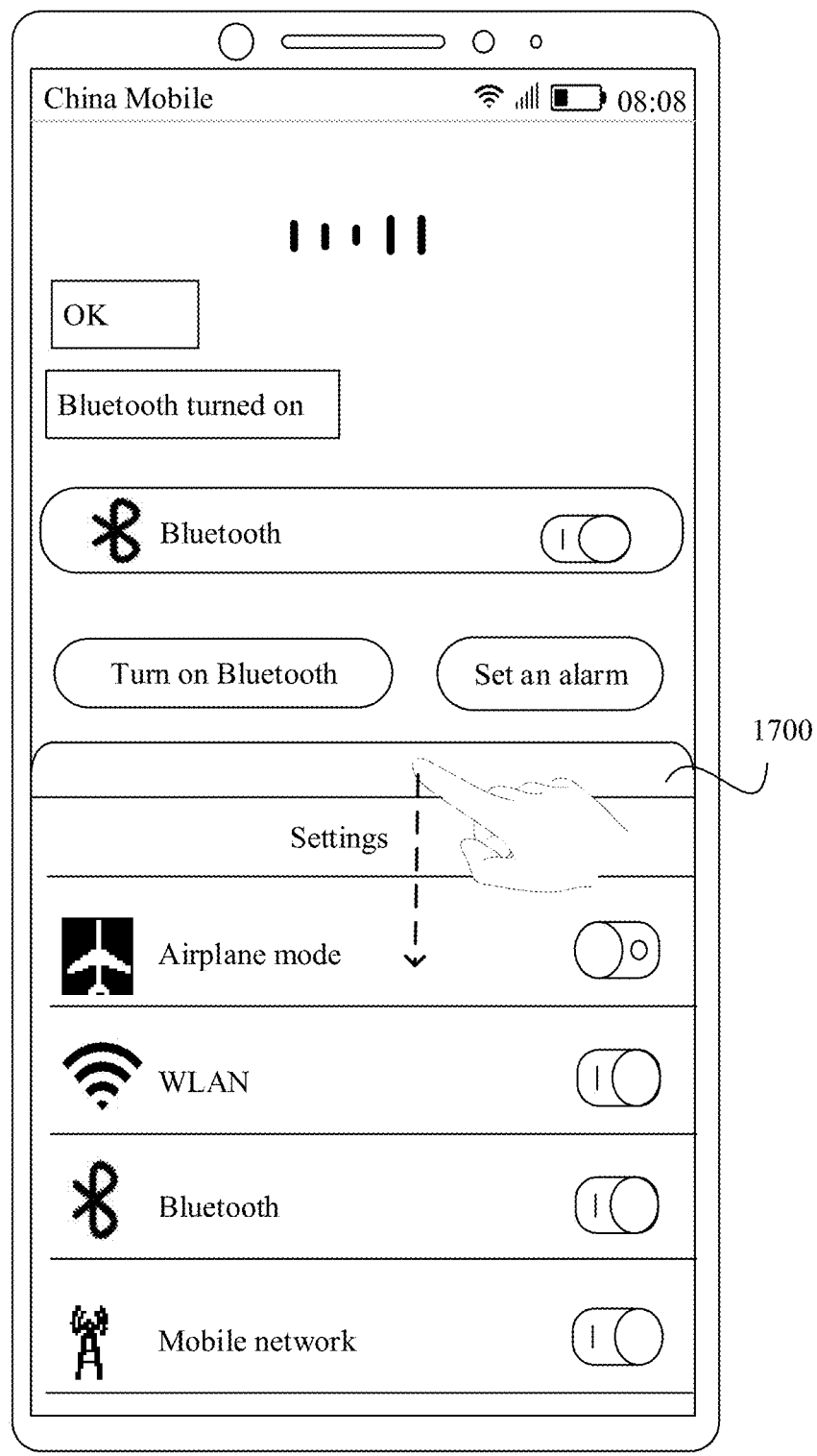
FIG. 17A and FIG. 17D are schematic diagrams of another group of interfaces according to an embodiment of this application.
Figure 17B:
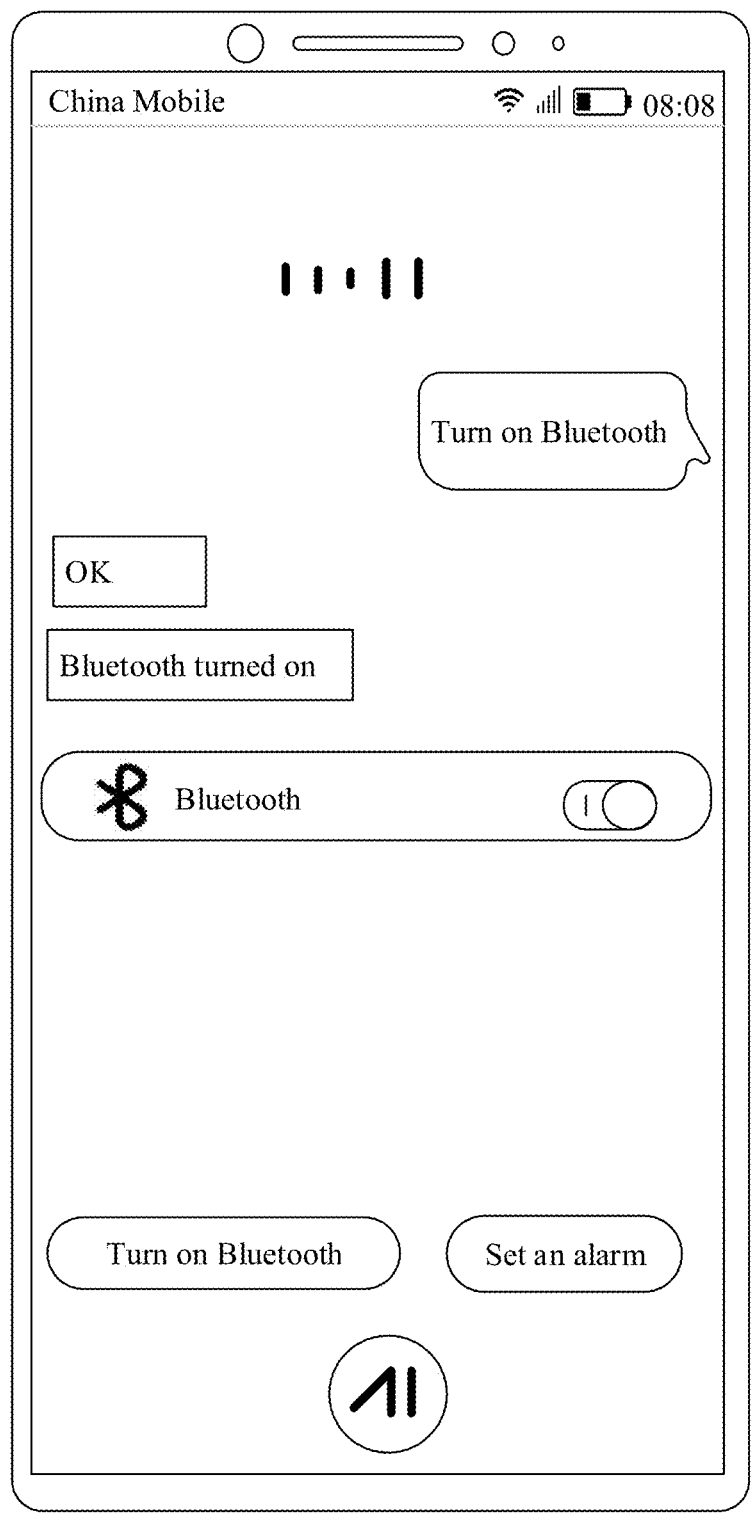
Figure 17C:
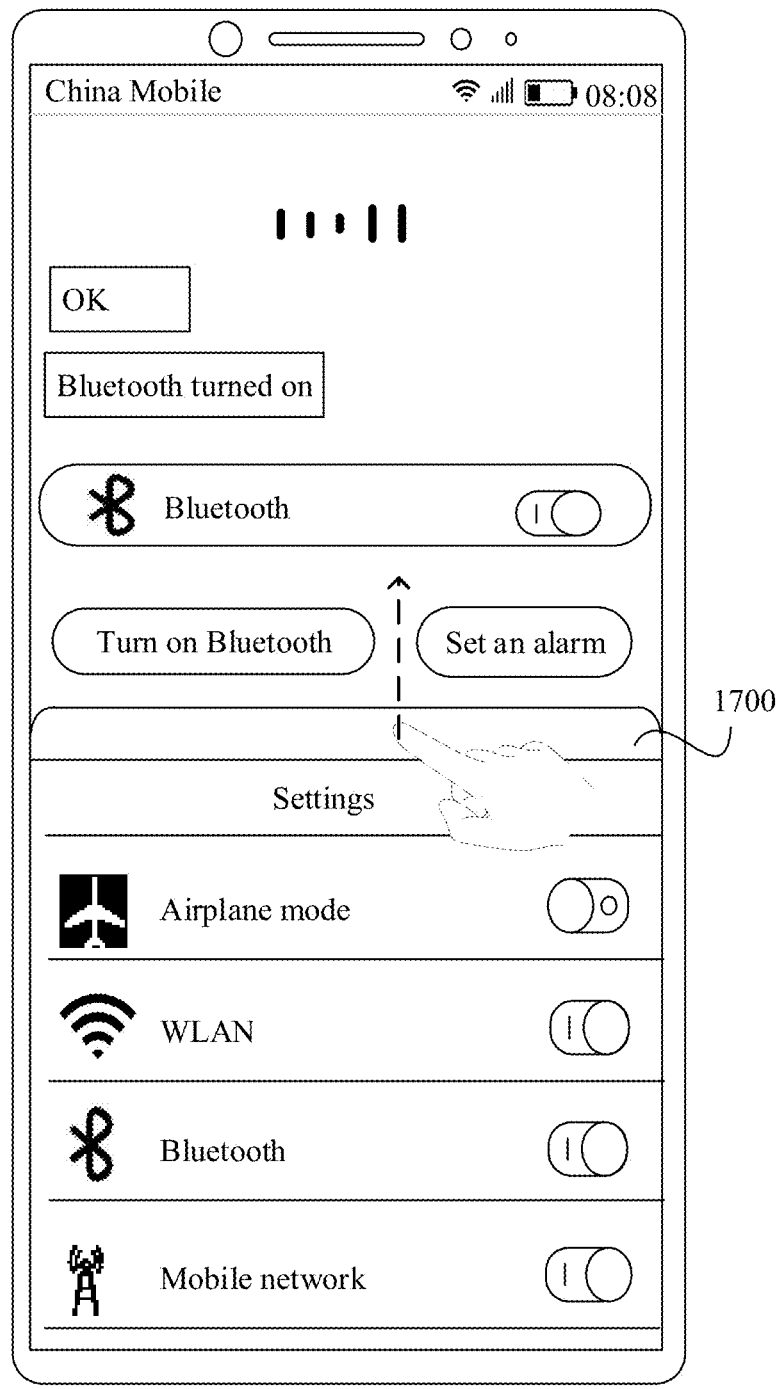
Figure 17D:
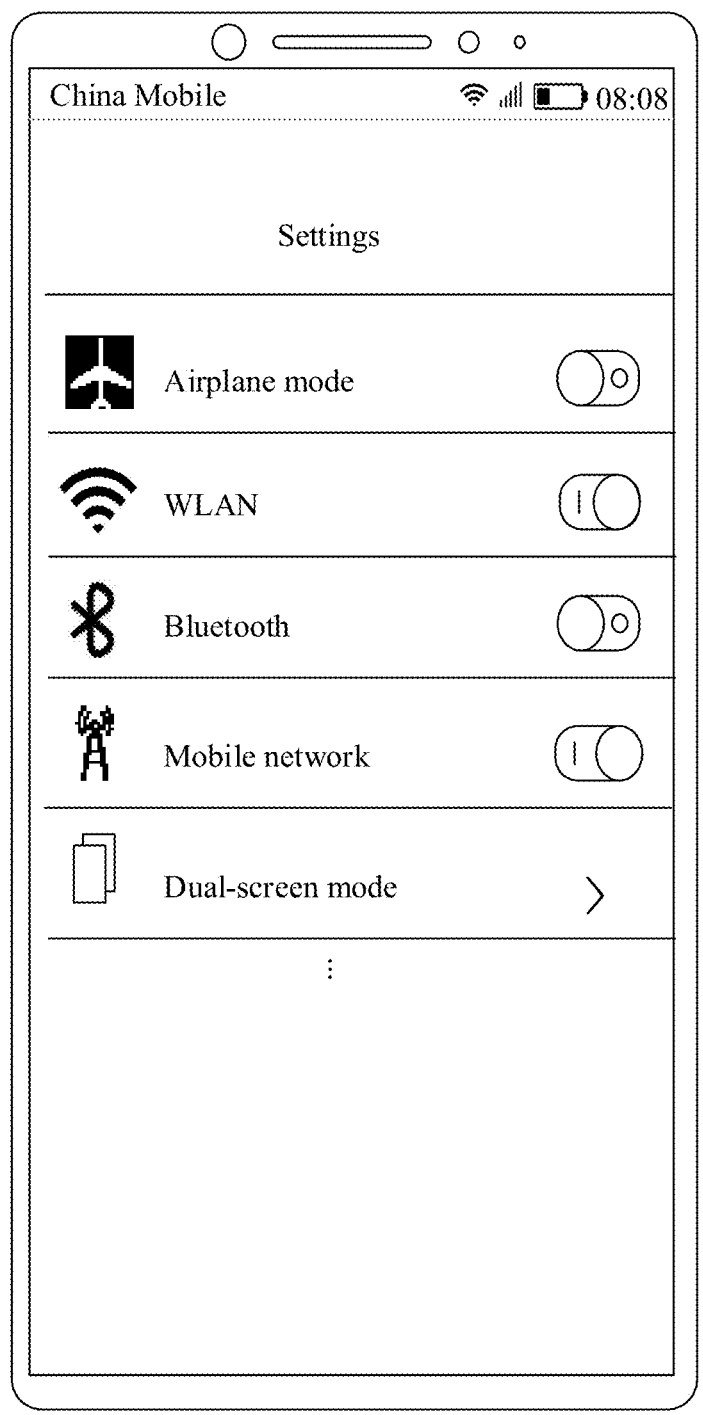

For another example, when the interface of the voice assistant and the first interface are displayed at the same time, refer to FIG. 17A and FIG. 17B. If the mobile phone detects an operation in which the user holds and swipes down a boundary area 1700 between the interface of the voice assistant and the first interface, the mobile phone exits from displaying the first interface, and displays the interface of the voice assistant in full screen. Refer FIG. 17C and FIG. 17D. If the mobile phone detects an operation in which the user holds and swipes up the boundary area 1700 between the interface of the voice assistant and the first interface, the mobile phone exits from displaying the interface of the voice assistant, and the first interface moves upward, so that the first interface is displayed in full screen.

For another example, when the interface of the voice assistant and the first interface are simultaneously displayed, the mobile phone displays a control 1 for full-screen display. As an example, the control 1 may be a control 1801 shown in FIG. 18A, and the control 1801 may be located in a boundary area 1800 between the interface of the voice assistant and the first interface. Alternatively, the control 1 may be a control 1802 shown in FIG. 18B, and the control 1802 may be located at the top of the first interface. Alternatively, the control 1 may be a control 1803 shown in FIG. 18C, and the control 1803 may be located at a position such as the bottom of the interface of the voice assistant. It may be understood that the control 1 may also be in another form. For example, the control 1 may be a control 1804 shown in FIG. 18D, and may be specifically an upward arrow.

Figure 18A:
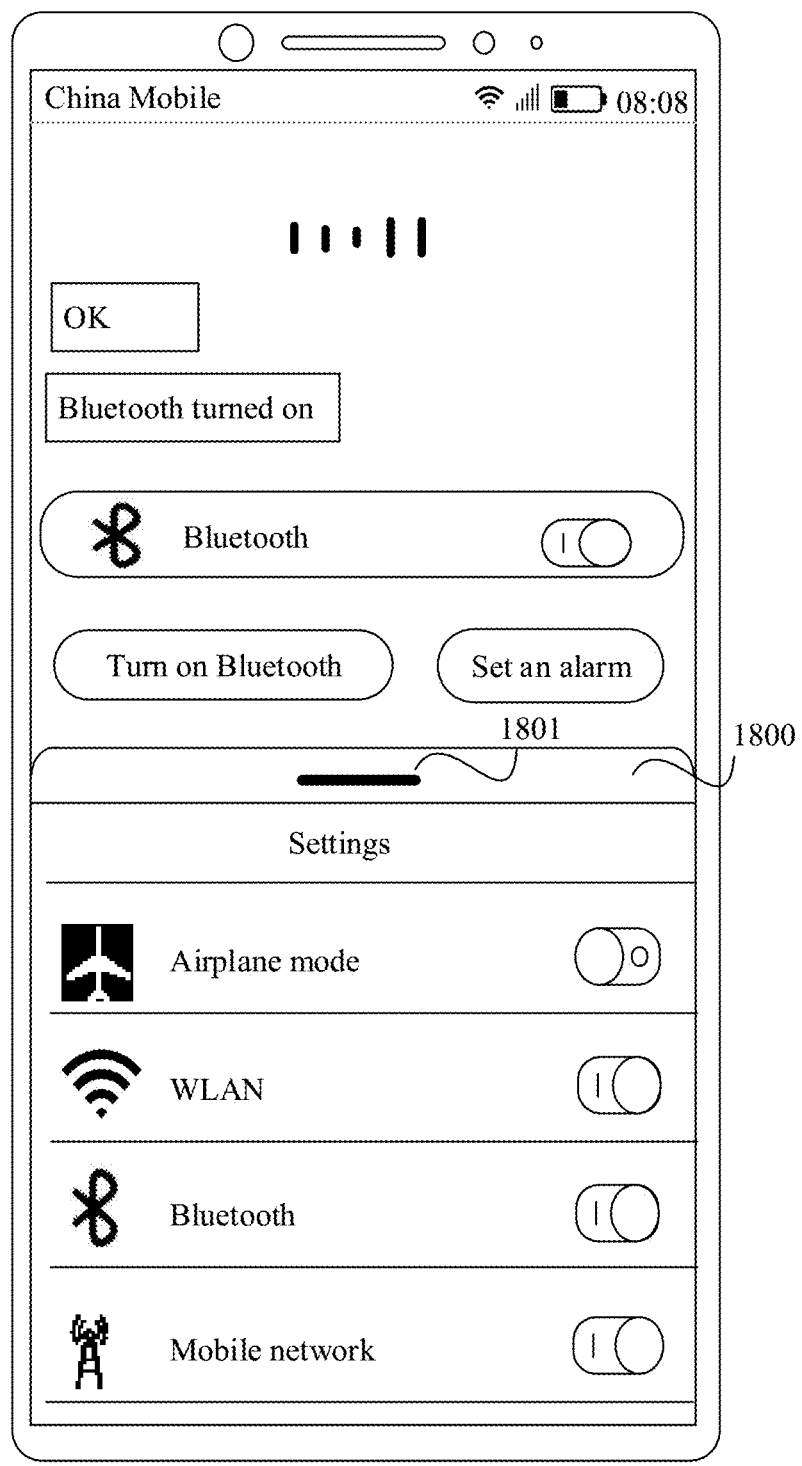
FIG. 18A to FIG. 18D are schematic diagrams of another group of interfaces according to an embodiment of this application.
Figure 18B:
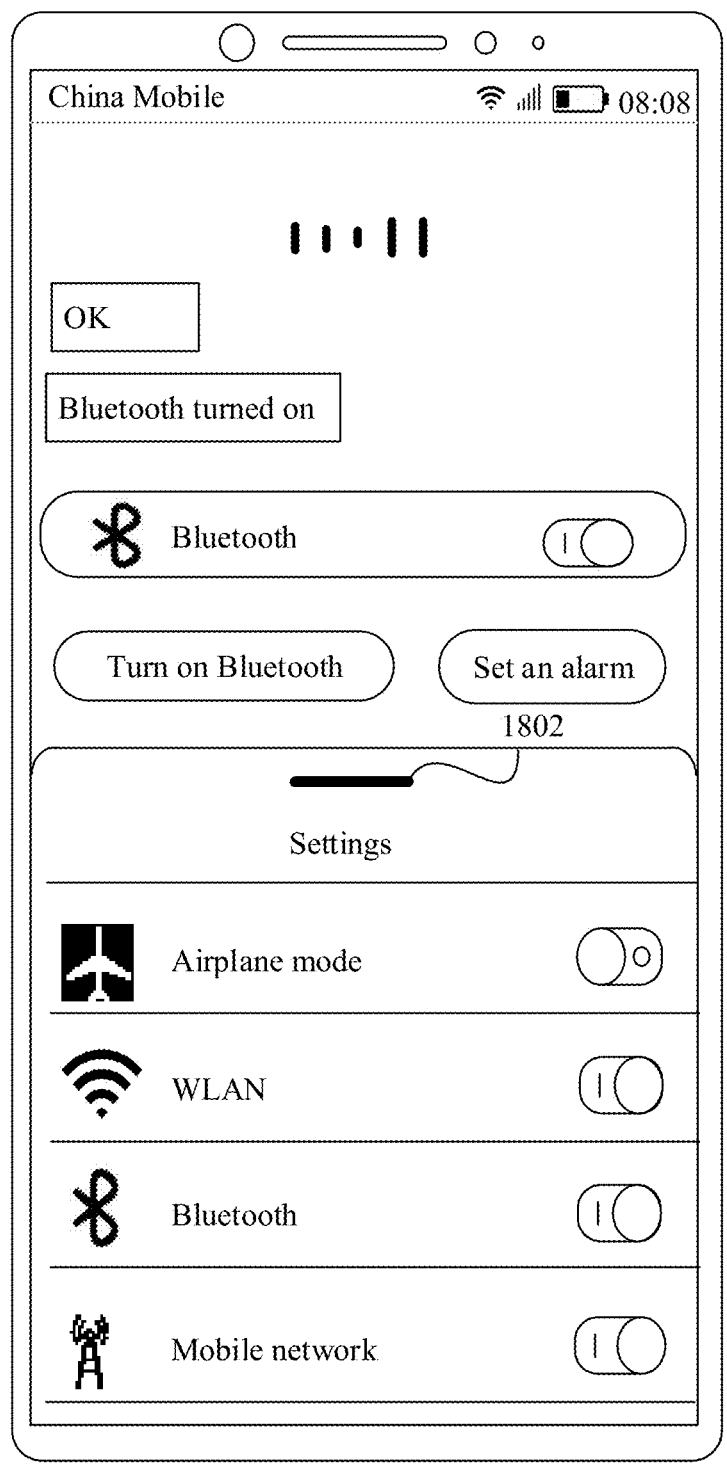
Figure 18C:
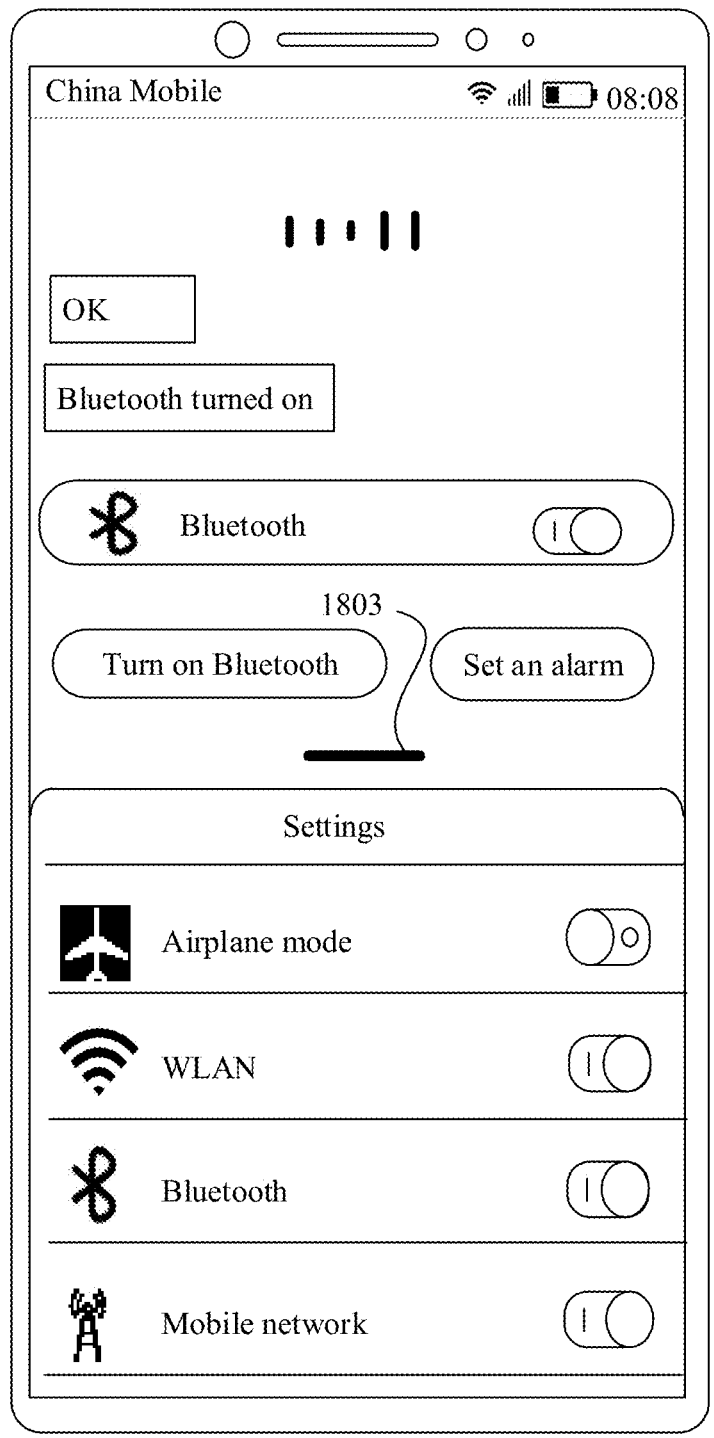
Figure 18D:
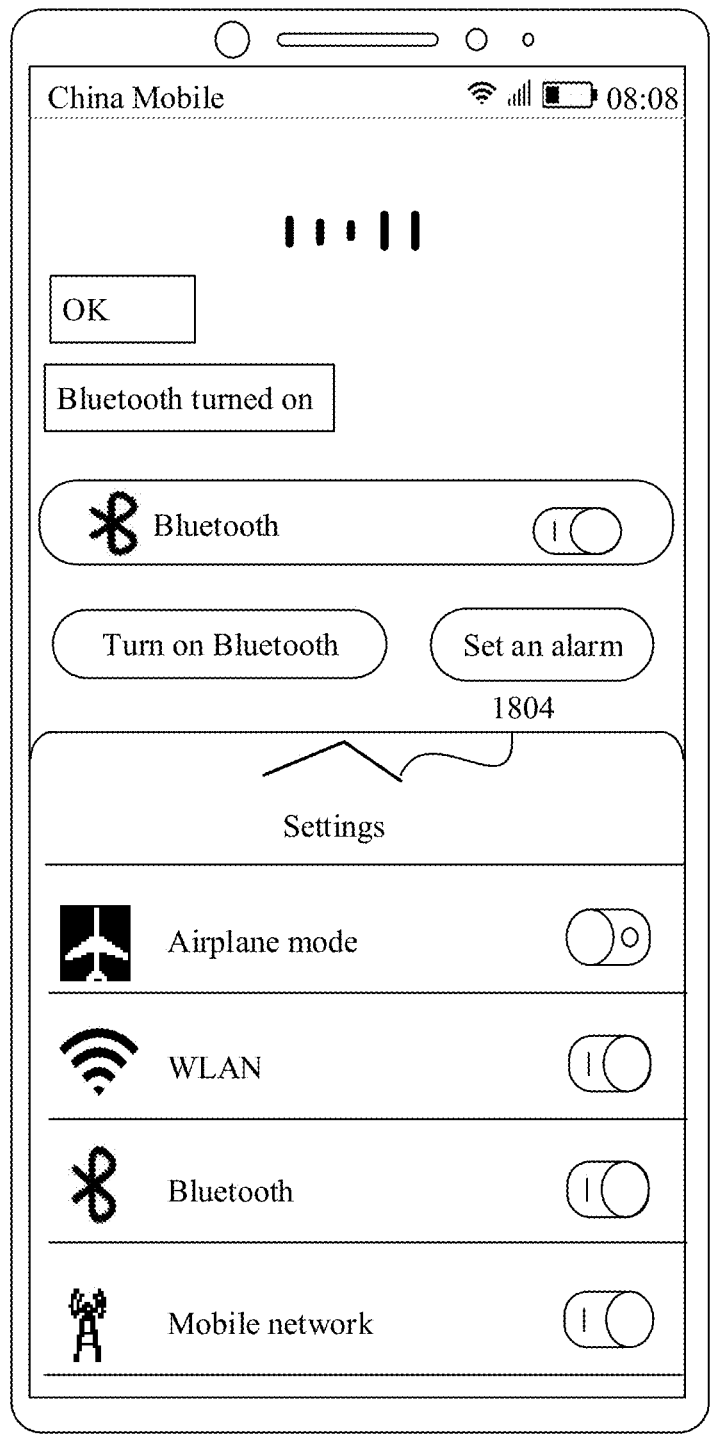

When the interface of the voice assistant and the first interface are simultaneously displayed, if the mobile phone detects an operation of swiping up for the control 1801 shown in FIG. 18A (that is, swiping from the control 1801 to the second area) by the user, or an operation of swiping up near the control 1801 (for example, in the boundary area 1800 in which the control 1801 is located) by the user, the mobile phone exits from displaying the interface of the voice assistant, and the first interface moves upward, so that the first interface is displayed in full screen. Alternatively, when the interface of the voice assistant and the first interface are simultaneously displayed, if the mobile phone detects an operation of swiping down for the control 1801 by the user, or an operation of swiping down near the control 1801 (for example, in the boundary area 1800 in which the control 1801 is located) by the user, the mobile phone exits from displaying the first interface, and displays the interface of the voice assistant in full screen.

Figure 19A:
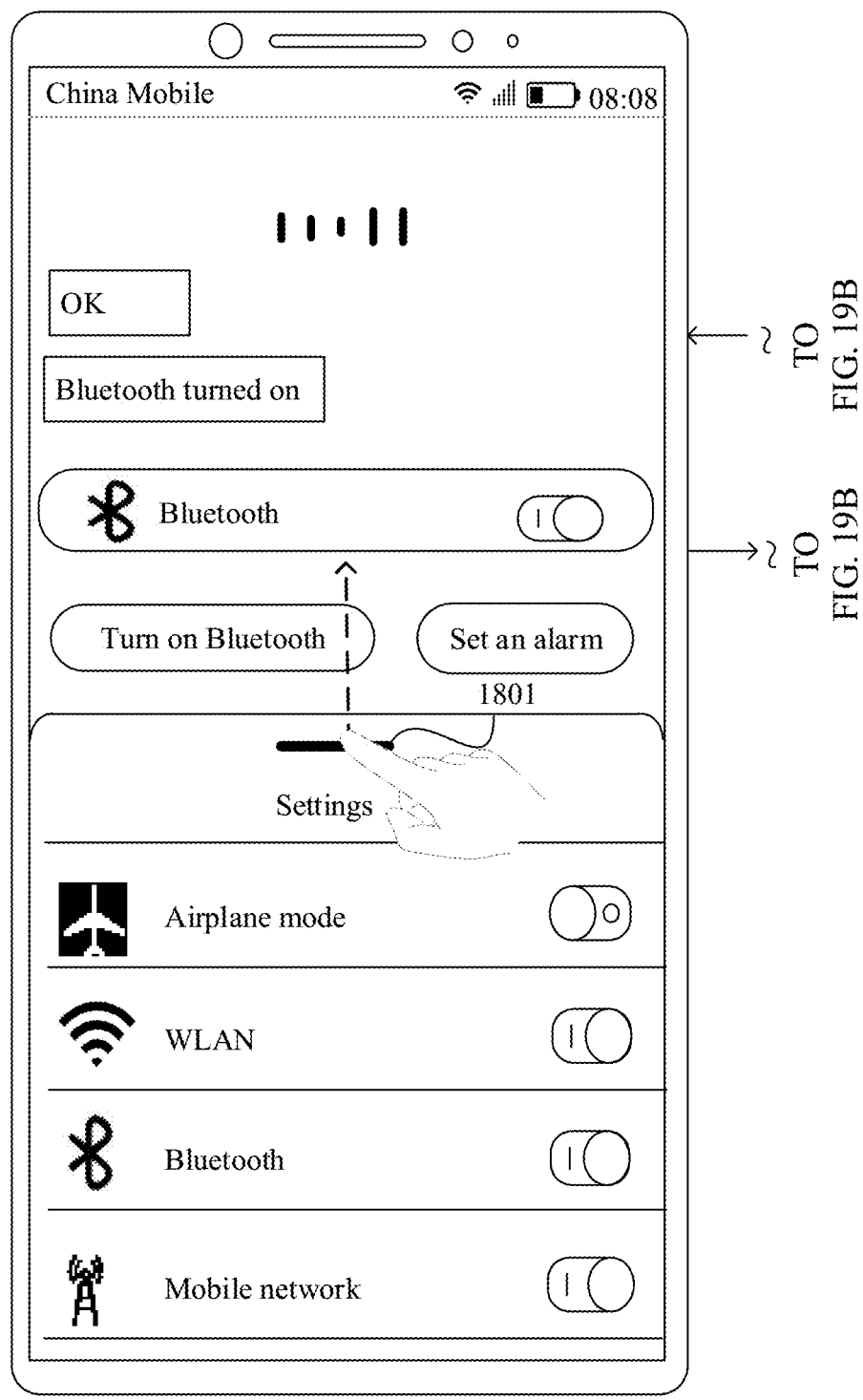
FIG. 19A to FIG. 19C are schematic diagrams of another group of interfaces according to an embodiment of this application.
Figure 19B:
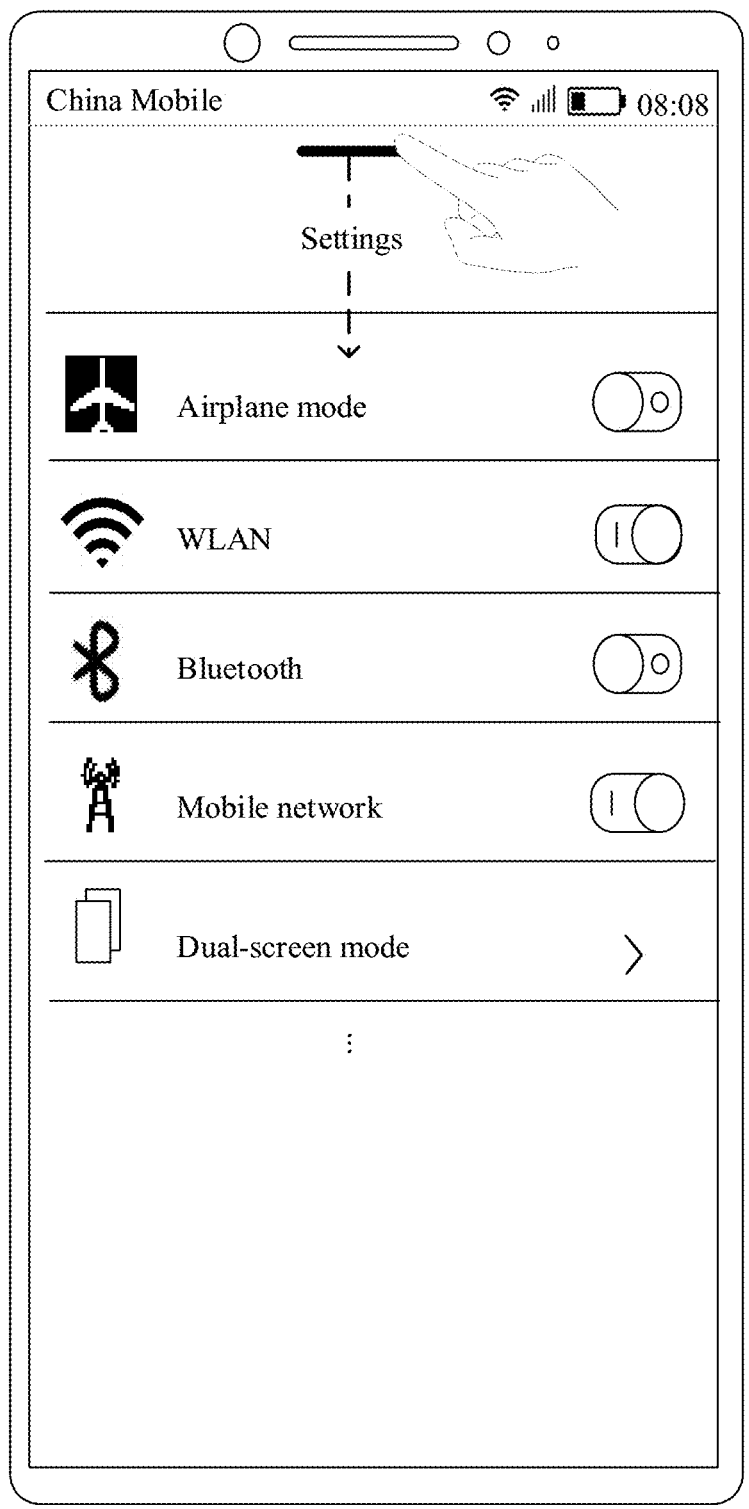
Figure 19C:
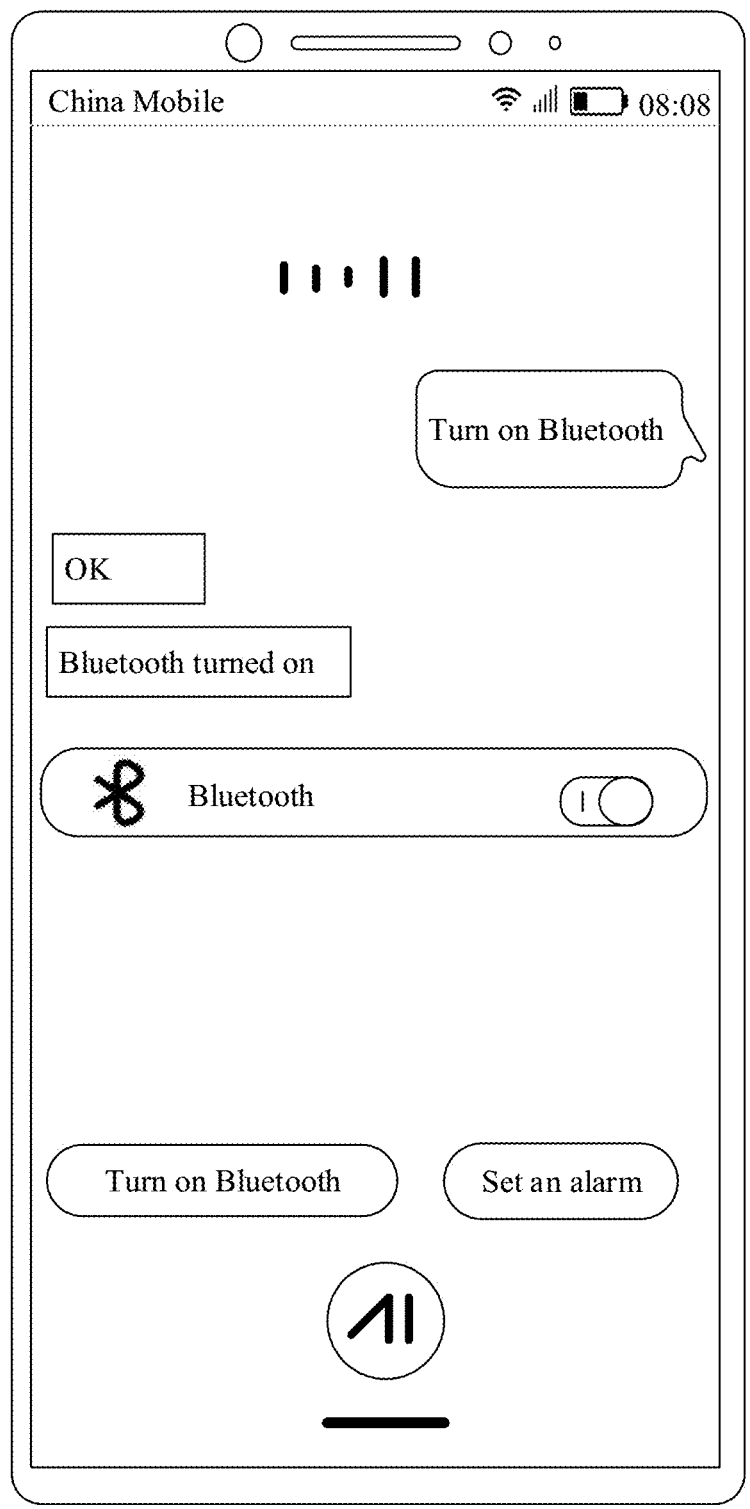

When the interface of the voice assistant and the first interface are simultaneously displayed, if the mobile phone detects an operation of swiping up for a control 1 shown in FIG. 19A by the user, refer to FIG. 19B. The mobile phone exits from displaying the interface of the voice assistant, and the first interface moves upward, so that the first interface is displayed in full screen. Subsequently, if the mobile phone detects an operation of swiping down for the control 1 by the user, in some embodiments, the mobile phone restores a previous state in which the interface of the voice assistant and the first interface are simultaneously displayed as shown in FIG. 19A; or in some other embodiments, refer to FIG. 19C, and the mobile phone exits from displaying the first interface, and displays the interface of the voice assistant in full screen. Alternatively, after the first interface is displayed in full screen as shown in FIG. 19B, after the mobile phone detects an operation in which the user indicates to start the voice assistant, the mobile phone may also restore a previous state in which the interface of the voice assistant and the first interface are simultaneously displayed in FIG. 19A.

When the interface of the voice assistant and the first interface are simultaneously displayed, if the mobile phone detects the operation of swiping down for the control 1 by the user, the mobile phone exits from displaying the first interface, and displays the interface of the voice assistant in full screen. Subsequently, if the mobile phone detects the operation of swiping up the control 1 by the user, in some embodiments, the mobile phone restores the previous state in which the interface of the voice assistant and the first interface are simultaneously displayed; or in some other embodiments, the mobile phone exits from displaying the first interface, and displays the interface of the voice assistant in full screen. Alternatively, after the first interface is displayed in full screen, after the mobile phone detects the operation in which the user indicates to start the voice assistant, the mobile phone may also restore the previous state in which the interface of the voice assistant and the first interface are simultaneously displayed.

For another example, when the interface of the voice assistant and the first interface are simultaneously displayed, the mobile phone displays a control 2 and a control 3. For example, the control 2 may be a control 2001 shown in FIG. 20A and FIG. 20B, and the control 3 may be a control 2002 shown in FIG. 20A and FIG. 20B. The control 2 and the control 3 may be located at the top of the first interface, or is located at the bottom of the interface of the voice assistant, or is located at a location such as a boundary area between the interface of the voice assistant and the first interface. Alternatively, the control 2 may be located at the bottom of the interface of the voice assistant, and the control 3 may be located at the top of the first interface.

Figure 20A:
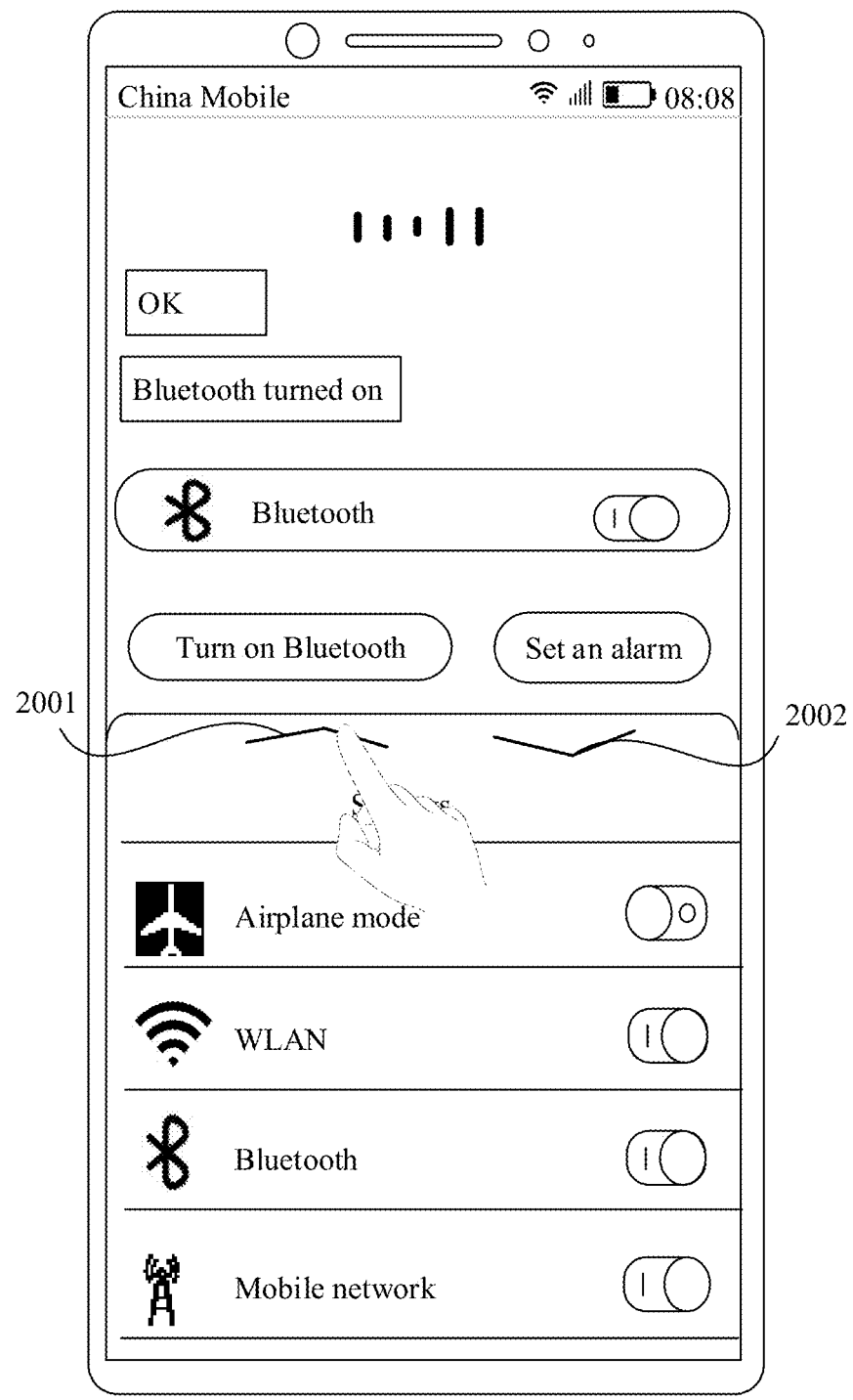
FIG. 20A to FIG. 20D are schematic diagrams of another group of interfaces according to an embodiment of this application.
Figure 20B:
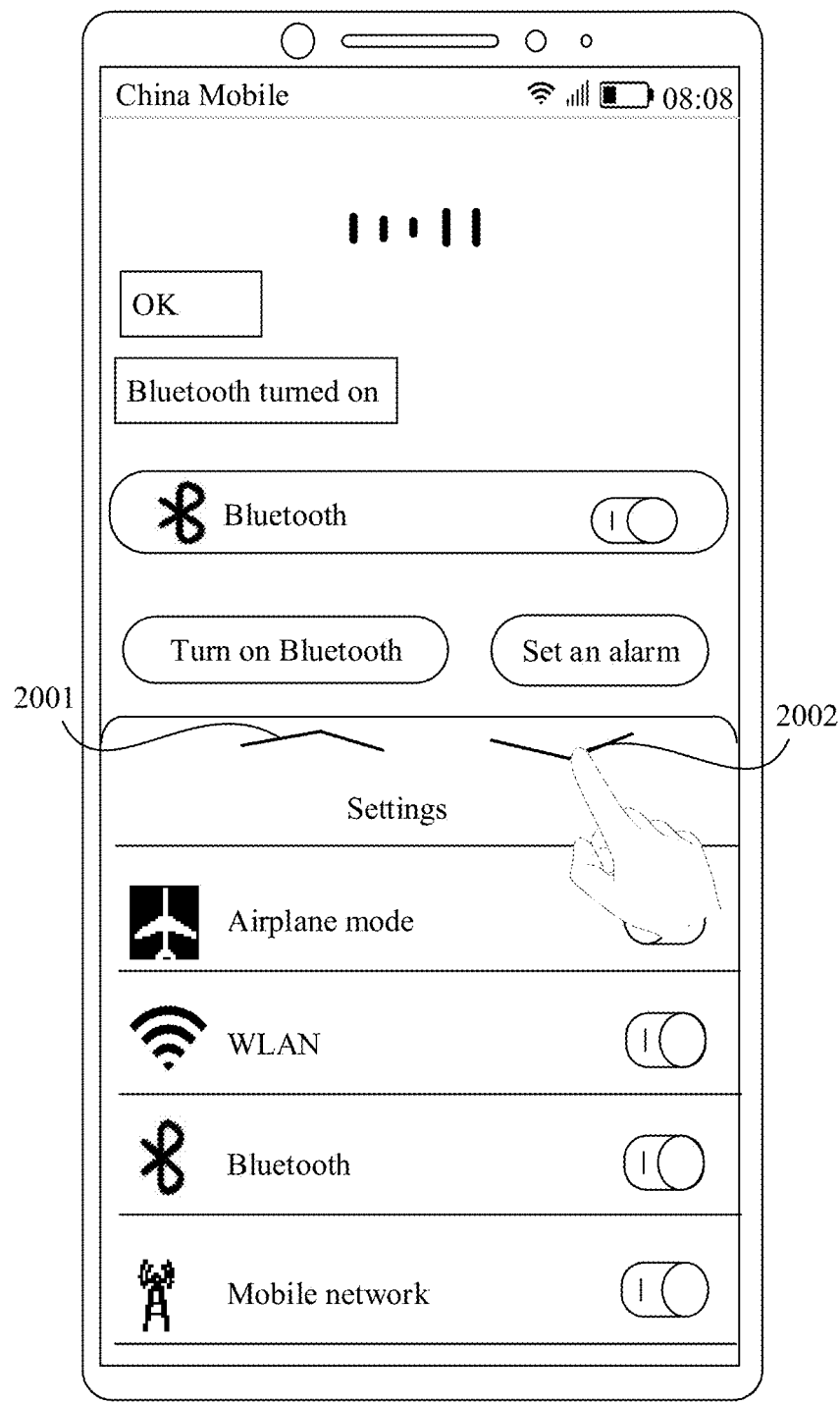
Figure 20C:
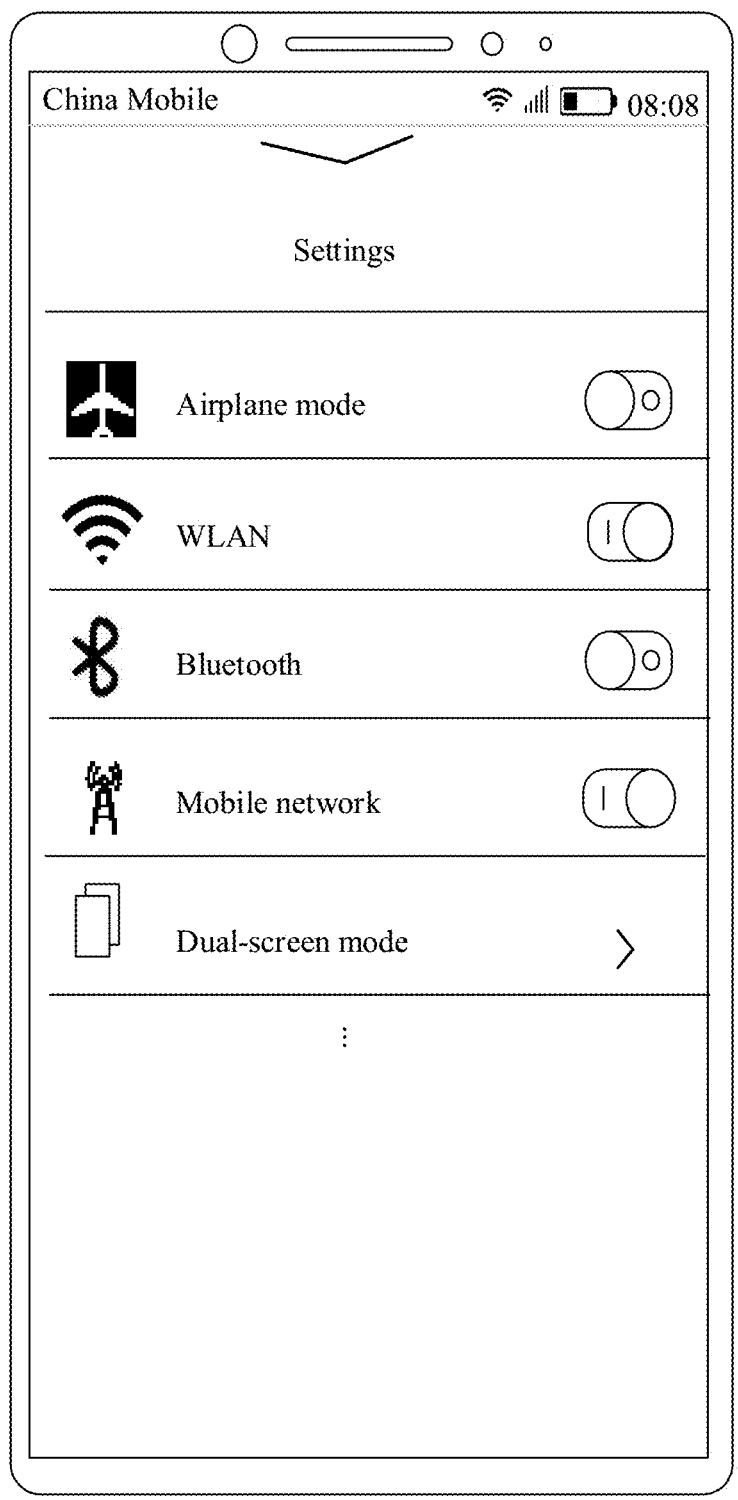
Figure 20D:
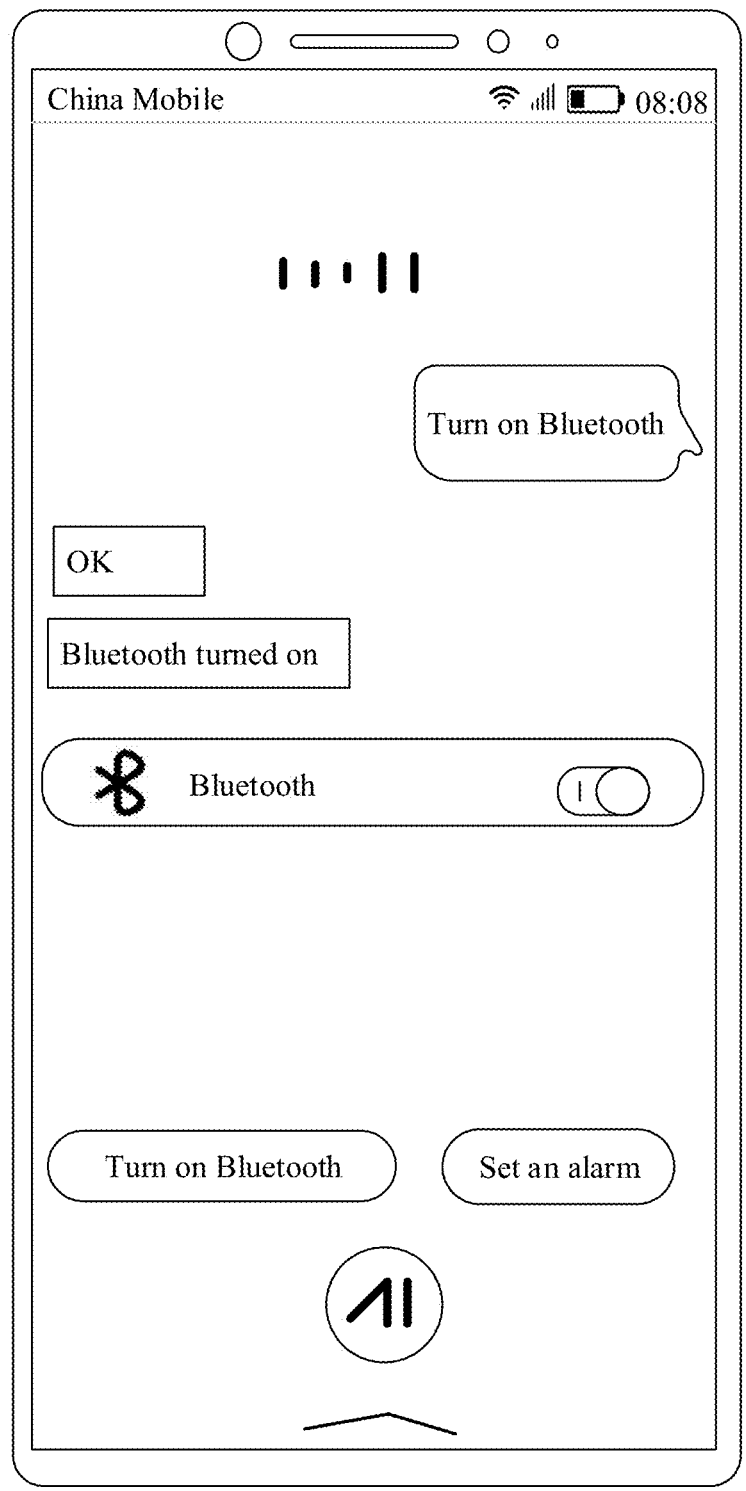

Refer to FIG. 20A. If the mobile phone detects a tapping operation performed by the user on the control 2001, as shown in FIG. 20C, the mobile phone exits from displaying the interface of the voice assistant, and the first interface moves upward, so that the first interface is displayed in full screen. Refer to FIG. 20B. If the mobile phone detects a tapping operation performed by the user on the control 2002, as shown in FIG. 20D, the mobile phone exits from displaying the first interface, and displays the interface of the voice assistant in full screen.

For another example, when the interface of the voice assistant and the first interface are simultaneously displayed, when the mobile phone detects an operation of swiping from the interface of the voice assistant to the first interface by the user, the mobile phone displays the interface of the voice assistant in full screen. Alternatively, when the mobile phone detects an operation of swiping from the first interface to the interface of the voice assistant by the user, the mobile phone displays the first interface in full screen.

For another example, when the interface of the voice assistant and the first interface are simultaneously displayed, when the mobile phone detects an operation of swiping down on the interface of the voice assistant by the user, the mobile phone scrolls down and displays content of the interface of the voice assistant. When the top of the interface of the voice assistant has been displayed, if the operation of swiping down on the interface of the voice assistant by the user is detected again, the interface of the voice assistant is displayed in full screen.

When the interface of the voice assistant and the first interface are simultaneously displayed, if the mobile phone detects an operation of swiping up on the first interface by the user, the mobile phone scrolls up and displays content of the first interface. When the bottom of the first interface is displayed, if an operation of swiping up on the first interface by the user is detected again, the first interface is displayed in full screen.

For another example, when detecting an operation of swiping down at a position near the bottom of the interface of the voice assistant by the user, the mobile phone displays the interface of the voice assistant in full screen. When detecting an operation of swiping down or up in the middle area of the interface of the voice assistant by the user, the mobile phone scrolls and displays the content of the interface of the voice assistant. When detecting an operation of swiping up at a position near the top of the first interface by the user, the mobile phone displays the interface of the voice assistant in full screen. Alternatively, when detecting an operation of swiping down or up in the middle area of the first interface by the user, the mobile phone scrolls and displays the content of the first interface.

It can be learned from the foregoing descriptions that the mobile phone may display the interface of the voice assistant above the original interface (namely, the first interface) in an extension manner, so that the original interface is not blocked, and an interaction operation such as a drag operation may be directly performed between the extended interface and the first interface. Therefore, the mobile phone can display content of an entire display area in a limited screen display space in an extending manner, and add new display content without affecting the user to use of the original interface and the original application; and intuitive interaction can be performed between the newly extended interface and the original interface.

Figure 21A:
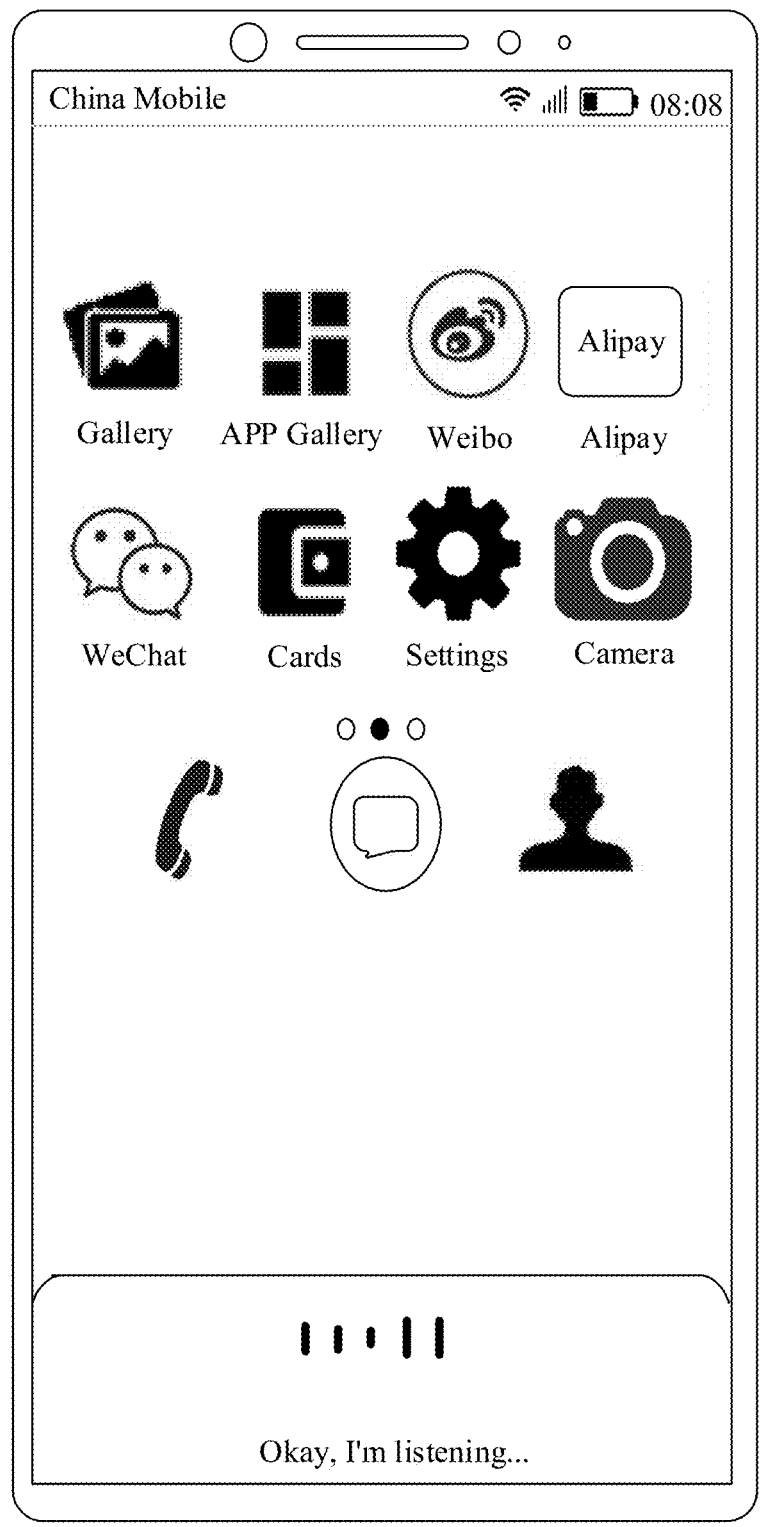
FIG. 21A and FIG. 21B are schematic diagrams of another group of interfaces according to an embodiment of this application.
Figure 21B:
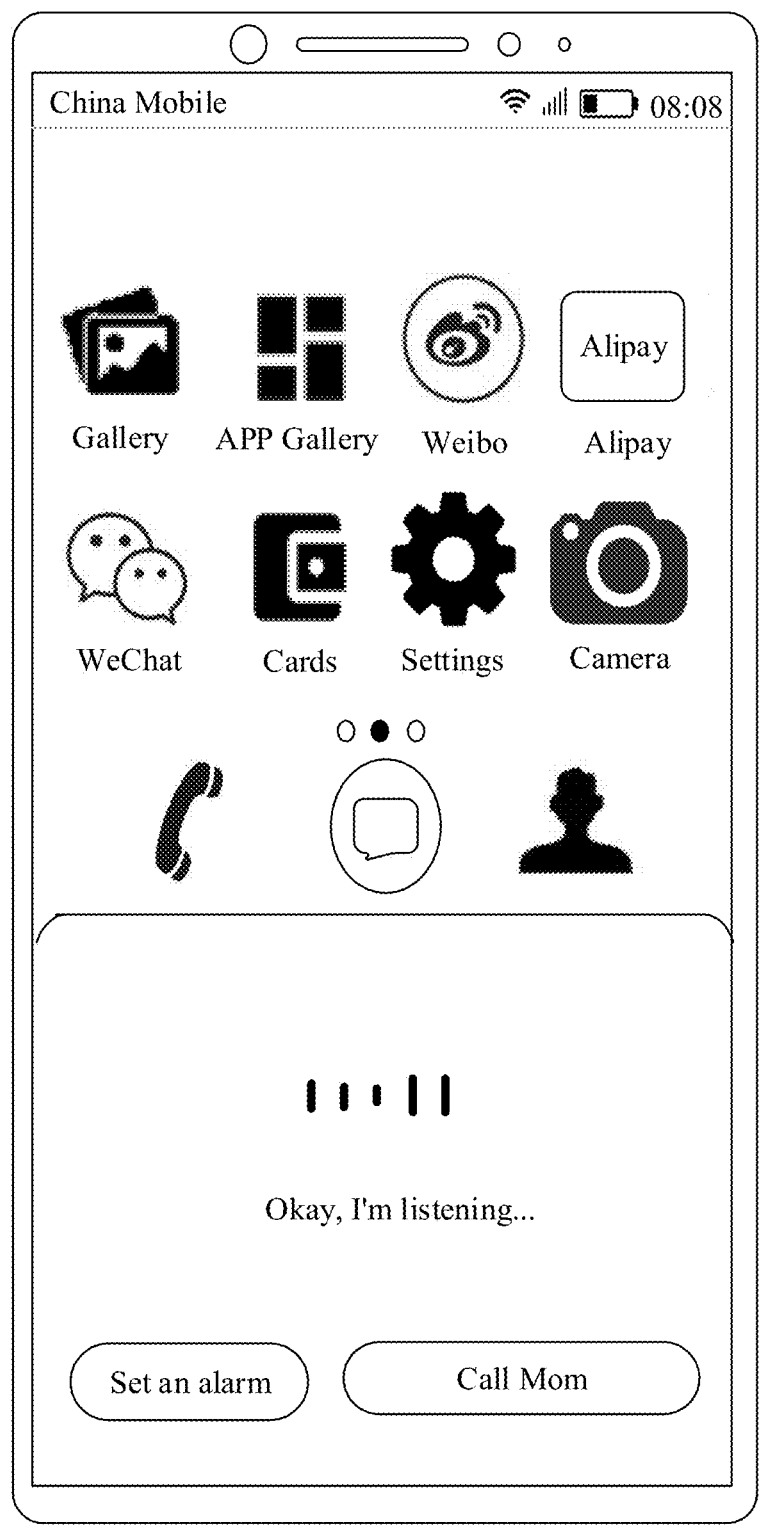

In some other embodiments, refer to FIG. 21A and FIG. 21B. After an operation in which the user indicates to start the voice assistant is detected, as an alternative manner of moving the first interface downward to reserve space for displaying the voice assistant, the mobile phone may also gradually move the first interface upward to reserve space for displaying the interface of the voice assistant. Content at the top of the first interface cannot be displayed because it is moved out of the screen. Similarly, the interface of the voice assistant may also be dynamically switched in from the bottom, the lower left corner, the lower right corner, the lower left side, or the lower right side of the screen. Details are not described herein.

Figure 22A:
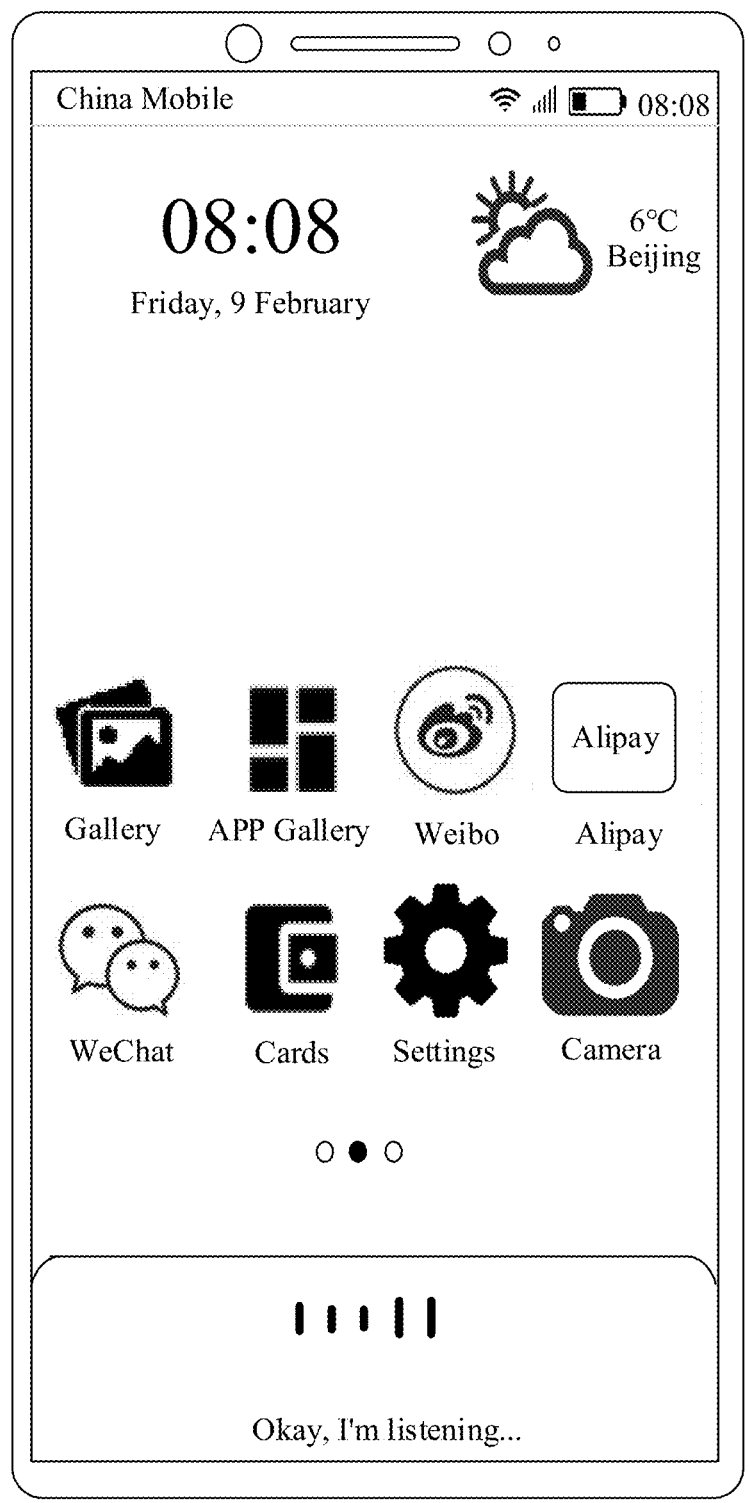
FIG. 22A and FIG. 22B are schematic diagrams of another group of interfaces according to an embodiment of this application.
Figure 22B:
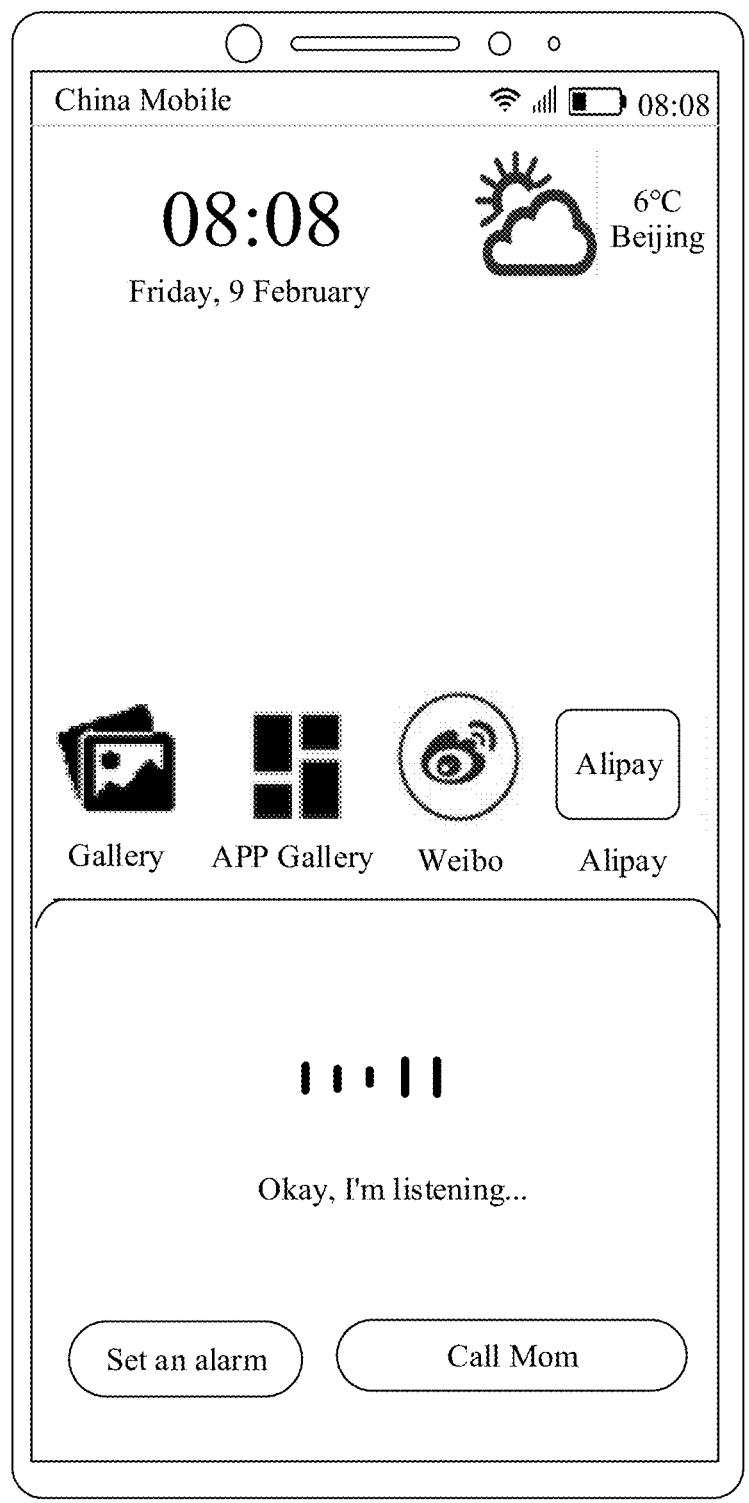

In some other embodiments, refer to FIG. 22A to FIG. 22B. After an operation in which the user indicates to start the voice assistant is detected, as another alternative manner of moving the first interface downward to reserve space for displaying the voice assistant, the mobile phone may gradually reduce a display height of the first interface from the bottom of the first interface to the top of the first interface, and display the interface of the voice assistant in the space reserved after the display height of the first interface decreases.

Figure 23A:
FIG. 23A and FIG. 23B are schematic diagrams of another group of interfaces according to an embodiment of this application.
Figure 23B:
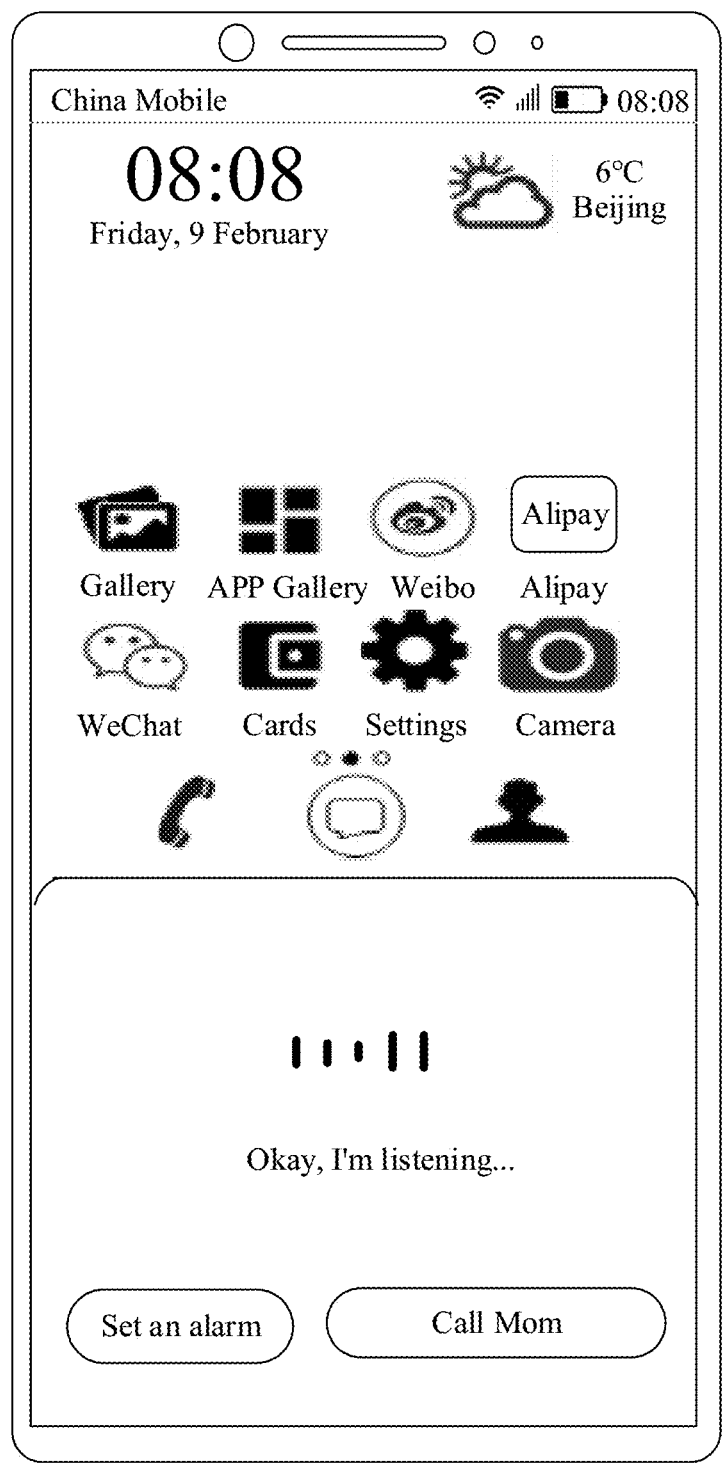

In some other embodiments, after detecting an operation in which the user indicates to start the voice assistant, the mobile phone may reduce a height of the first interface, and scale down and display the first interface to reserve space for displaying the interface of the voice assistant. However, the entire content of the first screen is still displayed. For example, refer to FIG. 23A. The scaled-down first interface may be located at the lower part of the screen, and the interface of the voice assistant may be located at the upper part of the screen. Alternatively, refer to FIG. 23B. The scaled-down first interface may be located at the upper part of the screen, and the interface of the voice assistant may be located at the lower part of the screen.

The foregoing embodiments and the accompanying drawings are mainly described by using an example in which the mobile phone is in portrait mode. In portrait mode, a length of the screen in a vertical direction is relatively large. Therefore, the mobile phone may display the interface of the voice assistant and the first interface in the vertical direction (namely, the Y axis direction). In landscape mode, a length of the screen in a horizontal direction is relatively large. Therefore, the mobile phone may display the interface of the voice assistant and the first interface in the horizontal direction (namely, the X axis direction).

Figure 24A:
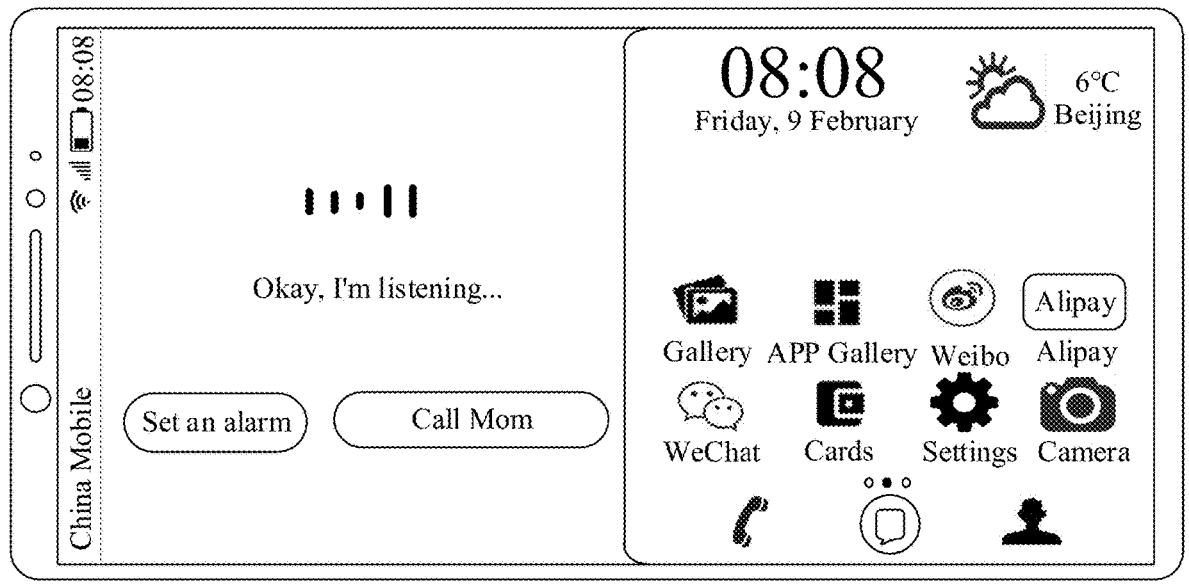
FIG. 24A and FIG. 24B are schematic diagrams of another group of interfaces according to an embodiment of this application.

In landscape mode, after the mobile phone detects an operation in which the user indicates to start the voice assistant, refer to FIG. 24A. The first interface may gradually move rightward to reserve space on the left of the screen to display the interface of the voice assistant. For example, the interface of the voice assistant may be gradually and dynamically switched in from the left of the screen, or the interface of the voice assistant may be gradually and dynamically switched in from the upper left corner of the screen, or the interface of the voice assistant may be gradually and dynamically switched in from the lower left corner of the screen.

Figure 24B:
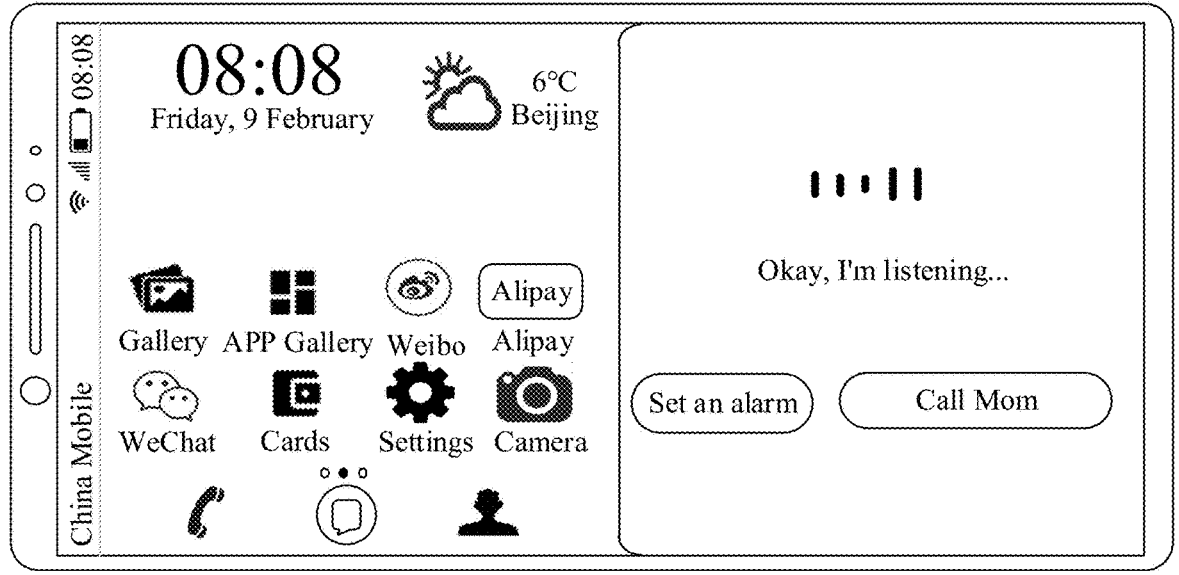

Alternatively, in landscape mode, after the mobile phone detects an operation in which the user indicates to start the voice assistant, refer to FIG. 24B. The first interface may gradually move leftward to reserve space on the right of the screen to display the interface of the voice assistant interface. For example, the interface of the voice assistant may be gradually and dynamically switched in from the right of the screen, or the interface of the voice assistant may be gradually and dynamically switched in from the upper right corner of the screen, or the interface of the voice assistant may be gradually and dynamically switched in from the lower right corner of the screen.

The foregoing is mainly described by using an example in which the electronic device is the mobile phone. The interface display method may be alternatively applied to another electronic device.

For example, the interface display method may alternatively be applied to a foldable screen device. For example, in a folded state of a foldable screen shown in FIG. 25A, the foldable screen device is similar to the foregoing mobile phone, and may be implemented by using the interface display method described in the foregoing embodiments.

In an unfolded state of the foldable screen shown in FIG. 25B, a length of the foldable screen device in the horizontal direction and a length of the foldable screen device in the vertical direction are little different. After an operation in which the user indicates to start the voice assistant is detected, the interface of the voice assistant and the first interface may be displayed side by side in the vertical direction, or may be displayed side by side in the horizontal direction. A specific layout manner in which the interface of the voice assistant and the first interface are simultaneously displayed may be by default, or may be set by the user.

Figure 26B:
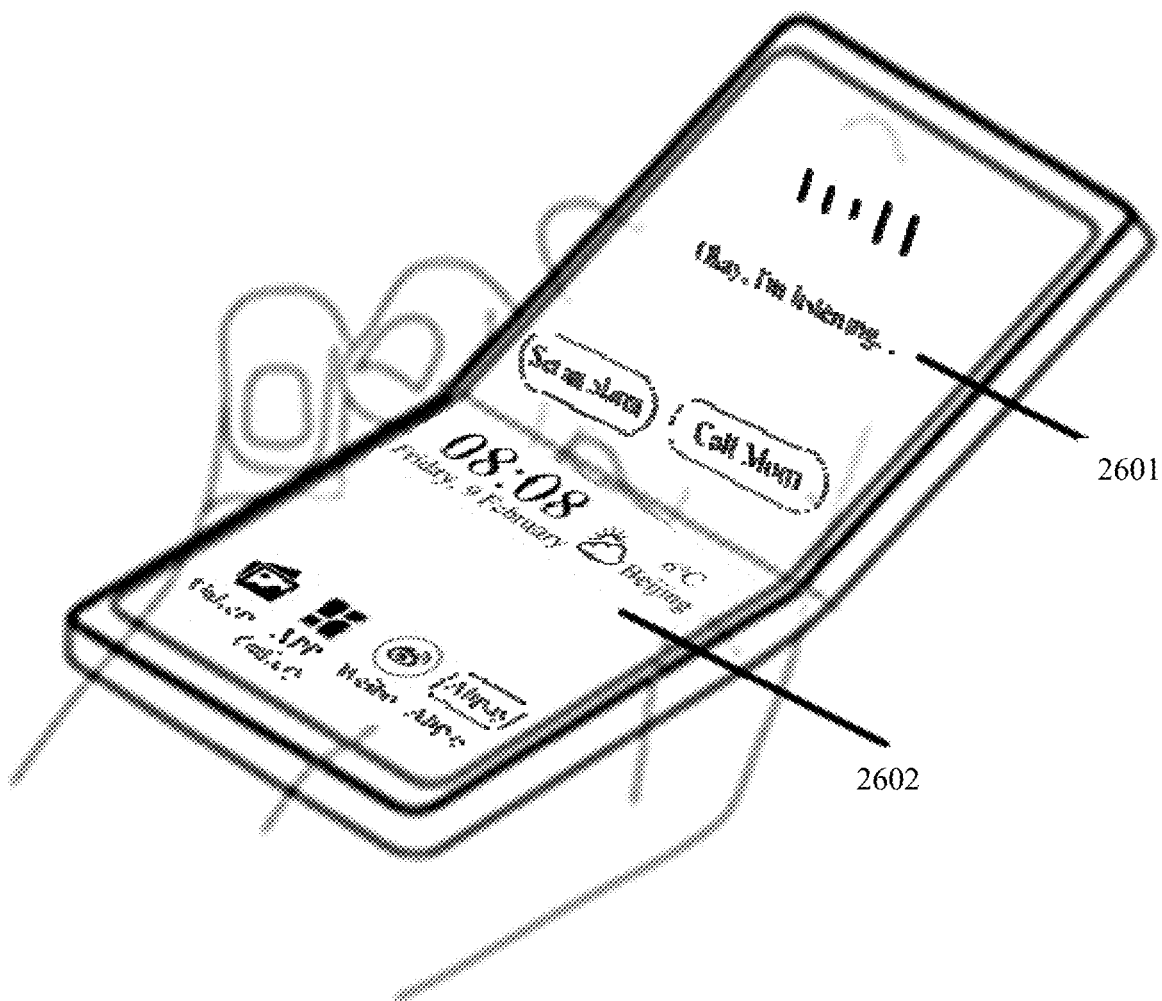

For another example, the foldable screen device includes a first subscreen and a second subscreen. As shown in FIG. 26A, in an unfolded state, the first subscreen and the second subscreen display the first interface. After detecting a folding operation of the user, the foldable screen device starts the voice assistant. As shown in FIG. 26B, the interface of the voice assistant is displayed on the first subscreen, and the first interface is displayed on the second subscreen.

Figure 27A:
FIG. 27A to FIG. 27E are schematic diagrams of another group of interfaces according to an embodiment of this application.
Figure 27B:

For another example, the interface display method may be alternatively applied to an electronic device having a primary screen and a secondary screen. Usually, the electronic device displays the first interface by using the primary screen. After detecting an operation in which the user indicates to start the voice assistant, the electronic device displays the interface of the voice assistant by using the secondary screen. For example, refer to the electronic device shown in FIG. 27A. An overall size ratio of the primary screen 2701 to the secondary screen 2702 is 25:9, and a size ratio of the primary screen 2701 is 16:9. Usually, the electronic device displays the first interface by using the primary screen. The secondary screen does not display content, or is used to display only information such as several icons, logos, identifications, or prompts. After detecting the operation in which the user indicates to start the voice assistant, refer to FIG. 27B, the electronic device continues displaying the first interface on the primary screen, and displays the interface of the voice assistant on the secondary screen, so that the interface of the voice assistant can be displayed in an extending manner by using additional screen space. In addition, the interface of the voice assistant may interact with the first interface.

The foregoing descriptions are provided by using an example in which the first application is the voice assistant application. It may be understood that the first application may alternatively be another application. For example, when the first application is a global search application, after the mobile phone detects an operation of starting the global search application, the mobile phone may display the first interface and the second interface, where the second interface is an interface of the global search.

In some embodiments, different indication operations of the user detected by the mobile phone may start different first applications, to display interfaces of different first applications. For example, if the mobile phone detects a first touch operation, the first application is the voice assistant, and the second interface is the interface of the voice assistant. Alternatively, if the mobile phone detects a second touch operation, the first application is the global search, and the second interface is the interface of the global search.

In some embodiments, the second interface may alternatively be switched between interfaces of different first applications. For example, when the second interface is the interface of the voice assistant, if the mobile phone detects an indication operation of starting the global search, the mobile phone switches from the second interface to the interface of the global search. When the second interface is the interface of the global search, if the mobile phone detects an indication operation of starting the voice assistant, the mobile phone switches from the second interface to the interface of the voice assistant.

For another example, the second interface includes a first application switching control. When the second interface is the interface of the voice assistant, if the electronic device detects a tapping operation performed by the user on the switching control, the second interface is switched to the interface of the global search interface or an interface of another first application. When the second interface is the interface of the global search, if the electronic device detects a tapping operation performed on the application switching control, the second interface is switched to the interface of the voice assistant or an interface of another first application.

Figure 27C:
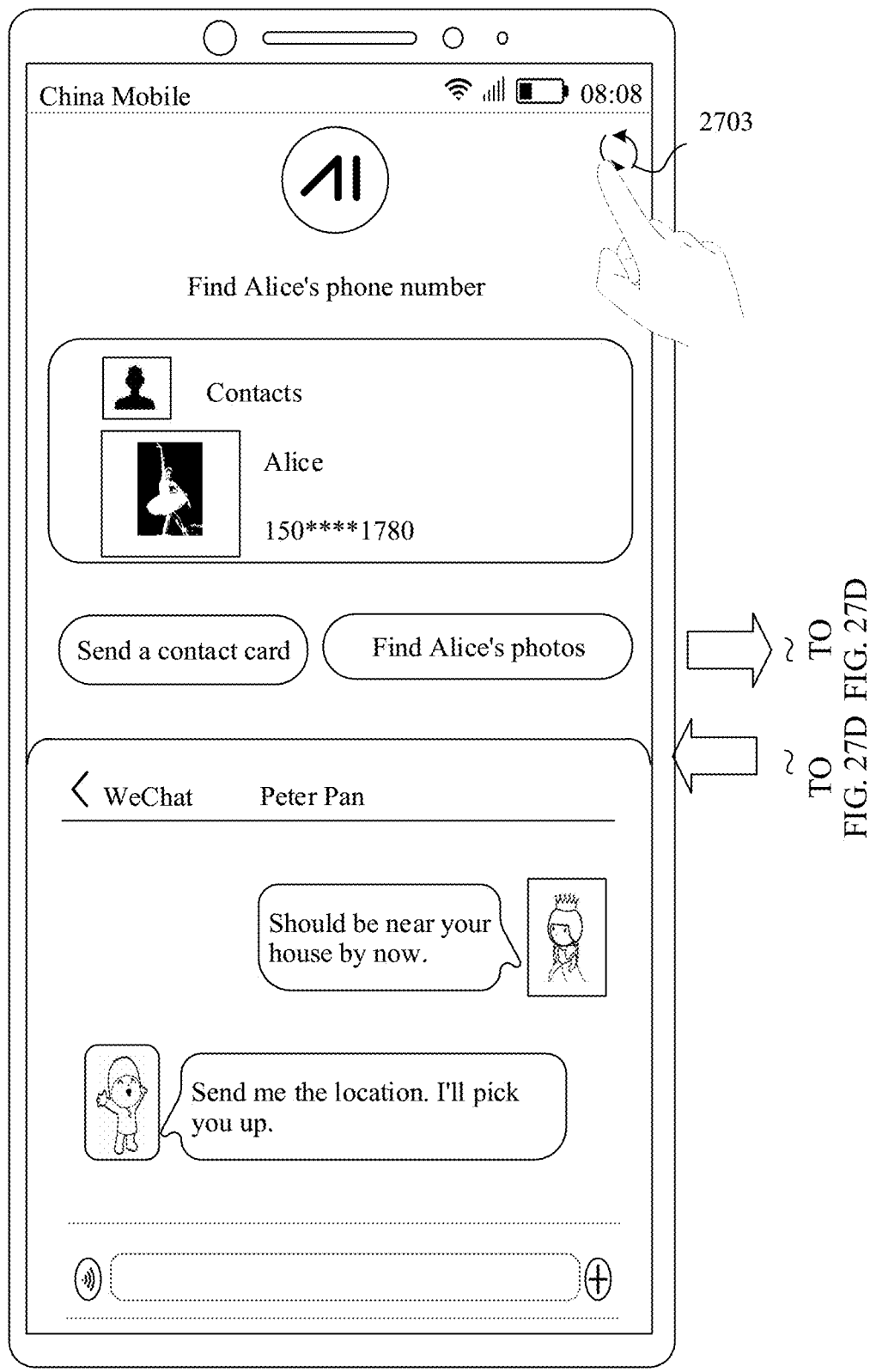
Figure 27D:
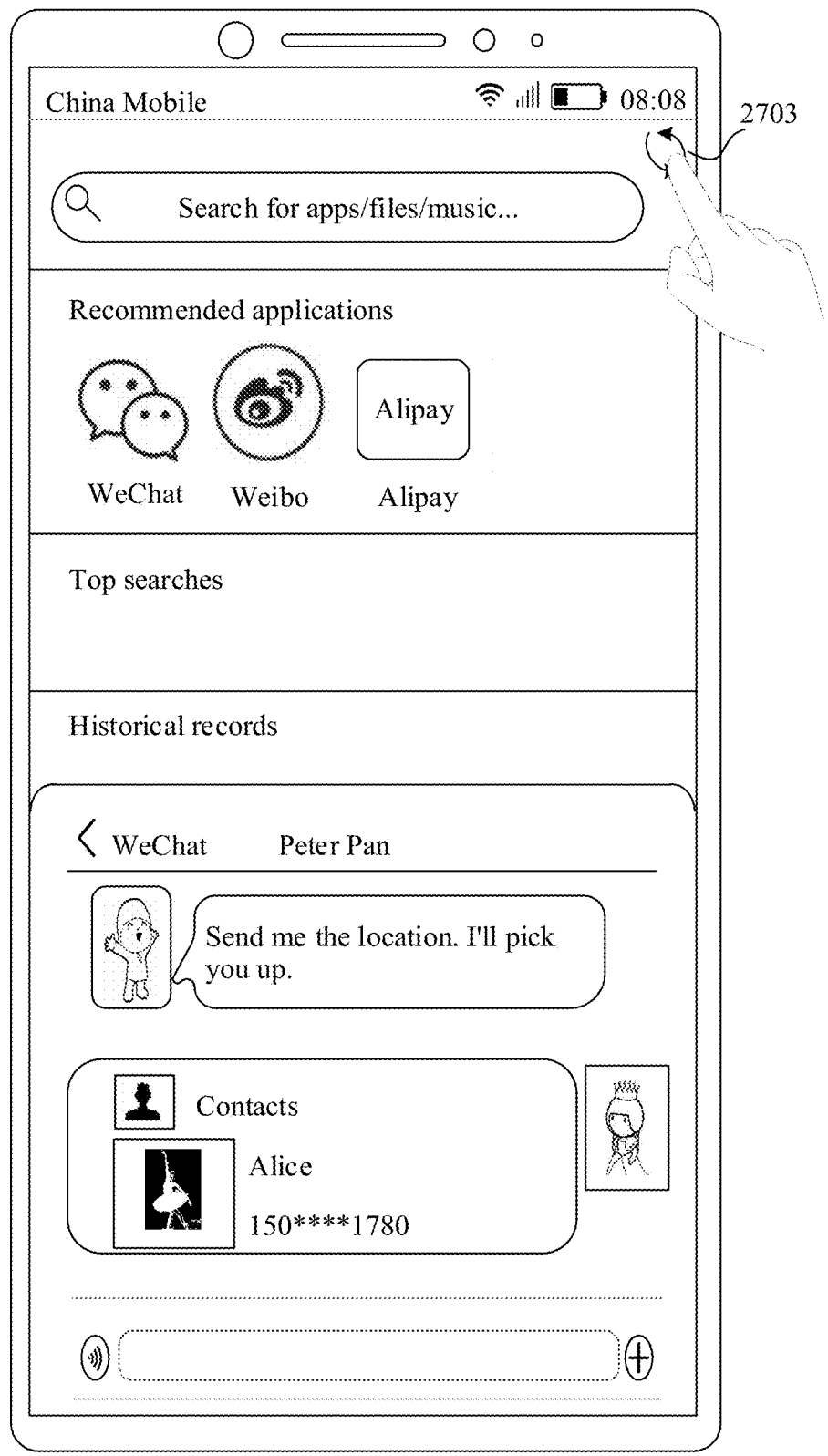

For example, as shown in FIG. 27C, the second interface is the interface of the voice assistant, and the switching control is a control 2703. After the mobile phone detects an operation of tapping the control 2703 by the user, the second interface is switched to the interface of the global search as shown in FIG. 27D. In a case shown in FIG. 27D, if the mobile phone detects an operation of tapping the control 2703 by the user, the second interface is switched to the interface of the voice assistant.

Figure 27E:
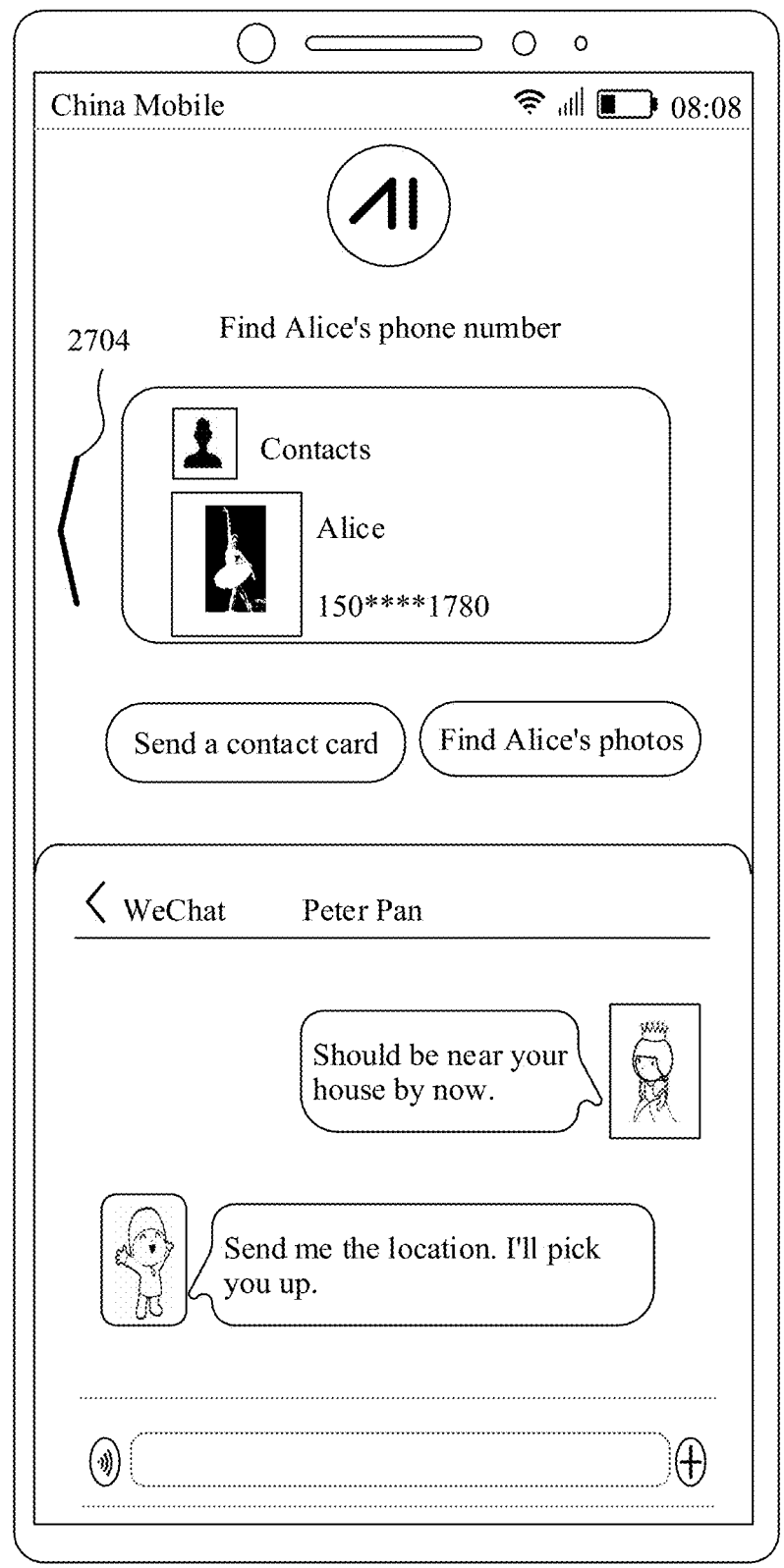

For another example, as shown in FIG. 27E, the switching control is a control 2704. In a case shown in FIG. 27E, if the mobile phone detects an operation of tapping the control 2704 by the user, the second interface is switched to the interface of the global search.

For another example, when the second interface is the interface of the voice assistant, if the mobile phone detects an operation of swiping leftward/rightward on the second interface by the user, the mobile phone switches from the second interface to the interface of the global search. When the second interface is the interface of the global search, if the mobile phone detects an operation of swiping leftward/rightward on the second interface by the user, the mobile phone switches from the second interface to the interface of the voice assistant.

The following describes, from a perspective of a software module, the interface display method provided in this embodiment of this application.

A software system of the mobile phone may use a layered architecture, an event-driven architecture, a microkernel architecture, a micro service architecture, or a cloud architecture. In this embodiment of this application, an Android system with a layered architecture is used as an example to describe the software structure of the mobile phone.

Figure 28:
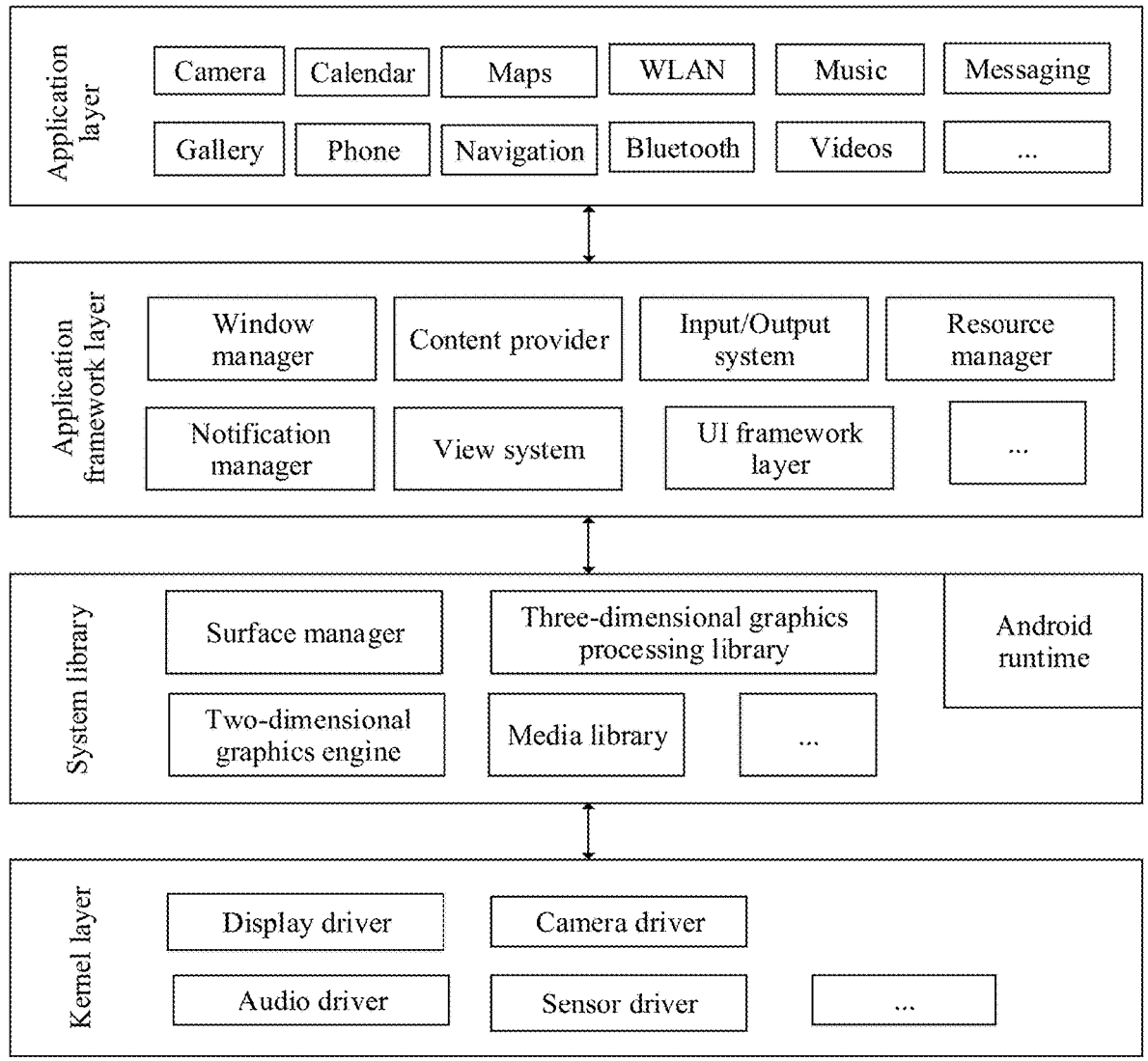
FIG. 28 is a schematic diagram of a software module according to an embodiment of this application.

For example, FIG. 28 is a block diagram of a software structure of the mobile phone according to this embodiment of this application. In the layered architecture, software is divided into several layers, and each layer has a clear role and task. The layers communicate with each other through a software interface. In some embodiments, the Android system is divided into four layers, namely, an application layer, an application framework layer, an Android runtime and system library, and a kernel layer from top to bottom. The application layer may include a series of application packages.

As shown in FIG. 28, the application package may include applications such as "camera", "gallery", "calendar", "phone", "maps", "navigation", "WLAN", "Bluetooth", "music", "videos", and "messaging".

The application framework layer provides an application programming interface (application programming interface, API) and a programming framework for an application at the application layer. The application framework layer includes some predefined functions.

As shown in FIG. 28, the application framework layer may include a window manager (WM), a content provider, a view system, a resource manager, a notification manager, a user interface (UI) framework layer, an input/output system, and the like. The view system may include SurfaceFlinger. For example, for functions of modules in the UI framework layer, the WM, the SurfaceFlinger, and the input/output system, refer to FIG. 29.

Figure 29:
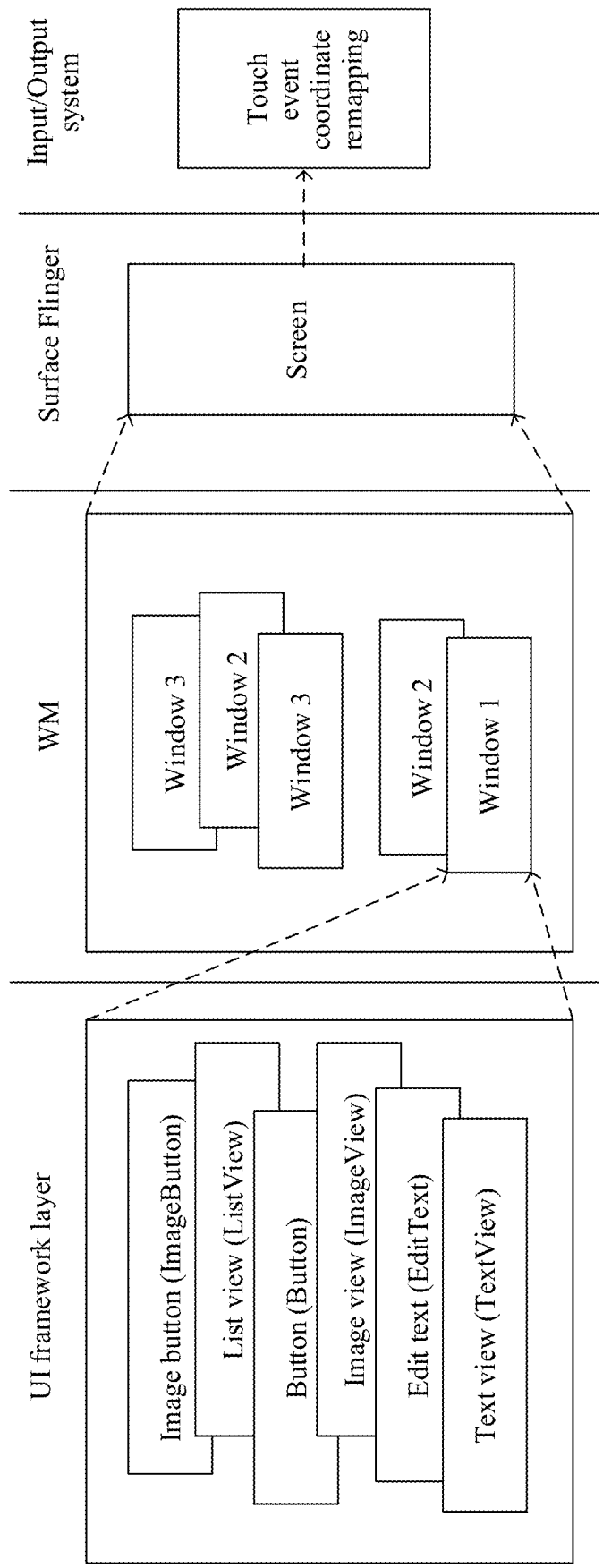
FIG. 29 is a schematic diagram of a function of a software module according to an embodiment of this application.

As shown in FIG. 29, the VM is configured to manage a window program, and manage a layout and a sequence of window surfaces. The VM may obtain a size of a display, determine whether there is a status bar, perform screen locking, take a screenshot, and the like. A surface is a carrier of pixels, and all windows that can be viewed on the mobile phone include respective surfaces. The window is a carrier of the surface, and the surface renders content in the window. The application obtains some window instances through the VM, and the VM creates a surface object for each window.

The content provider is configured to: store and obtain data, and enable the data to be accessed by an application. The data may include a video, an image, audio, calls that are made and received, a browsing history and a bookmark, a phone book, and the like.

The view system includes a visual control, such as a control for displaying a text or a control for displaying a picture. The view system may be configured to construct an application. A display interface may include one or more views. For example, a display interface including an SMS message notification icon may include a text display view and an image display view.

As shown in FIG. 29, the SurfaceFlinger in the view system may draw the foregoing surfaces in the Z axis direction in correct order.

As shown in FIG. 29, the input/output system may be configured to detect and respond to an input/output event, and may be further configured to perform coordinate remapping on a touch event in a first window after the first window and the first interface, and a second window and the interface of the first application are displayed.

The resource manager provides an application with various resources such as a localized character string, an icon, a picture, a layout file, and a video file.

The notification manager enables an application to display notification information in the status bar, and may be used to transmit a notification-type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an alert sound is played, vibration is generated, or the indicator light blinks.

As shown in FIG. 29, the UI framework layer is used to manage a layout and drawing of view controls in a window, and input events of corresponding users.

The Android runtime includes a kernel library and a virtual machine. The Android runtime is responsible for scheduling and management of the Android system.

The kernel library includes two parts: One part is a performance function that needs to be invoked by java language, and the other part is an Android kernel library.

The application layer and the application framework layer are run on the virtual machine. The virtual machine executes java files at the application layer and the application framework layer as binary files. The virtual machine is configured to perform functions such as object life cycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is used to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 30:
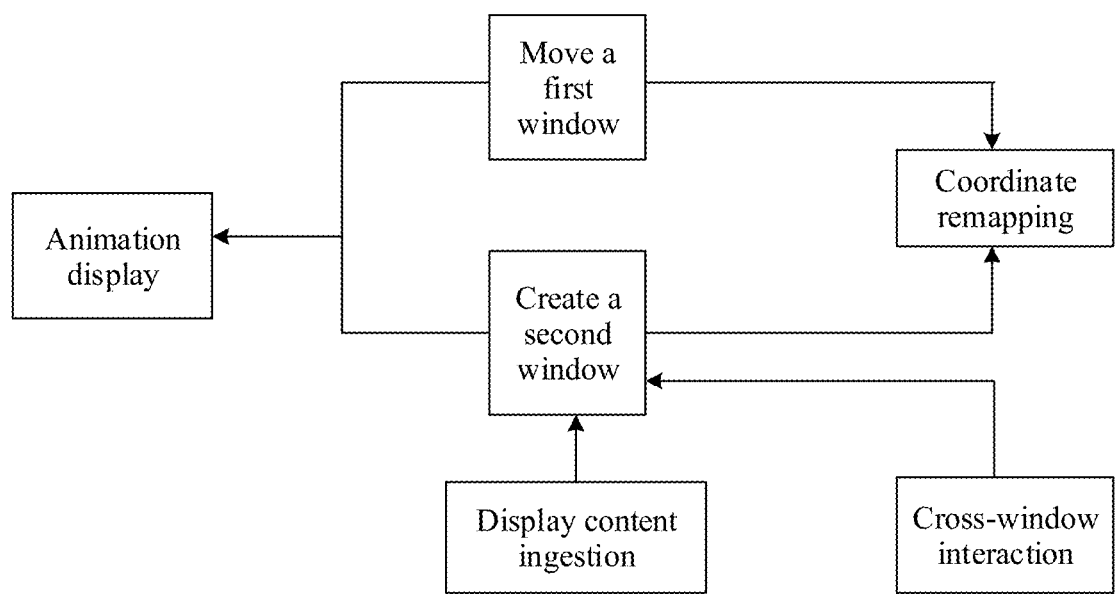
FIG. 30 is a flowchart of software according to an embodiment of this application.

The software modules shown in FIG. 28 may cooperate with each other to implement the interface display method. For another flowchart of the interface display method, refer to FIG. 30. As shown in FIG. 30, after a mobile phone detects an operation of starting a first application by a user, the mobile phone may create a second window, and ingest display content into the second window. In addition, the mobile phone may move a first window to reserve space for displaying the second window. After the first window is moved, the mobile phone may further perform coordinate remapping on the first window. In a process of moving the first window and displaying the second window, the mobile phone may perform corresponding animation display. After both the first window and the second window are displayed, a cross-window interaction operation may be further performed between the first window and the second window.

The following specifically describes the procedure shown in FIG. 30.

A first interface may be displayed in the first window. A component such as a touch sensor or a microphone on the mobile phone may detect an operation of starting the first application by the user. After the mobile phone detects the operation of starting the first application by the user, the WM may create the second window. The second window and the first window belong to a same level. The second window and the first window correspond to a same Z axis coordinate in the Z axis direction. Window layout logic of an operating system may support simultaneous display of the first window and the second window.

That is, after detecting the operation of starting the first application by the user, the mobile phone may display a plurality of windows, for example, the first window and the second window. A plurality of interfaces in a plurality of windows may correspond to a plurality of activities. An activity is an application component that can provide a screen, and the user can use this screen to perform interaction to complete a task.

In an Android application, an activity is usually an independent screen on which interface content can be set and displayed and that can be configured to monitor, process, and respond to user events. For example, in the case shown in FIG. 5B, the mobile phone may include an activity 1 and an activity 2. The activity 1 corresponds to a home screen, may be used to display the home screen, and may further monitor and respond to a touch event performed by the user on the home screen. The activity 2 corresponds to a voice assistant, may be used to display an interface of the voice assistant, and may further monitor and respond to a touch event performed by the user on the interface of the voice assistant and a voice instruction of the user.

Figure 31:
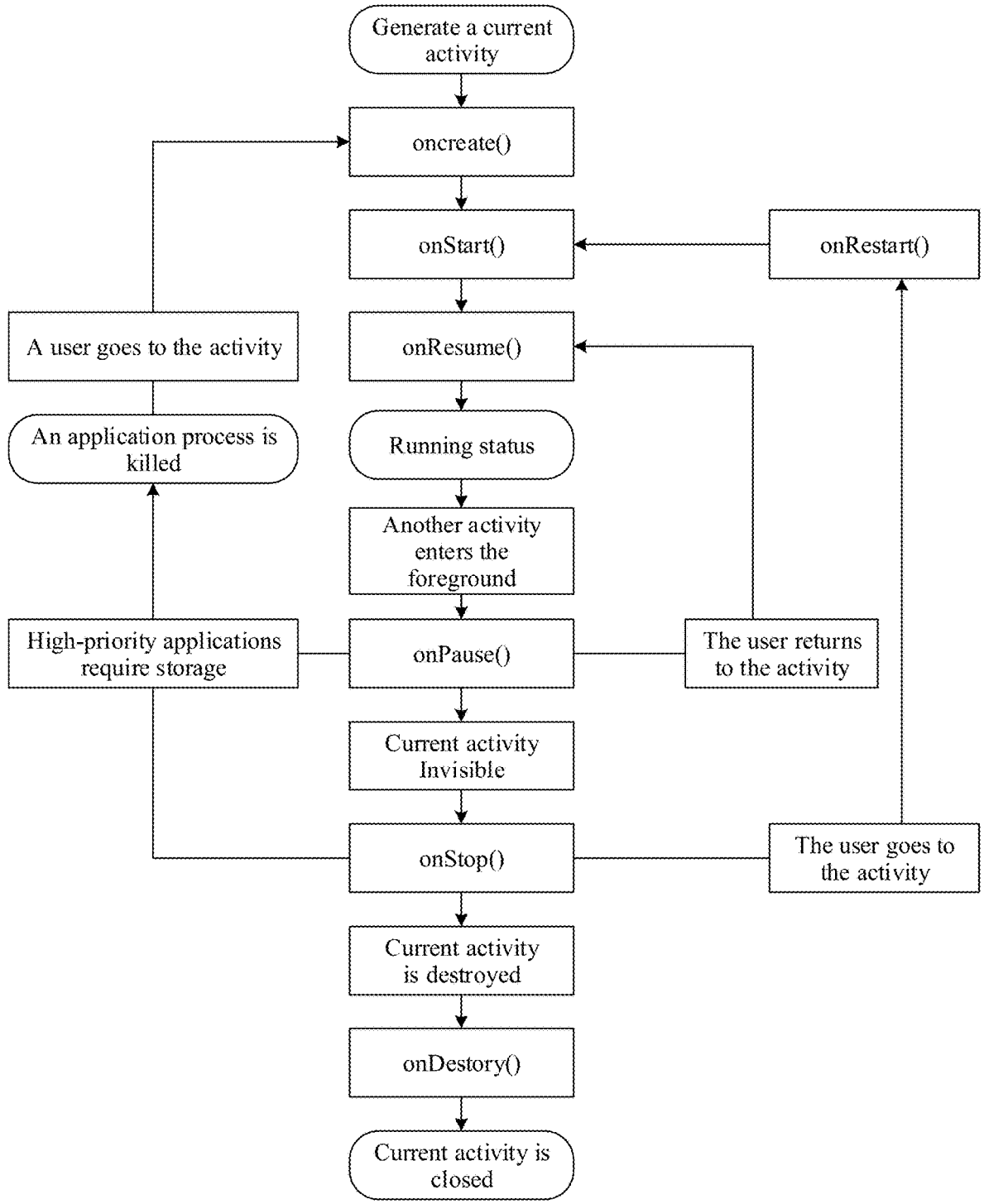
FIG. 31 is a life cycle diagram of an activity in the conventional technology.

In a plurality of activities of the existing plurality of windows, only one activity is in an active state. For a process from generation to destroy of an activity, refer to FIG. 31. As shown in FIG. 31, when a user taps a control on an interface displayed by an activity, an operating system invokes the oncreate( ) method of a current activity, to initialize the setContentLayout( ) method of a current layout. After the oncreate( ) method is complete, the current activity enters the onStart( ) method. The current activity is visible to the user, but the current activity does not obtain a focus and cannot interact with the user. After the onStart( ) method is complete, the current activity enters the onResume( ) method, and the current activity is in a running (running) state. In addition, the current activity obtains the focus and can interact with the user. When another activity overlays the current activity, the current activity enters the onPause( ) method. In this case, the current activity is visible, but cannot interact with the user. After the onPause( ) method is complete, the current activity enters the onStop( ) method. In this case, the current activity is invisible to the user. In a case in which a memory of the operating system is insufficient, the current activity may be reclaimed by the operating system. After the onStop( ) method is complete, the current activity enters the onDestory( ) method and the current activity is destroyed.

Subsequently, if the current activity is returned again, the method functions onPause( )→onStop( )→onRestart( )→onStart( )→onResume( ) in FIG. 31 may be invoked in this order.

In this embodiment of this application, an activity corresponding to the first application (namely, an activity corresponding to the interface of the first application) is in an always-active state. After the mobile phone is powered on, the operating system controls the first application to be started, the activity corresponding to the first application is in an always-active state, and there is no concept of an existing life cycle shown in FIG. 31. After the mobile phone detects an operation in which the user indicates to start the first application, the activity corresponding to the first application is in a visible state, that is, the second window and the interface of the first application are visible to the user, and the second window and the interface of the first application may interact with the user. Subsequently, after the mobile phone displays the first interface in full screen, the activity corresponding to the first application is in a paused state. In this case, the activity corresponding to the first application is in an invisible state, and the second window and the interface of the first application are invisible to the user.

In this embodiment of this application, after the mobile phone detects the operation in which the user indicates to start the first application, the mobile phone may move the first interface, and display the interface of the first application in an extending manner. Different from the existing life cycle of the activity in the plurality of windows shown in FIG. 31, an activity corresponding to the first interface in the first window is not covered by the activity corresponding to the first application, the first application does not affect a status of the activity corresponding to the first interface, the activity corresponding to the first interface is still in a visible state, and the first interface may interact with the user.

In this way, after the mobile phone displays the interface of the first application in an extending manner on the basis of displaying the first interface, both the activities corresponding to the first interface and the interface of the first application are in a visible state, and both the first interface and the interface of the first application may interact with the user.

Figure 32:
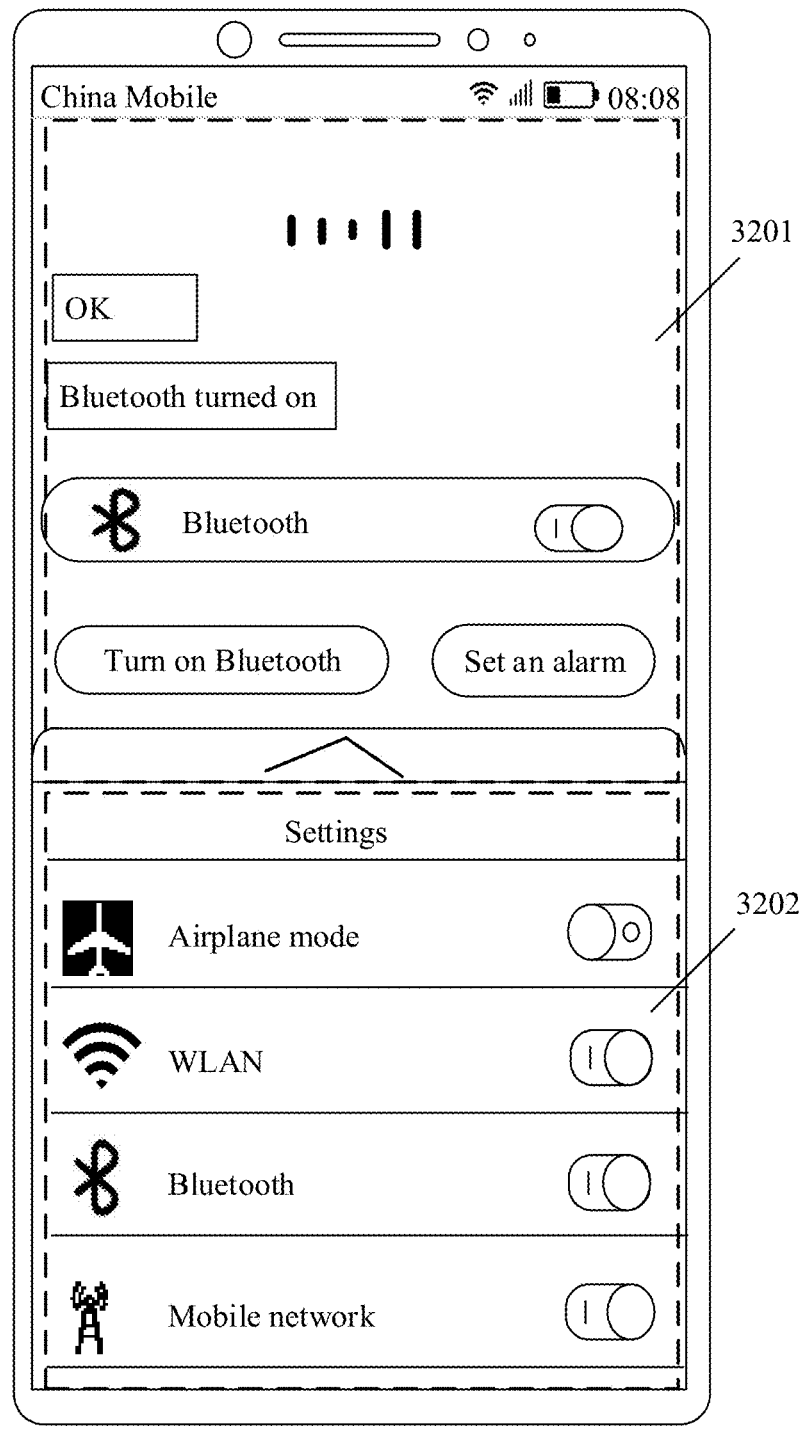
FIG. 32 is a schematic diagram of an interface according to an embodiment of this application.

After creating the second window, the WM may ingest display content into the second window, where the display content is the interface content of the first application. That is, refer to FIG. 32. A first window 3201 displays content of the first interface, and a second window 3202 displays the interface of the first application.

In a case, display content of the second window comes from a system process of the mobile phone, and may be loaded by using an interface loading method of the operating system. For example, in an Android system, a system process may load a designed display layout, and add related code according to specific service logic, to implement a required function.

In another case, display content of the second window comes from a process of the first application. A system process may wake up the process of the first application, and obtain the designed layout content from the process of the first application, to display the layout content in the second window. The created second window merely bears the content that needs to be displayed. The logic code is located in the process of the first application, and the operating system is not coupled with the service logic of the first application. The first application needs to formulate a new interface and processing logic for this interface display manner, including an interaction manner, an interface animation manner, and the like.

Then, the WM may move a location of the first window, to move the first interface to reserve display space for the second window. SurfaceFlinger may draw the first window, the display content of the first window, the second window, and the display content of the second window. The display driver may drive a screen to display the first window, the display content of the first window, the second window, and the display content of the second window. In this way, the first window and the second window may be simultaneously displayed on the screen, and the first interface and the interface of the first application may be simultaneously displayed on the screen. This mode may be referred to as a half-screen mode. For moving manners and moving effects of the first window and the first interface, refer to the related description and the accompanying drawings about moving the first interface in the foregoing embodiments. For displaying manners and display effects of the second window and the display content thereof, refer to the related description and the accompanying drawings about displaying the interface of the voice assistant in the foregoing embodiments.

A DsiplayContent module and a SurfaceControl module may be modified and configured in advance. The WM may control, via the preconfigured DsiplayContent module and the SurfaceControl module, the first window to move, so that the entire original first interface is moved downward, and each application is unaware of it. Therefore, an application layout does not change. There may be a plurality of implementations for moving the first window.

For example, in an implementation, because a window is usually displayed based on a surface layer and is controlled by the SurfaceControl, the WM may control a display size and location of the window by invoking a corresponding API of the SurfaceControl. Finally, the API controls the surface to control the display location and size of the first window. For example, the API may be:

public void setPosition(float x, float y)//control location; or public void setMatrix(float dsdx, float dtdx, float dtdy, float dsdy)//controls the size.

In another implementation, because all windows of an application are carried in an activity or a task (Task), bounds (Bounds) of the activity or the task may be set by using a method provided by the operating system to set a size and a location of the window, so as to set a size and a location of the first window.

Specifically, functions related to sizes of windows such as HwWindowStateAnimator.java and handleLeftScale may be modified and configured in advance. The WM may implement movement of the first window by using a preconfigured function related to a size of a window.

The WM may alternatively lay out a size and a location of the second window by using configured functions such as SingleHandWindow.java, SingleHandAdapter.java, and overlay_display_window_emui.xml.

In a process of moving the first window and displaying the second window, the WM may trigger window animation in which the window changes, to perform animation display. If the existing animation processing manner is used, because there is a large amount of content in the window, a quantity of frames for animation playing is relatively low, and the created second window and the original first window are two windows, animation connection is difficult to control. Consequently, a delay of animation playing is large, and a problem such as motion blur exists. As a result, animation display is not smooth, and user experience is poor.

In this embodiment of this application, the WM may simplify an animation processing procedure in a manner of taking a screenshot and continuously moving a height of a screenshot image, so that animation display is smoother, power consumption of the mobile phone can be reduced, and overall performance of the mobile phone can be improved.

Figure 33:
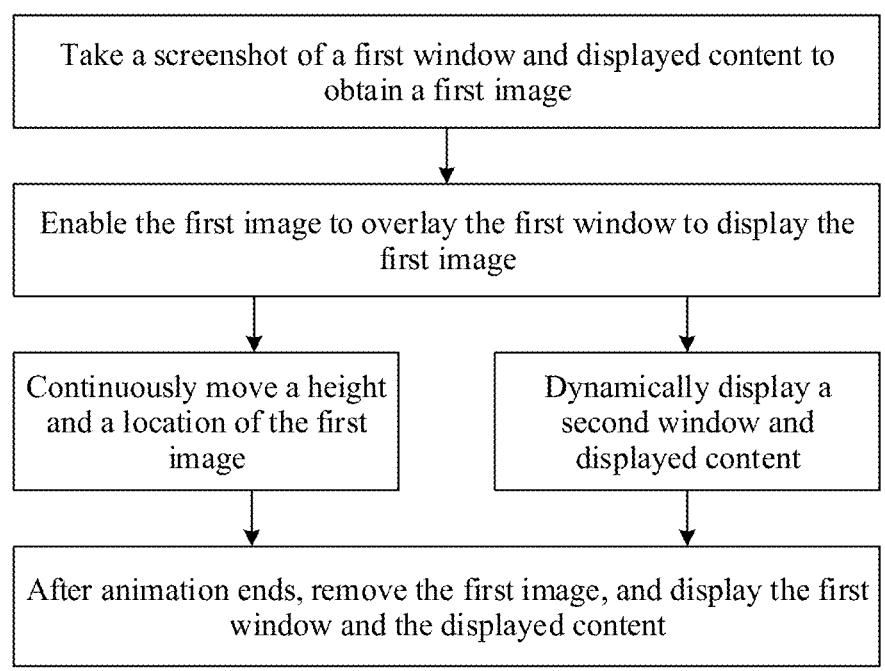
FIG. 33 is a flowchart of animation display according to an embodiment of this application.

For example, refer to FIG. 33, the WM takes a screenshot of a first window and display content, to obtain a first image, and overlays the first image on the first window to display the first image. The WM continuously moves a height and a location of the first image, to simulate an animation change process of moving the first window and dynamically display a second window and display content of the second window. After animation execution ends, the first image is removed, and the first window and the display content are displayed.

In this embodiment of this application, related processing may be further performed on the first window and the second window, so that a user is difficult to perceive a separation line between the first window and the second window. For example, a window border (namely, the separation line) at a junction of the first window and the second window is hidden, or respective window borders of the first window and the second window are hidden. In addition, a corner of the first window may be a rounded corner, a boundary part of the first window and the second window may have a shadow, and the display content of the first window and the display content of the second window complement each other in display locations. Therefore, immersive browsing experience of the user can be improved.

An InputDispather module in the input/output system can be modified and configured in advance. After the first window moves, the input/output system may perform coordinate remapping on a touch event in the first window by using libsurfaceFlinger based on the preconfigured InputDispather module.

Figure 34:
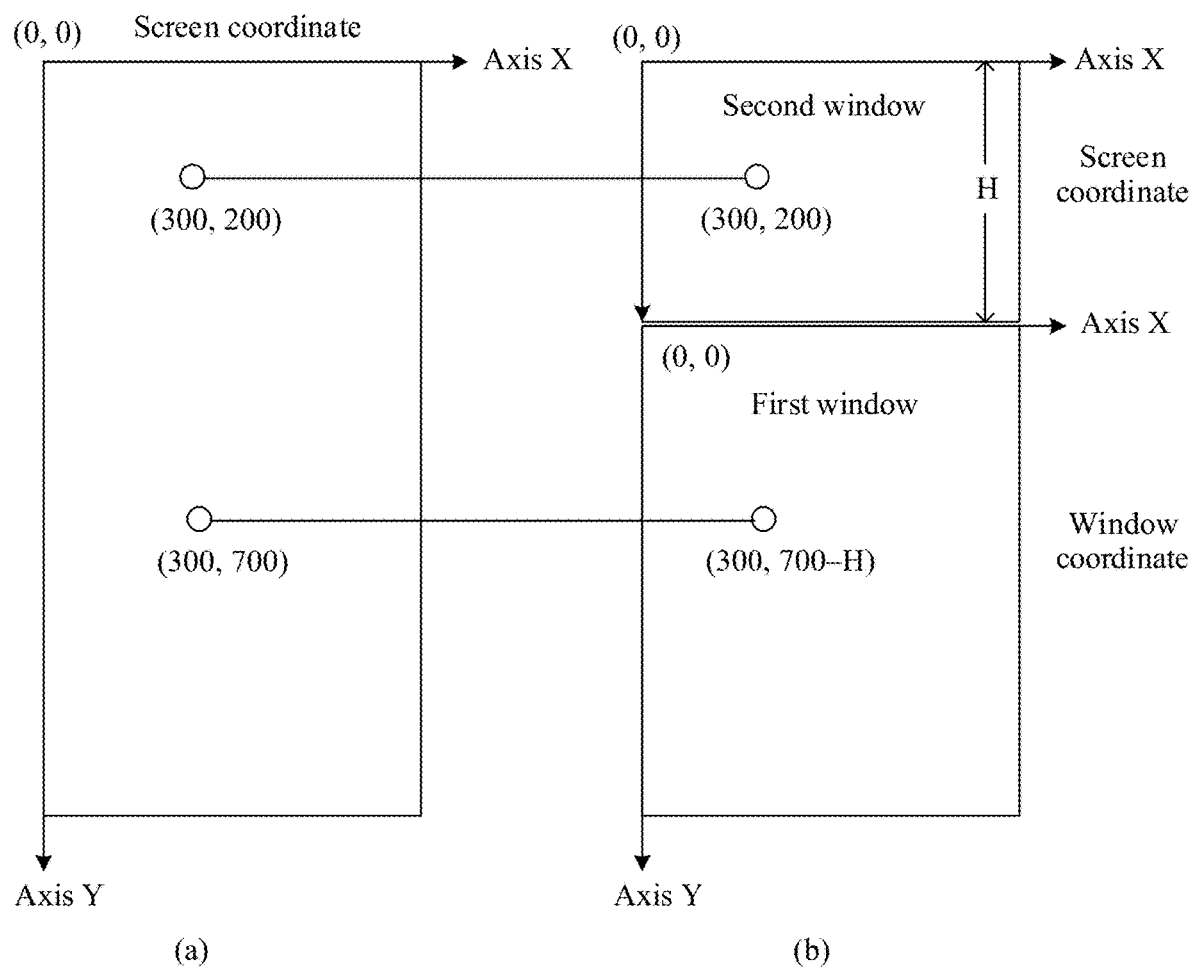
FIG. 34 is a schematic diagram of coordinate remapping according to an embodiment of this application.

Refer to (a) in FIG. 34. Before the first window moves, coordinates of points on a screen may be referred to as screen coordinates, and a coordinate point at an upper left corner of the screen is (0, 0).

After the first window moves, refer to (b) in FIG. 34. Coordinate points at upper left corners of the first window and the second window both are origins of coordinates (0, 0). Coordinates of points in the second window are consistent with the screen coordinates. For example, screen coordinates of a point A are (300, 200), and coordinates of the point A in the second window are also (300, 200). A difference between the Y axis of the window coordinates of each point in the first window and the Y axis of the screen coordinates is a height H of the second window, and the X axis of the window coordinates of each point in the first window is the same as the X axis of the screen coordinates. For example, screen coordinates of a point B are (300, 700), and window coordinates of the point B in the first window are (300, 700−H). That is, after the first window moves, coordinate remapping is performed on the first window, and coordinate remapping is not performed on the second window.

In some embodiments, after detecting a touch input operation in the first window, the input/output system may perform coordinate mapping on the touch input operation in the first window in the InputDispatcher module, so that an original coordinate operation on the screen is mapped to a coordinate operation in the first window after the first window moves.

In some other embodiments, the input/output system may map, in the InputDispatcher module, screen coordinates of each coordinate point in the first window to window coordinates in the first window, and create a coordinate mapping table. After detecting a touch input operation, the input/output system determines, according to the coordinate mapping table, window coordinates corresponding to screen coordinates of the touch input operation, so as to implement remapping of a touch event.

Data objects in the first window and the second window may further interact in a dragging manner. An attribute of a data object that can be dragged include DRAG_FLAG_GLOBAL. Related interfaces of the operating system can monitor a drag event of a data object with the attribute. After the drag event is monitored, corresponding interaction processing may be performed in the first window and the second window. For example, for a drag interaction principle, refer to related descriptions in existing protocols such as Android 7.0.

When coordinates to be dragged are in the second window, the coordinates do not need to be mapped or changed. When the coordinates are dragged into the first window, the Y axis of the coordinates needs to be changed from screen coordinates to window coordinates, that is, the height of the second window is subtracted from the Y axis of the screen coordinates.

In a process of switching from a half-screen mode to a full-screen mode in which the first interface or the interface of the first application is displayed, the WM may simplify an animation processing procedure in a manner of taking a screenshot and continuously moving a height of a screenshot image, so that animation display is smoother, power consumption of the mobile phone can be reduced, and overall performance of the mobile phone can be improved.

Figure 35:
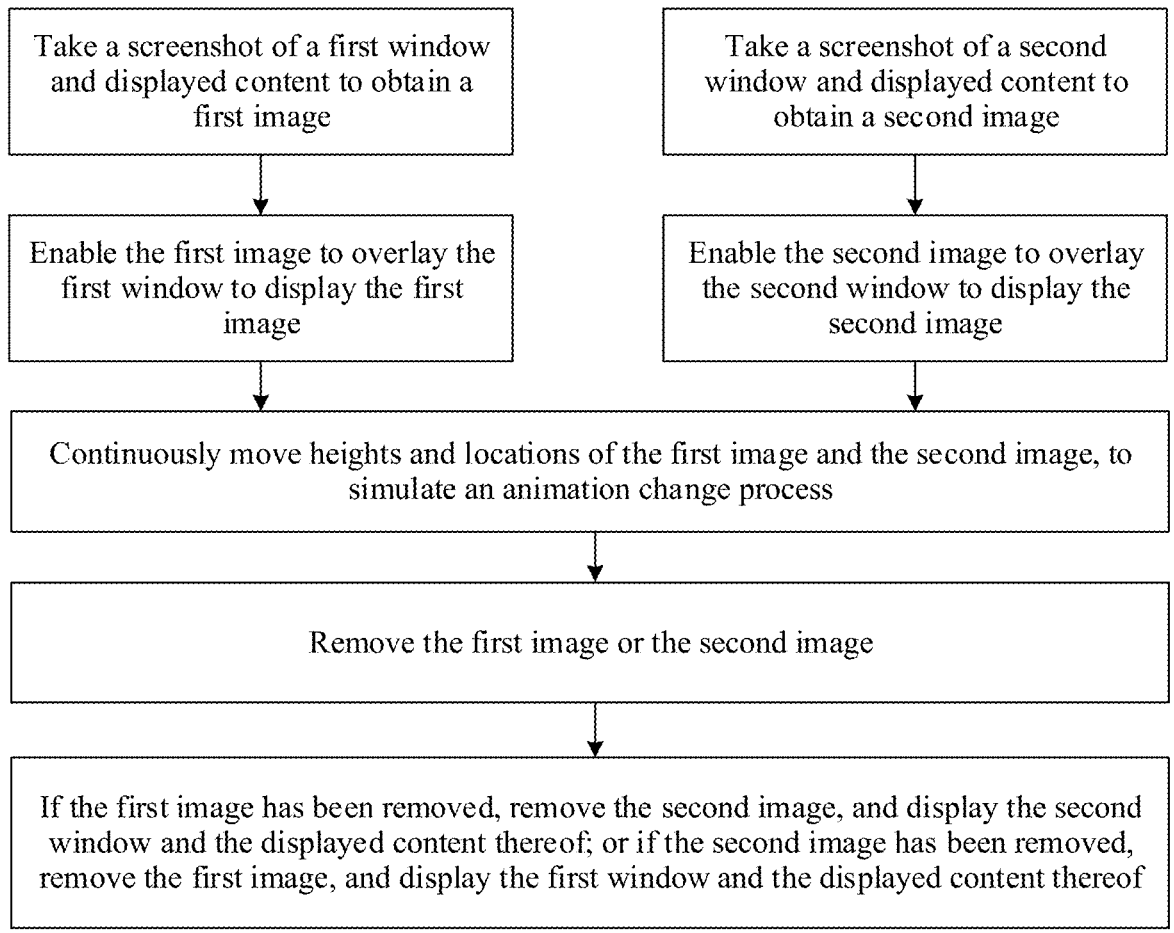
FIG. 35 is another flowchart of animation display according to an embodiment of this application.

For example, refer to FIG. 35. The WM may take a screenshot of a first window and display content to obtain a first image, and overlay the first image on the first window to display the first image. The WM takes a screenshot of a second window and display content to obtain a second image, and overlays the second picture on the second window. The WM continuously moves heights and locations of the first image and the second image, to simulate a moving process of the first window and the second window.

When an interface of a first application is switched to be displayed in full screen, the first image may gradually move out of a screen. After the first image is removed from the screen, the VM may remove the second image, and the second window and the display content of the second window are displayed in full screen.

When a first interface is switched to be displayed in full screen, the second image may gradually move out of a screen. After the second image is removed from the screen, the VM may remove the first image, and the first window and the display content of the first window are displayed in full screen.

After animation execution ends, the first image and the second image are removed, and the first window and the display content of the first window are displayed, or the second window and the display content of the second window are displayed.

Figure 36:
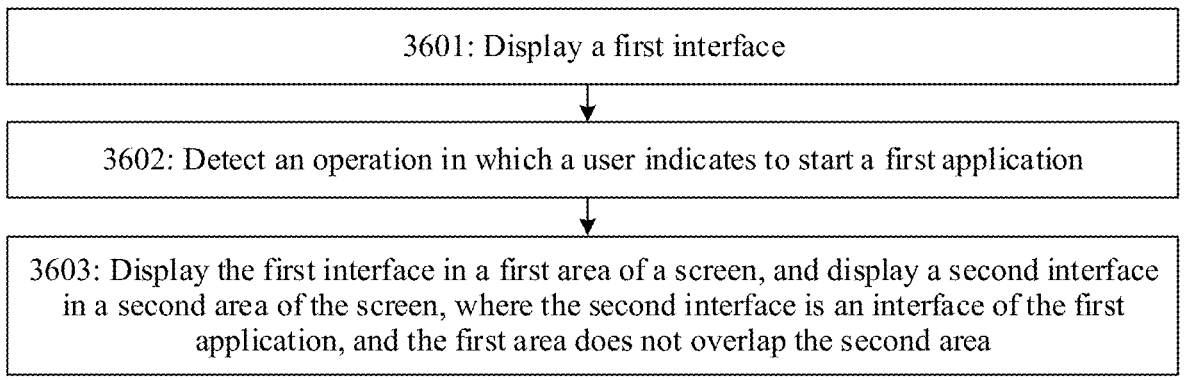
FIG. 36 is a flowchart of an interface display method according to an embodiment of this application.

With reference to the descriptions of the foregoing embodiments and the accompanying drawings, another embodiment of this application further provides an interface display method. Refer to FIG. 36, the method may include the following steps.

3601: An electronic device displays a first interface.

Figure 3A:
FIG. 3A to FIG. 3D are schematic diagrams of a group of interfaces according to an embodiment of this application.
Figure 3B:
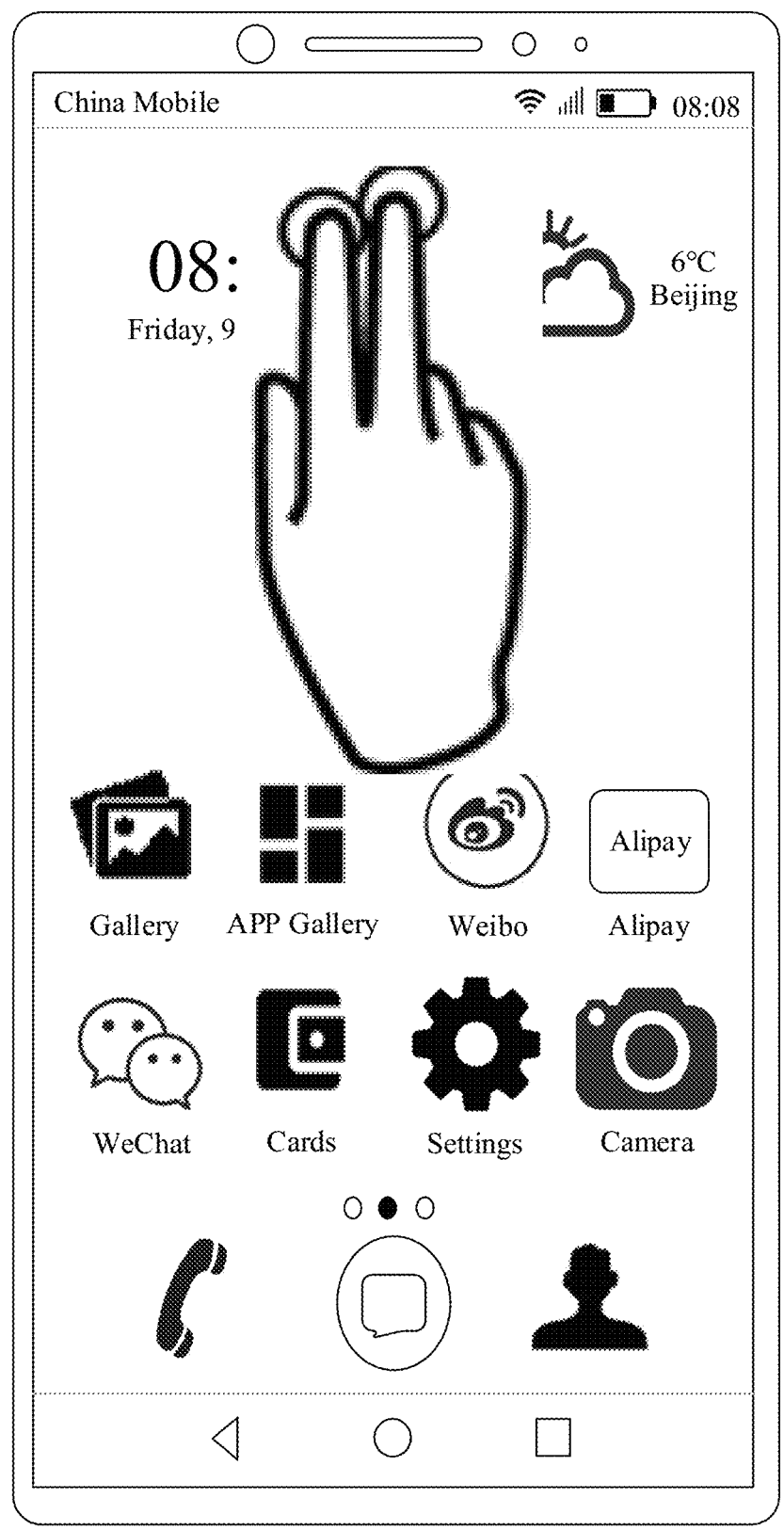

For example, the first interface may be the home screen shown in FIG. 3A, and the first interface may be a settings interface, or the first interface may be an interface of an application such as WeChat or Email.

3602: The electronic device detects an operation in which a user indicates to start a first application.

For example, the first application may be a voice assistant application, a search application, or the like.

For example, the operation in which the user indicates to start the first application may be an operation of swiping down with two fingers by the user shown in FIG. 3B.

Figure 3C:
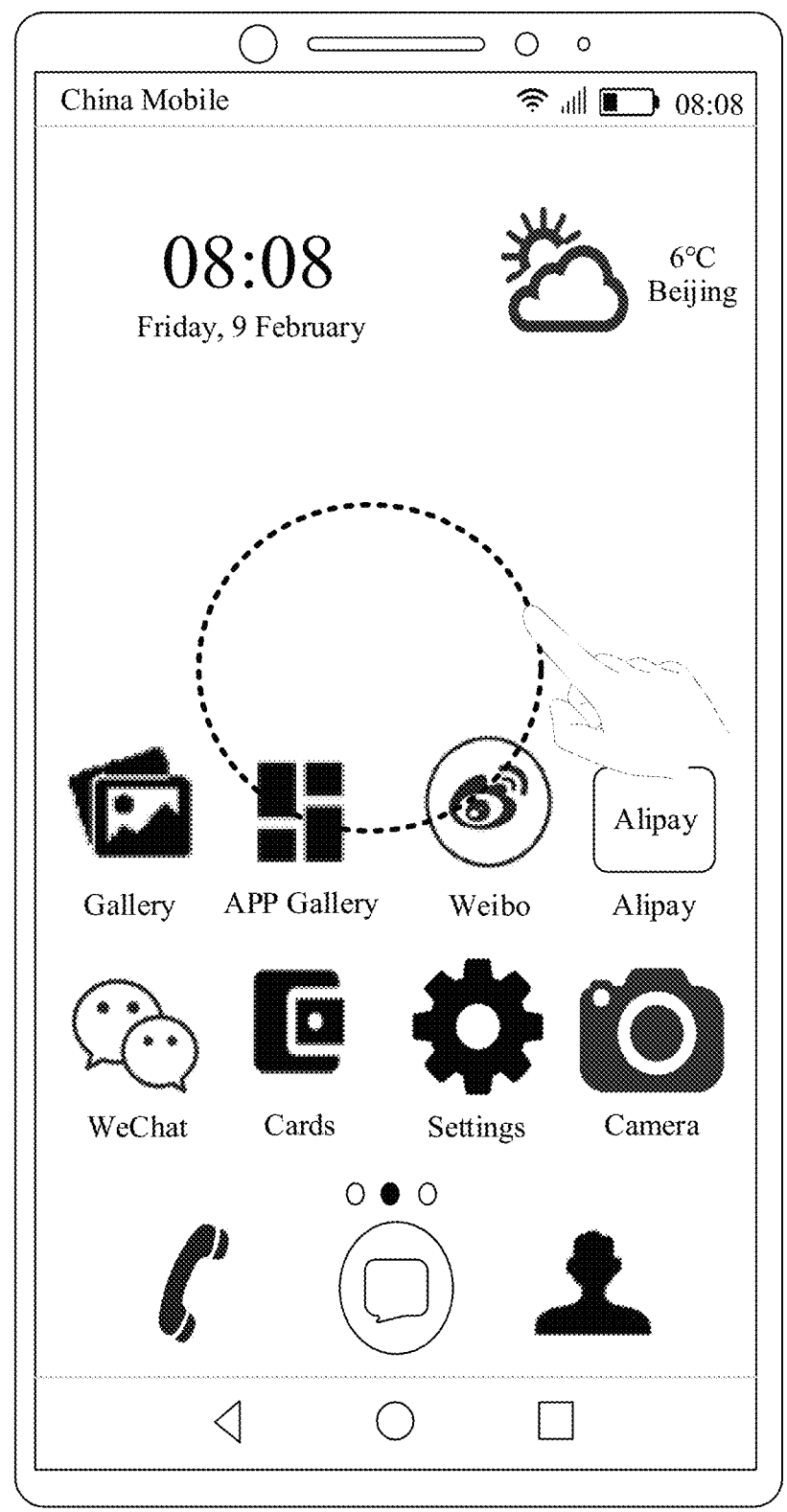
Figure 3D:
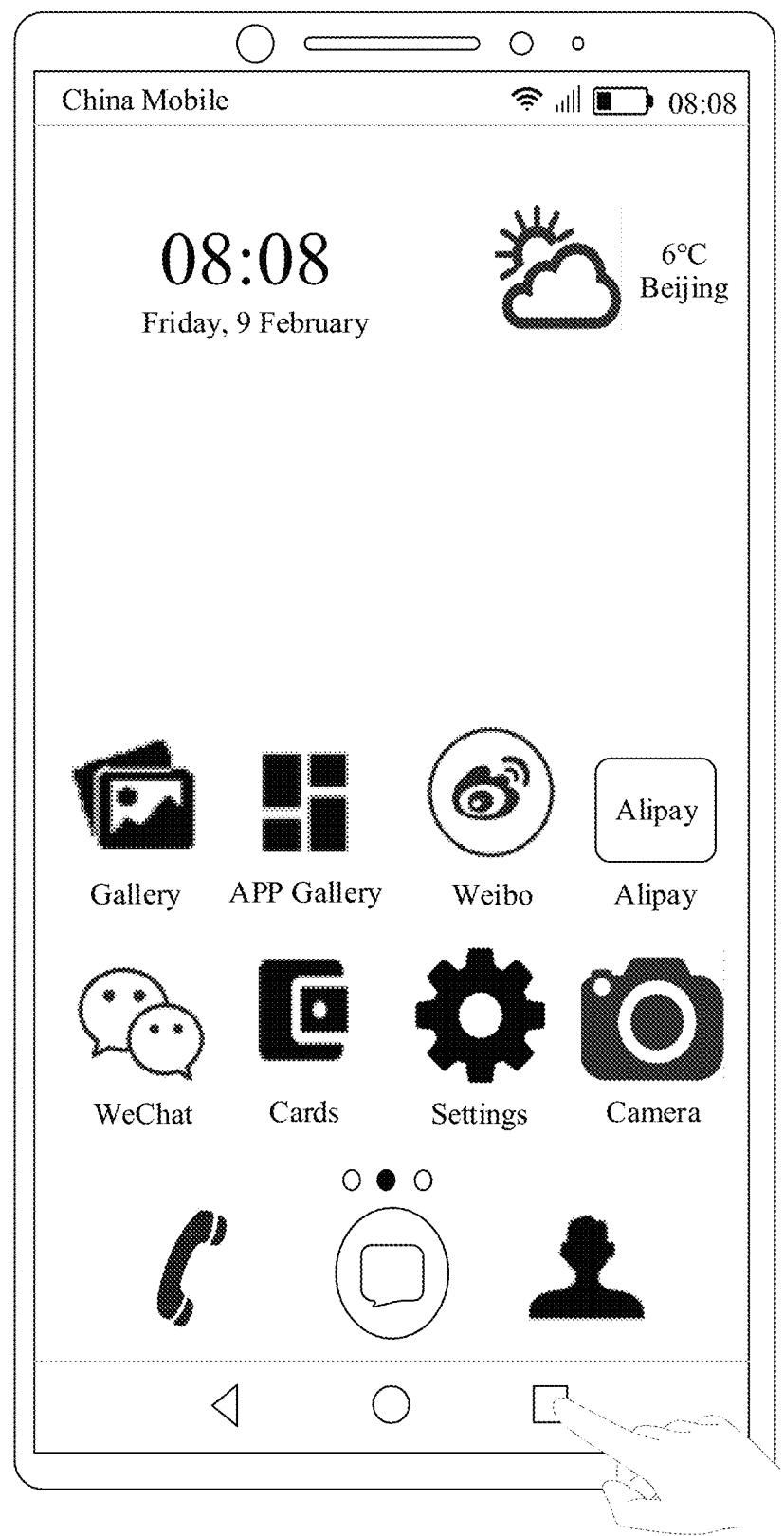

For another example, the operation in which the user indicates to start the first application may be an operation of drawing a circle track by the user shown in FIG. 3C.

For another example, the operation in which the user indicates to start the first application may be an operation of pressing and holding a menu button in a navigation bar by the user shown in FIG. 3D.

3603: The electronic device displays the first interface in a first area of a screen, and displays a second interface in a second area of the screen, where the second interface is an interface of the first application, and the first area does not overlap the second area.

Figure 5B:
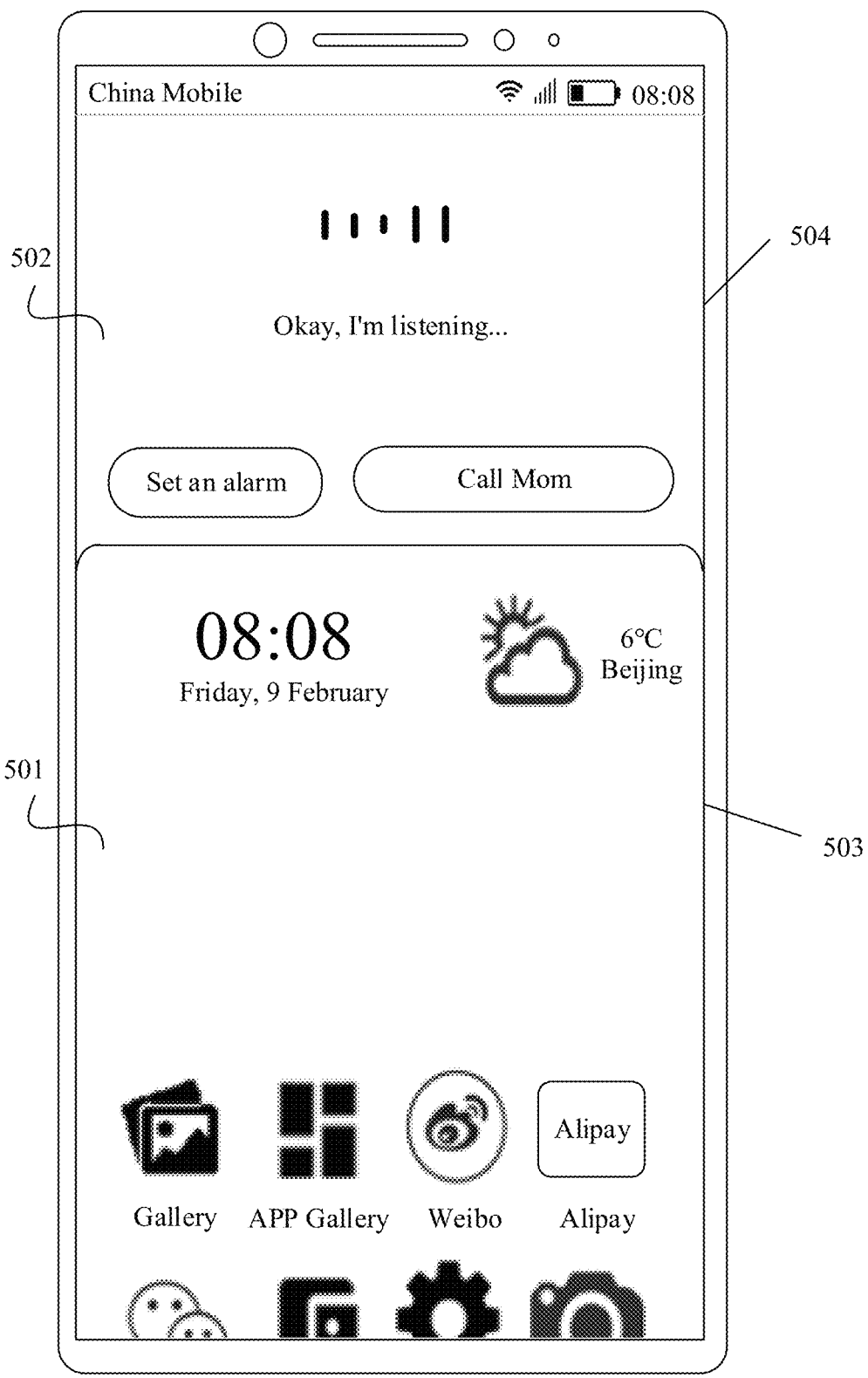

For example, the first area may be the first area 503 shown in FIG. 5B, and the second area may be the second area 504 shown in FIG. 5B.

In the solution described in step 3601 to step 3603, the electronic device may simultaneously display the first interface of an original application and the second interface of the first application, so that the second interface does not block the first interface. In addition, the user may not only interact with the first interface, but also interact with the second interface, and therefore, user experience is relatively good.

In addition, data objects on the first interface and the second interface may further interact with each other, sizes of the first area and the second area may further be adjusted, and the electronic device may further resume displaying the first interface in full screen or switch to displaying the second interface in full screen. Details are not described herein again.

An embodiment of this application further provides an electronic device, which may include a display unit, a detection unit, a movement unit, a scale down unit, a determining unit, or the like. These units may perform the steps in the foregoing embodiments to implement the interface display method.

An embodiment of this application further provides an electronic device, including a screen for interface display, one or more processors, a memory, and one or more computer programs. The one or more computer programs are stored in the memory, and the one or more computer programs include instructions. When the instructions are executed by the one or more processors, the electronic device is enabled to perform the steps in the foregoing embodiments, to implement the interface display method.

An embodiment of this application further provides a computer storage medium. The computer storage medium stores computer instructions. When the computer instructions are run on an electronic device, the electronic device is enabled to perform the related method steps, to implement the interface display method in the foregoing embodiments.

An embodiment of this application further provides a computer program product. When the computer program product runs on a computer, the computer is enabled to perform the foregoing related steps, to implement the interface display method in the foregoing embodiments.

In addition, an embodiment of this application further provides an apparatus. The apparatus may be specifically a chip system. The chip system is applied to an electronic device. The chip system includes one or more interface circuits and one or more processors. The interface circuit and the processor are interconnected through a line. The interface circuit is configured to receive a signal from a memory of the electronic device, and send the signal to the processor. The signal includes computer instructions stored in the memory. When the processor executes the computer instructions, the electronic device performs the foregoing related steps, to implement the interface display method in the foregoing embodiments.

In addition, an embodiment of this application further provides an apparatus. The apparatus may be specifically a component or a module. The apparatus may include a processor and a memory that are connected to each other. The memory is configured to store computer-executable instructions. When the apparatus runs, the processor may execute the computer-executable instructions stored in the memory, so that the chip performs the interface display method in the foregoing method embodiments.

The electronic device, the chip, the computer storage medium, the computer program product, or the chip provided in the embodiments of this application are all configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, division of the foregoing function modules is taken as an example for illustration. During actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, in other words, may be located in one place, or may be distributed on a plurality of different places. Some or all of the units may be selected based on an actual requirement to achieve an objective of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing content is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An interface display method, applied to an electronic device, wherein the electronic device comprises a screen, the screen is used for interface display, and the method comprises:
    displaying, by the electronic device, a first interface of an original application in an original area of the screen;
    detecting, by the electronic device, an operation in which a user indicates to start a first application that is a different type of application than the original application, the first application a voice assistant application;
    displaying, by the electronic device, the first interface of the original application in a first area of the screen, and displaying a second interface in a second area of the screen, wherein the second interface is an interface of the first application, and the first area does not overlap the second area, wherein the displaying, by the electronic device, the first interface in the first area of the screen, and displaying the second interface in the second area of the screen comprises:
    moving, by the electronic device, the first interface to reserve the second area on the screen, wherein the moved first interface occupies the first area, and wherein the second area on the screen occupies at least portion of the original area of the screen, and
    displaying, by the electronic device, the second interface in the second area;
    wherein:
        when the electronic device is in portrait mode, a movement direction of the first interface is downward, and the second area is located above the first area; or a movement direction of the first interface is upward, and the second area is located below the first area; and
        when the electronic device is in landscape mode, a movement direction of the first interface is leftward, and the second area is located on the right of the first area; or a movement direction of the first interface is rightward, and the second area is located on the left of the first area; and
    in response to detecting a first user interaction with the first application in the second interface, the first user interface interaction comprising the voice assistant application receiving a voice command, the method further comprising:
    executing, by the voice assistant application in the second interface, the voice command to control an operation of the original application from the first interface and to obtain a first data object requested by the voice command;
    displaying, by the voice assistant application in the second interface in response to execution of the voice command, a result of executing the voice command comprising displaying the first data object in the second interface;
    detecting, by the electronic device, an operation of dragging the first data object from the second interface to the first interface by the user; and
    using, by the electronic device, the first data object in an operation performed by the original application on the first interface.

2. The method according to claim 1, wherein the using, by the electronic device, the first data object on the first interface comprises:
    inserting, by the electronic device, the first data object into the first interface; or
    searching, by the electronic device by using an application corresponding to the first interface, for information associated with the first data object; or
    sending, by the electronic device, the first data object to another device using an application corresponding to the first interface.

3. The method according to claim 1, wherein the voice command is a request to control an operation of a third application, and the method further comprises:
    executing, by the voice assistant application, the voice command to perform the control of the operation of the third application; and
    the displaying, by the voice assistant application in the second interface, the result of executing the voice command comprises: displaying, by the voice assistant application in the second interface, a result of the third application performing the operation.

4. An electronic device, comprising:
    a memory;
    a display coupled to a screen; and
    at least one processor coupled with the memory and the display, wherein the memory stores program code, the memory, the display, and the at least one processor communicate with each other, and the at least one processor runs the program code to cause the electronic device to perform the following operations:
    displaying a first interface of an original application in an original area of the screen;
    detecting an operation in which a user indicates to start a first application that is a different type of application than the original application, the first application a voice assistant application;
    displaying the first interface of the original application in a first area of the screen, and displaying a second interface in a second area of the screen, wherein the second interface is an interface of the first application, and the first area does not overlap the second area, wherein the displaying the first interface in the first area of the screen, and displaying the second interface in the second area of the screen comprises:
    moving the first interface to reserve the second area on the screen, wherein the moved first interface occupies the first area, and wherein the second area on the screen occupies at least portion of the original area of the screen, and displaying the second interface in the second area; wherein:

when the display is in portrait mode, a movement direction of the first interface is downward, and the second area is located above the first area; or a movement direction of the first interface is upward, and the second area is located below the first area; and when the display is in landscape mode, a movement direction of the first interface is leftward, and the second area is located on the right of the first area; or a movement direction of the first interface is rightward, and the second area is located on the left of the first area; and in response to detecting a first user interaction with the first application in the second interface, the first user interface interaction comprising the voice assistant application receiving a voice command, the operations further comprising:

executing, by the voice assistant application in the second interface, the voice command to control an operation of the original application from the first interface and to obtain a first data object requested by the voice command;

displaying, by the voice assistant application in the second interface in response to execution of the voice command, a result of executing the voice command comprising displaying the first data object in the second interface;

detecting, by the electronic device, an operation of dragging the first data object from the second interface to the first interface by the user; and using, by the electronic device, the first data object in an operation performed by the original application on the first interface.

5. The electronic device according to claim 4, wherein the second interface further comprises an interactive control, and the electronic device further performs the following operations:

detecting, by the electronic device, an operation of tapping the interactive control by the user; and performing, by the electronic device, a response operation on the first data object using the first interface.

6. The electronic device according to claim 5, wherein the interactive control is a sending control, and the operations for performing, by the electronic device, the response operation on the first data object using the first interface comprises:

sending, by the electronic device, the first data object to the another device using the application corresponding to the first interface.

7. The electronic device according to claim 4, wherein the first interface comprises a second data object, and the electronic device further performs the following operations detecting, by the electronic device, an operation of dragging the second data object from the first interface to the second interface by the user; and using, by the electronic device, the second data object on the second interface.

8. The electronic device according to claim 7, wherein the using, by the electronic device, the second data object on the second interface comprises the electronic device performing the following operations:

searching, by the electronic device using an application corresponding to the second interface, for information associated with the second data object; and displaying, by the electronic device, a search result on the second interface.

9. The electronic device according to claim 4, wherein the using the first data object on the first interface comprises:

inserting the first data object into the first interface; or searching by using an application corresponding to the first interface, for information associated with the first data object; or sending the first data object to another device using an application corresponding to the first interface.

10. The electronic device according to claim 4, wherein the first interface is an interface of an email application, and the inserting, by the electronic device, the first data object into the first interface comprises:

inserting the first data object into a body part or an attachment part of an email on the first interface.

11. The electronic device according to claim 4, wherein the first interface is an interface of an instant messaging application, and the inserting, by the electronic device, the first data object into the first interface comprises:

inserting the first data object into a message editing box of the first interface.

12. The electronic device according to claim 4, wherein the first interface is an interface of a memo application, and the searching using an application corresponding to the first interface, for information associated with the first data object comprises:

searching, using the memo application corresponding to the first interface, for a note associated with the first data object; and displaying a search result on the first interface.

13. The electronic device according to claim 4, wherein the first interface is an interface of an instant messaging application, and the sending the first data object to another device using the application corresponding to the first interface comprises:

sending the first data object to the another device using the instant messaging application corresponding to the first interface.

14. The electronic device according to claim 4, wherein the electronic device moving, by the electronic device, the first interface to reserve the second area on the screen, and displaying the second interface in the second area of the screen, further comprises the electronic device performing the following operations:

rendering, by the electronic device, a movement of the first interface of the original application as a translation movement form an original area of the screen to the first area of the screen; and rendering, by the electronic device during the translation movement form the original area of the screen to the first area of the screen, a complimentary movement of the second interface with a complimentary translation movement from off of the screen to the second area of the screen, wherein a first edge of the first interface and a second edge of the second interface are adjacent to one another during the movement and the complimentary movement.

15. The electronic device according to claim 4, wherein the electronic device further performs the following operations:

receiving, by the voice assistant application, a voice command that configures an operation of the original application; and causing the first application to execute the operation configuring the original application based on the voice command.

16. The electronic device according to claim 4, wherein the voice command is a request to control an operation of a third application, and further comprising the electronic device performing the following operations:
  executing, by the voice assistant application, the voice command to perform the control of the operation of the third application; and
  the displaying, by the voice assistant application in the second interface, the result of executing the voice command comprises: displaying, by the voice assistant application in the second interface, a result of the third application performing the operation.

17. The electronic device according to claim 4, wherein the electronic device further performs the following operations:
  in response to detecting a first user interaction with the first application in the second interface, increasing a size of the second area of the second interface to increase a display size of the first application and performing a corresponding decrease to a size of the first area of the first interface to reduce a display size of the original application, and wherein the increase in the size of the second area of the second interface corresponds to a determined type of the first user interaction with the first application.

18. A non-transitory computer readable medium, comprising computer instructions, wherein when the computer instructions are run on an electronic device, the electronic device is enabled to perform:
  displaying a first interface of an original application in an original area of a screen coupled to a display of the electronic device;
  detecting an operation in which a user indicates to start a first application that is a different type of application than the original application, the first application a voice assistant application; and
  displaying the first interface of the original application in a first area of the screen, and displaying a second interface in a second area of the screen, wherein the second interface is an interface of the first application, and the first area does not overlap the second area,
  wherein the displaying the first interface in the first area of the screen, and displaying the second interface in the second area of the screen comprises:
  moving the first interface to reserve the second area on the screen, wherein the moved first interface occupies the first area, and wherein the second area on the screen occupies at least portion of the original area of the screen, and
  displaying the second interface in the second area;
  wherein:
    when the display of the electronic device is in portrait mode, a movement direction of the first interface is downward, and the second area is located above the first area; or a movement direction of the first interface is upward, and the second area is located below the first area; and
    when the display of the electronic device is in landscape mode, a movement direction of the first interface is leftward, and the second area is located on the right of the first area; or a movement direction of the first interface is rightward, and the second area is located on the left of the first area; and
  in response to detecting a first user interaction with the first application in the second interface, the first user interface interaction comprising the voice assistant application receiving a voice command, the method further comprising:
  executing, by the voice assistant application in the second interface, the voice command to control an operation of the original application from the first interface and to obtain a first data object requested by the voice command;
  displaying, by the voice assistant application in the second interface in response to execution of the voice command, a result of executing the voice command comprising displaying the first data object in the second interface;
  detecting, by the electronic device, an operation of dragging the first data object from the second interface to the first interface by the user; and
  using, by the electronic device, the first data object in an operation performed by the original application on the first interface.

* * * * *